US006260004B1

(12) United States Patent
Hays et al.

(10) Patent No.: US 6,260,004 B1
(45) Date of Patent: Jul. 10, 2001

(54) METHOD AND APPARATUS FOR DIAGNOSING A PUMP SYSTEM

(75) Inventors: Coy L. Hays, Tulsa, OK (US); Thomas A. Brunson, Leander, TX (US); Gary A. Lenz, Eden Priarie, MN (US)

(73) Assignee: Innovation Management Group, Inc., Tulsa, OK (US)

( * ) Notice: Subject to any disclaimer, the term of this patent is extended or adjusted under 35 U.S.C. 154(b) by 0 days.

(21) Appl. No.: 09/002,053

(22) Filed: Dec. 31, 1997

(51) Int. Cl.[7] .............................. G01L 3/26; G01M 19/00
(52) U.S. Cl. .................... 702/183; 702/130; 702/185; 702/34; 702/35; 73/168
(58) Field of Search ..................................... 702/183, 166, 702/185, 34, 35; 73/168; 166/265, 266

(56) References Cited

U.S. PATENT DOCUMENTS

| Re. 34,559 | 3/1994 | Mickowski | 702/183 |
|---|---|---|---|
| 3,882,305 | 5/1975 | Johnstone | 702/183 |
| 4,976,144 | 12/1990 | Fitzgerald | 73/168 |
| 4,981,175 * | 1/1991 | Powers | 166/265 |
| 5,115,406 | 5/1992 | Zatezalo et al. | 700/279 |
| 5,197,328 | 3/1993 | Fitzgerald | 73/168 |
| 5,210,704 | 5/1993 | Husseiny | 702/34 |
| 5,485,491 | 1/1996 | Salnick et al. | 376/245 |
| 5,563,351 | 10/1996 | Miller | 73/861.42 |
| 5,566,092 | 10/1996 | Wang et al. | 702/185 |
| 5,587,931 | 12/1996 | Jones et al. | 702/34 |
| 5,602,757 | 2/1997 | Haseley et al. | 702/56 |
| 5,628,229 | 5/1997 | Krone et al. | 73/168 |
| 5,649,440 | 7/1997 | Algers | 72/96 |

OTHER PUBLICATIONS

Singh, et al. "Forestall Pump Damage in Reciprocating Positive Displacement Pumps". *Chemical Engineering Process*. Sep. 1996.

Volk, Michael W. "Pump Characteristics and Applications". Dekker, 1996.

Fitzgerald, W.V. "Control Valves: Give them attention before they fail". Fisher Controls Int'l, *Chemical Engineering*. May 1990.

Computational Systems, Inc. "Vibration Monitoring of Common Centrifugal Fans in Fossil Fired Power Generation", 1989.

Atkins, Robert A. et al. "New Monitoring System Warns of Cavitation and Low–Flow Instabilities". *Pump and Systems Magazine*. Apr. 1996.

Fitzgerald, W.V. "Automated Control Valve Troubleshooting: The Key to Optimum Valve Performance". Fisher Controls Int'l., ISA. 1990.

Coughran, Mark T. "Performance Influences in glove control valves". Fisher Controls int'l. *InTech*. Aug. 1996.

(List continued on next page.)

*Primary Examiner*—Kamini Shah
(74) *Attorney, Agent, or Firm*—Head, Johnson & Kachigian

(57) ABSTRACT

An apparatus and method for diagnosing rotating equipment commonly used in the factory and process control industry are provided. The apparatus and method are intended for use in assisting a maintenance engineer in the diagnosis of turbines, compressors, fans, blowers and pumps. The preferred embodiments are an apparatus and method for diagnosing pumps, with a focus on centrifugal pumps. The apparatus and method are based on the comparison of the current pump signature curves resulting from the acquisition of process variables from sensors monitoring the current condition of the pump and the original or previous pump performance curve from prior monitoring or knowledge of the pump geometry, installation effects and properties of the pumped process liquid. The diagnostic apparatus and method can be applied to any rotating machine, but the apparatus and method for pumps are described herein.

50 Claims, 51 Drawing Sheets

OTHER PUBLICATIONS

Yedidiah, Sam. *Centrifugal Pump User's Guidebook—Problelms and Solutions*. Chapman & Hall, 1996.

Fitzgerald, W.V. "FlowScanner Data Interpretation Discussion for Fisher Customer Training School 1426". 1993.

Jones, Henry. "Shedding Light on Vibration". *Mechanical Engineering*. Nov. 1996.

Ramden, Teresia. "Condition Monitoring of Fluid Power Pumps by Vibration Measurement". Presented at 10th International Conference on Fluid Power, The Future for Hydraulics. Brugge, Belgium. Apr. 1993.

Sorli, Arne. "New diagnostic Tool for use in condition monitoring of turbomachinery". MARINTEK ROMEX System. 1996.

TAS Software Products. "AQUATEC, Pump Selection and Engineering Application Package". No Date.

Test Data Systems Inc. "Automated Pump Test Systems". No Date.

Nelik, Lev et al. "Are Smart Pumps in Your Future?" *Pumps and Systems Magazine*. Mar. 1997.

TurboMonitor, Entek Product Literature. 1995.

PumpTrac Remote Pump Monitoring System. Ingersoll–Dresser Pumps. 1995.

Mackay, R.D. "Routine Pump Maintenance: Is it all Necessary?" Ross Mackay Associates Ltd. *Pump and Paper Canada*. 95:1. No Date.

Pumps and Systems Staff. "On–line Monitoring Yields Continuous Improvement". *Pumps and Systems Magazine*. Nov. 1996.

Johnson, Bruce A. "Digital Communications Reaches Final Control Components". Fisher Controls Int'l *Power*. May 1995.

Grumstrup, Bruce. "Smart valves open window to process". Fisher Controls International. *InTech*. Jan. 1995.

Status Technologies, Motorstatus—Preliminary Information, An Integrated 'Smart Sensor' for Condition Monitoring of AC Induction Motors. P/PM Conference. Nov. 1996.

Framatone Technologies. "Motor Operated Valve Evaluation Software—MOVE". No Date.

Liberty Technologies. "EMPATH, Advanced Analysis for Electric Motors". 1996.

Liberty Technologies. "Ultracheck, Non Intrusive Valve Diagnostics for Maximum Reliability". 1996.

Liberty Technologies. "Motor Performance Analyzer". Product Literature. No Date.

Liberty Technologies. "Motor Performance Tracker". Product Literature. No Date.

TAS Software Products. "TESTBED, Test Data Analysis Software". No Date.

PdMA Corporation. MCE (Motor Circuit Evaluator). Product Description. No Date.

Delzingaro, Michael et al. "A Primer on Check Valve Diagnostics". *Sound and Vibration*. Sep. 1996.

\* cited by examiner

Pump and Motor System

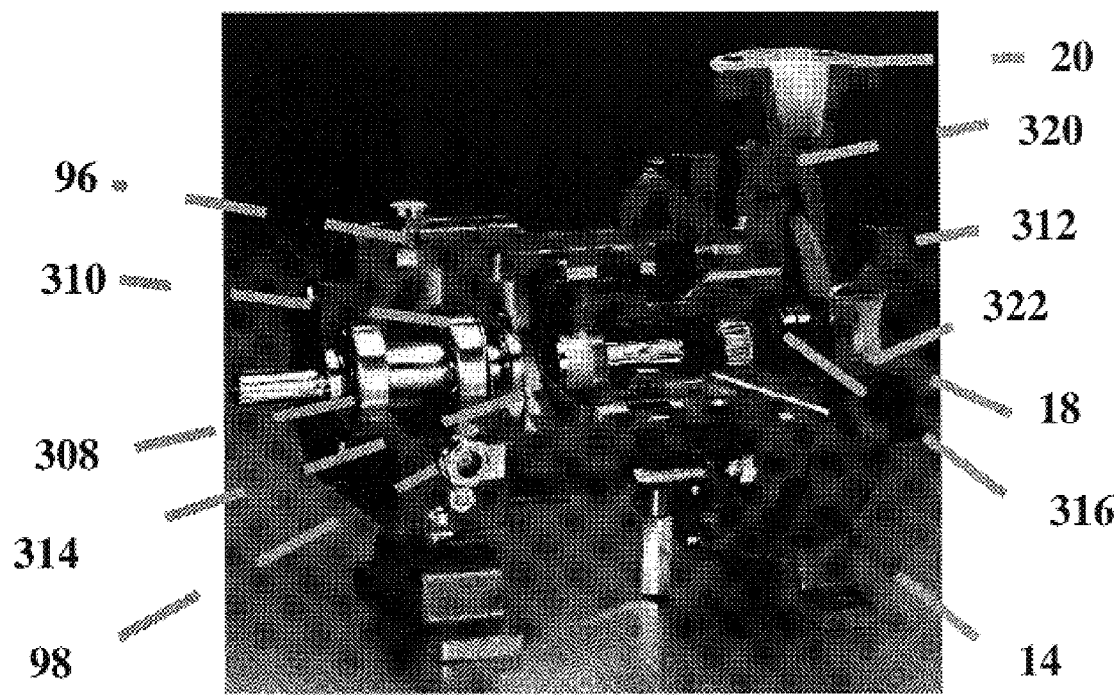
Figure 1b. Pump Cross Section

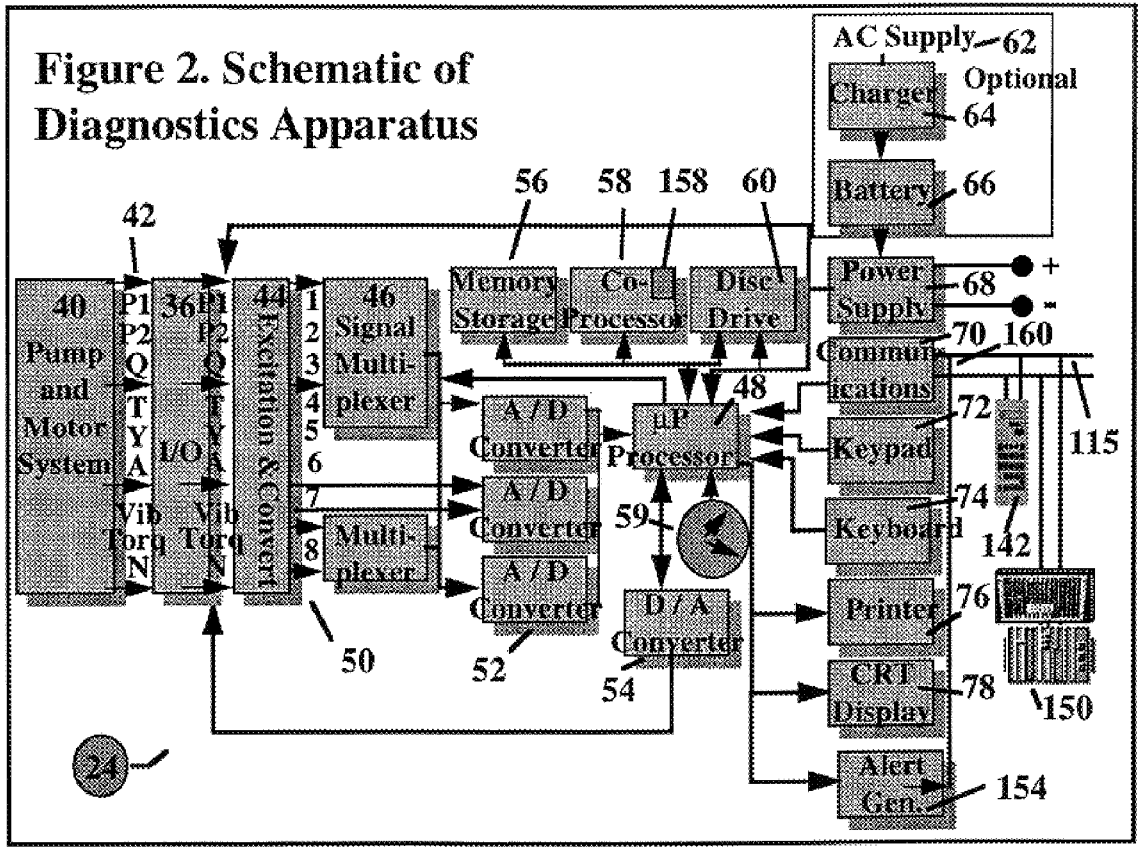

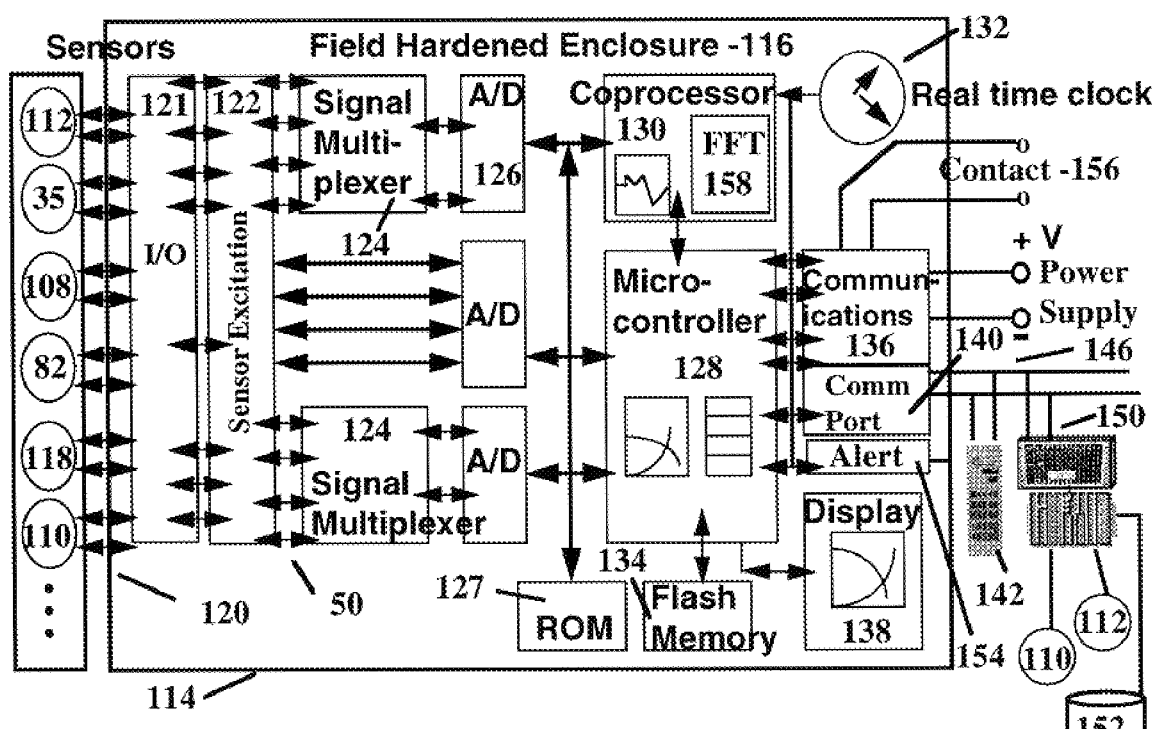
Figure 3. Schematic of Field Hardened Remote Diagnostis Apparatus

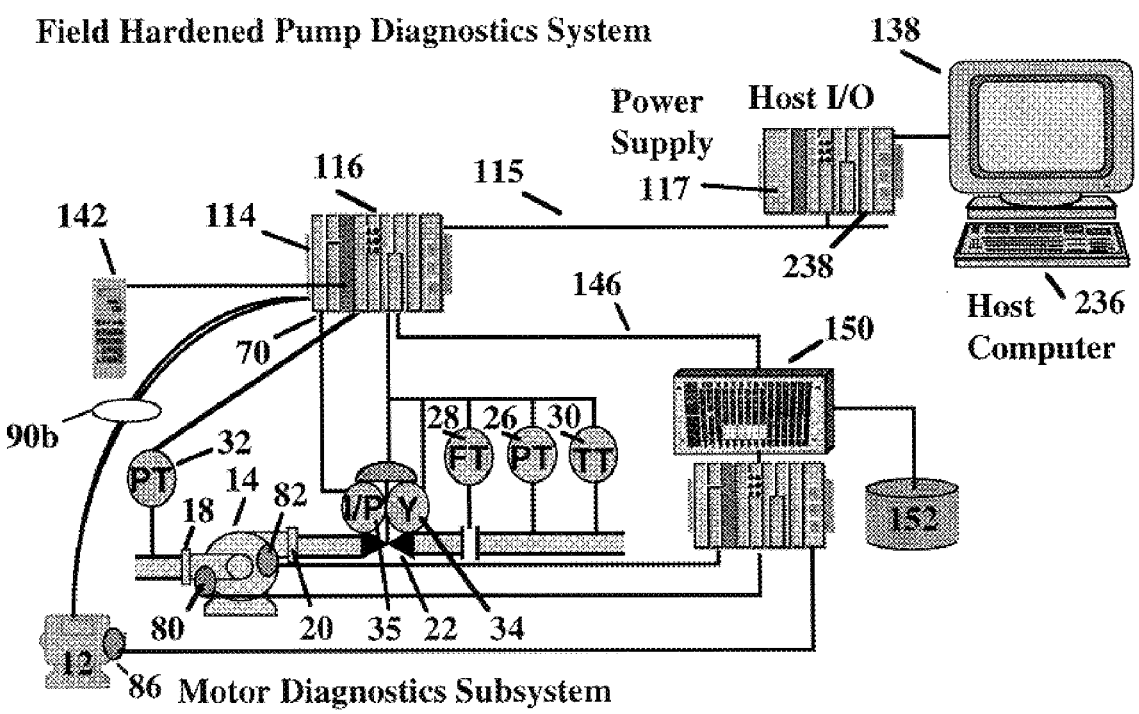
Figure 3a. Field Hardened Remote Diagnostics Apparatus

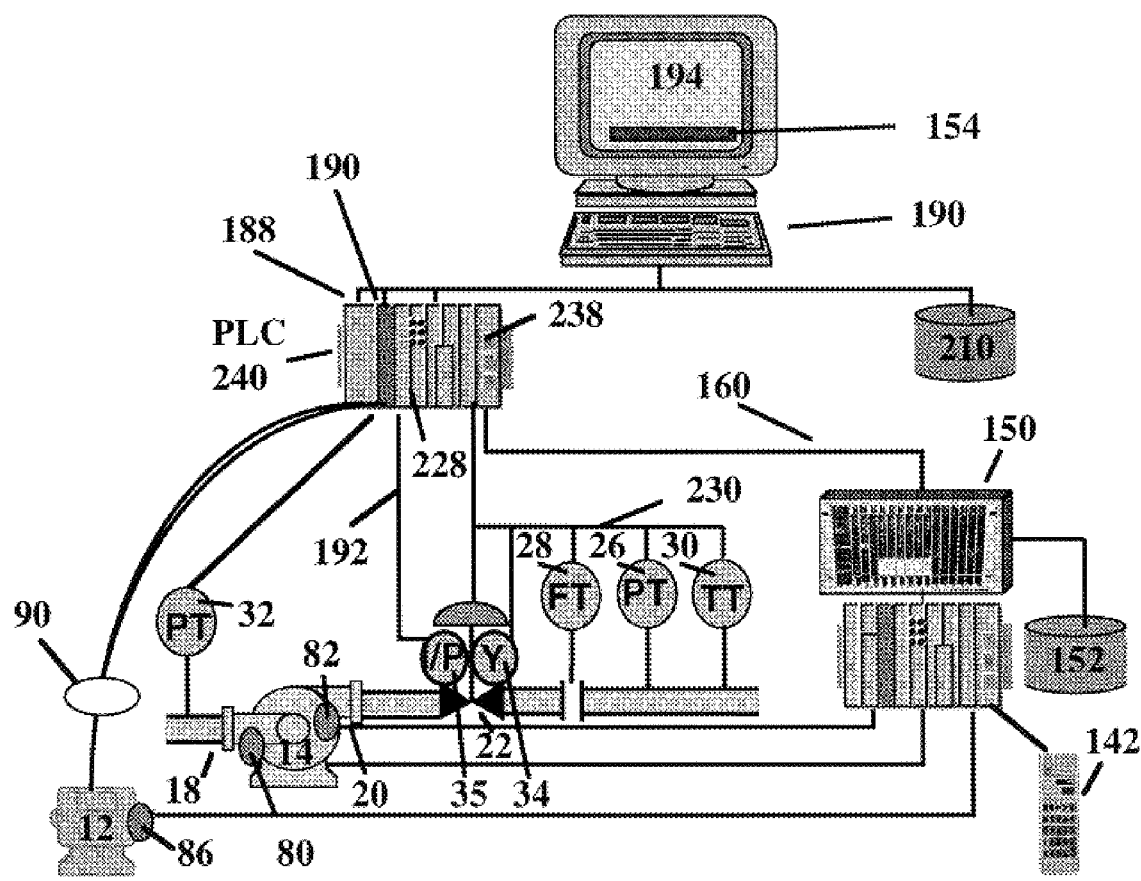
Figure 4a. Pump Diagnostics System Using PLC As a Platform

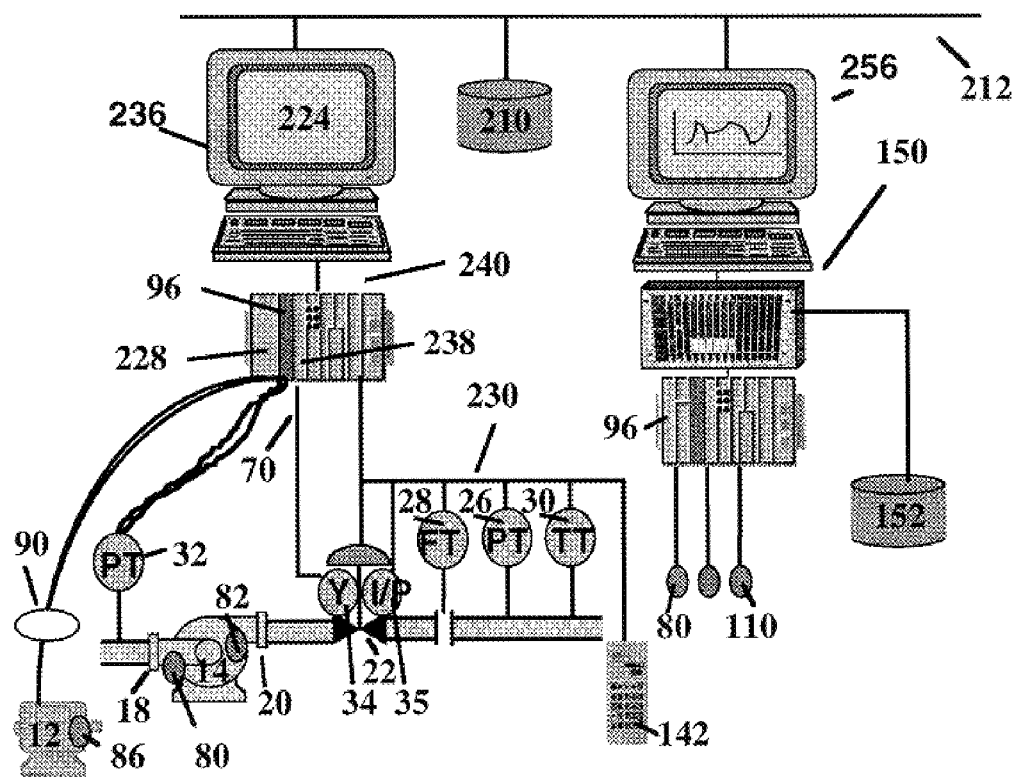
Figure 4b. Pump Diagnostics System Using Host Computer Platform

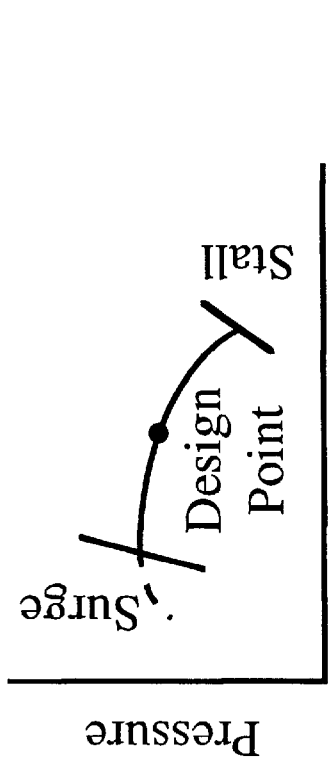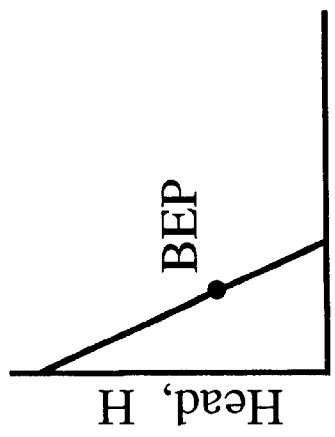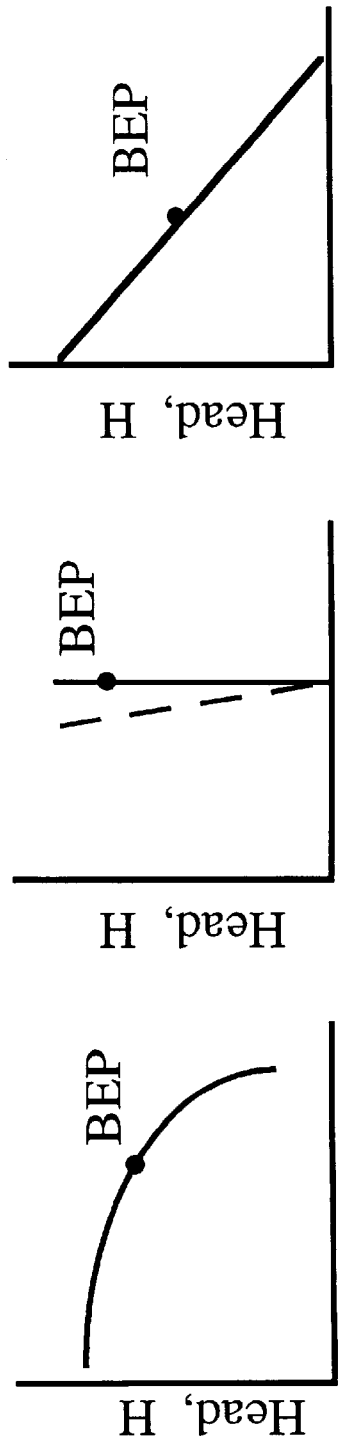
Figure 5. Rotating Machine Performance Curves

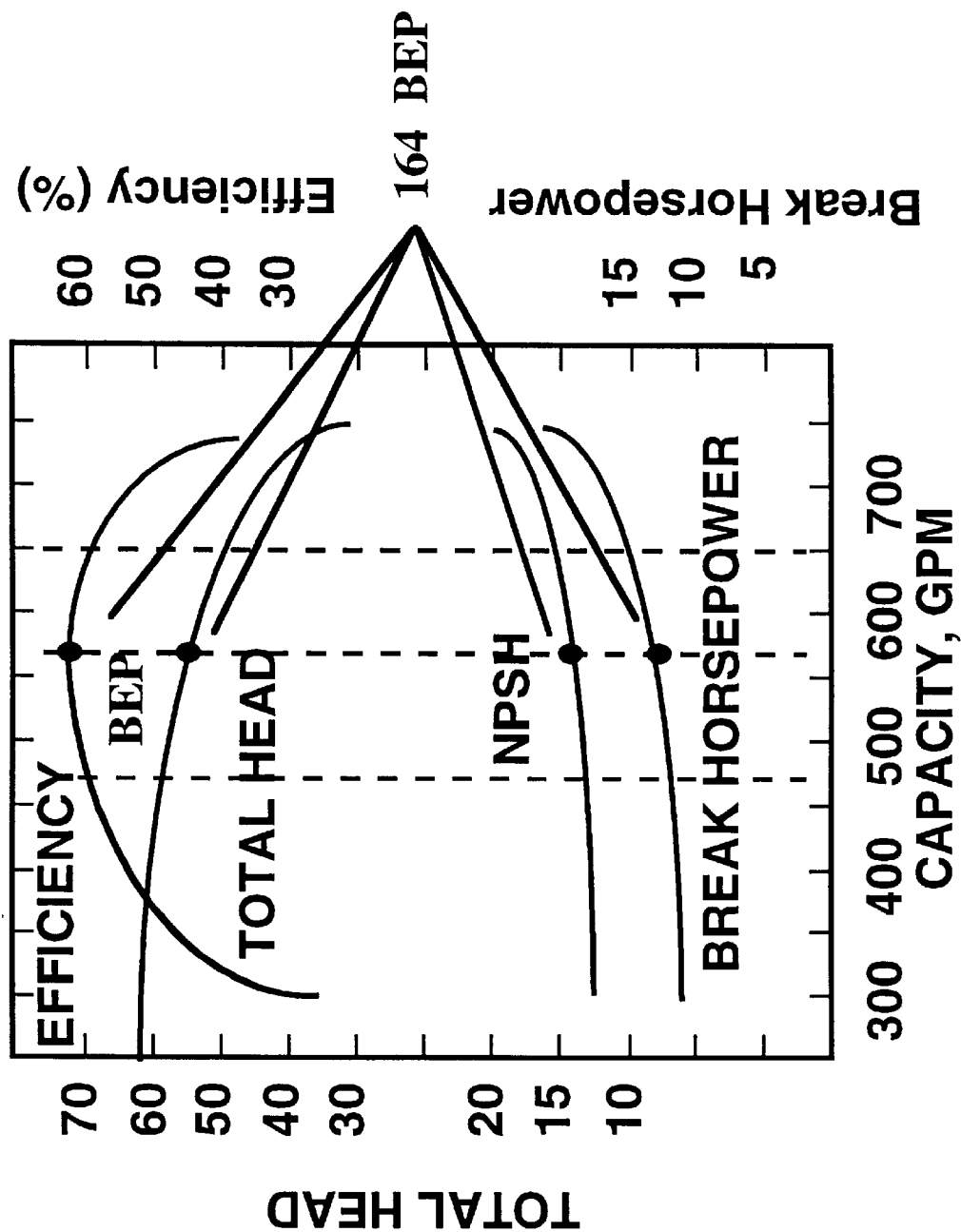
Fig 6. Manufacturers Pump Performance Curve

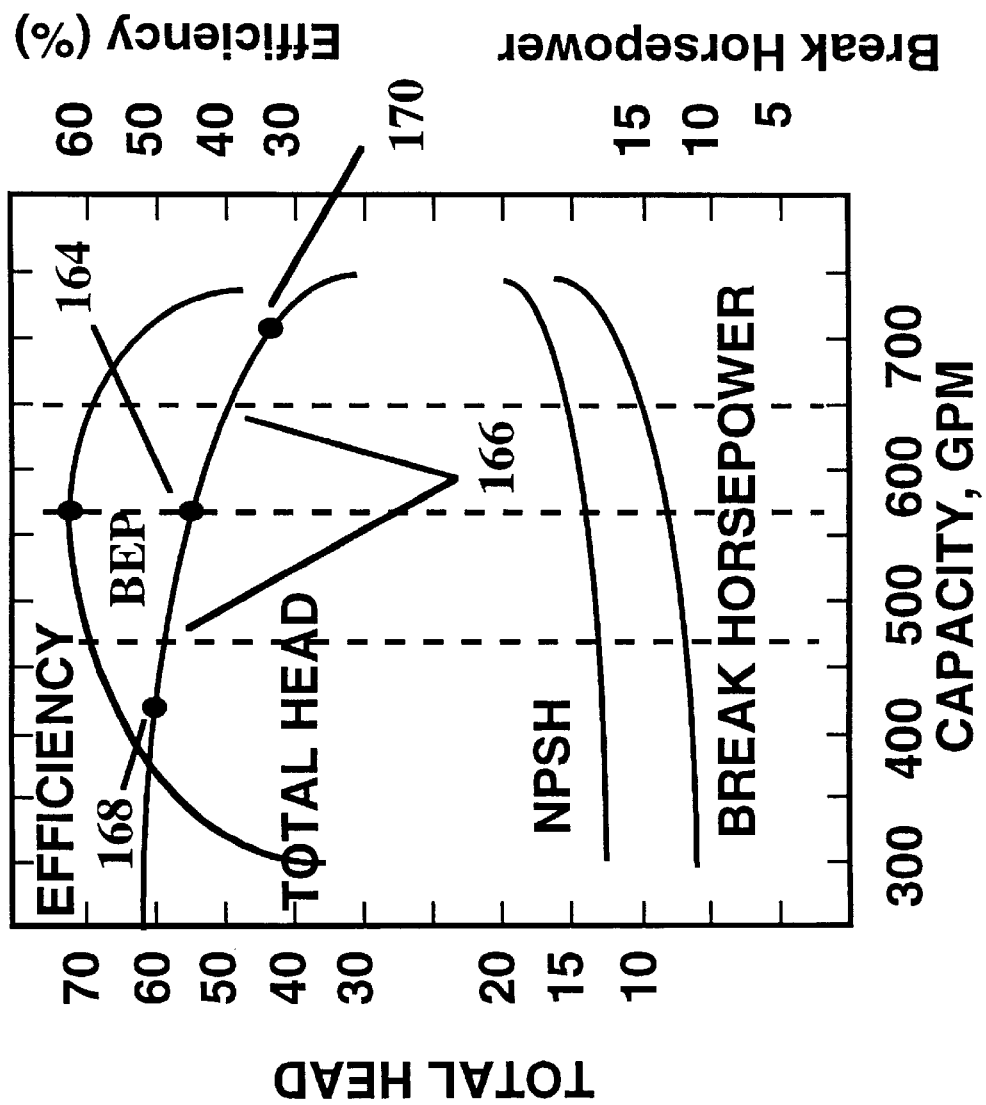
Fig 6a. Pump Performance Curve - Operating Point

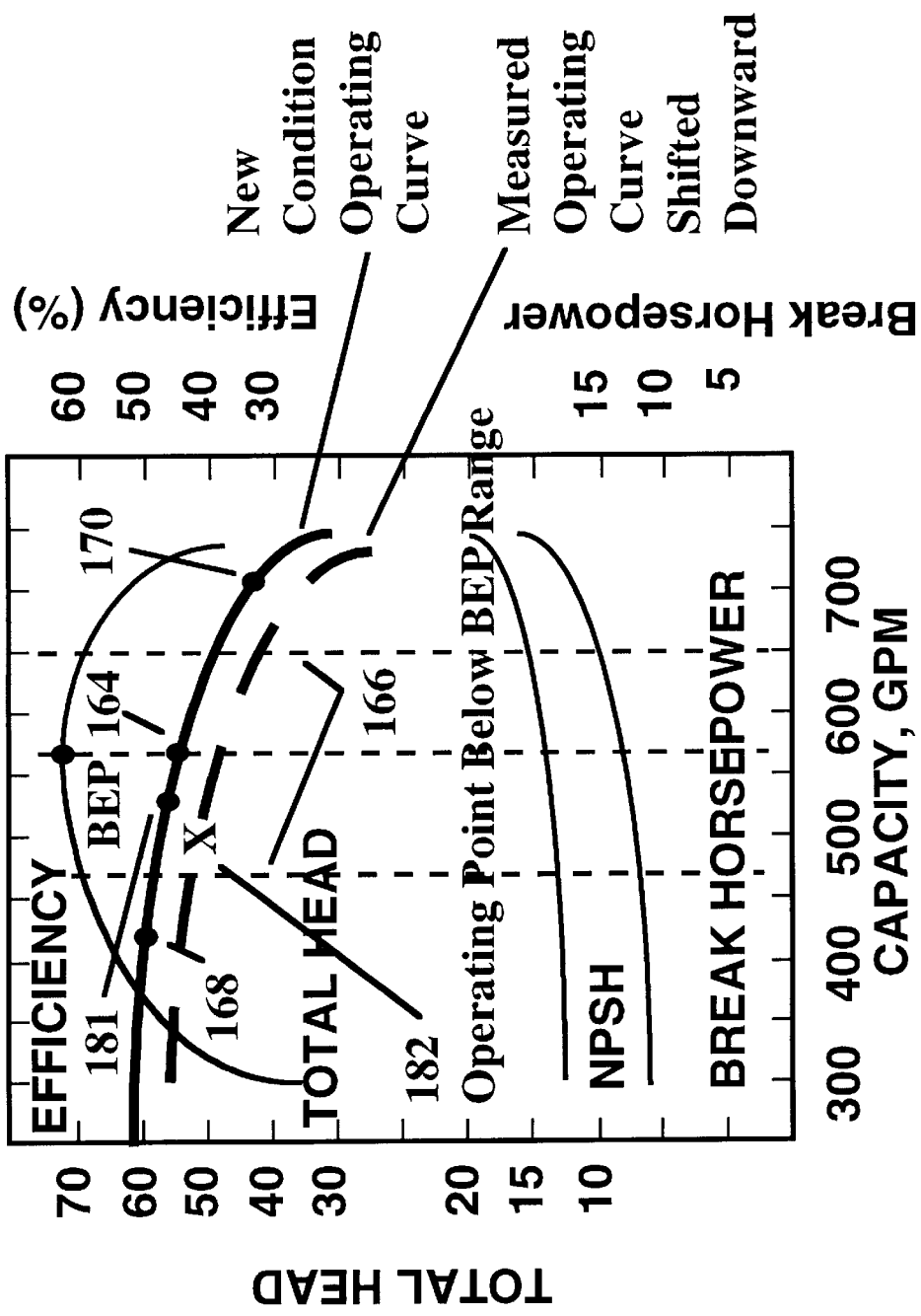
Fig 6b. Pump Performance Curve - Operating Point Below BEP, Performance Curve Shifted Downward

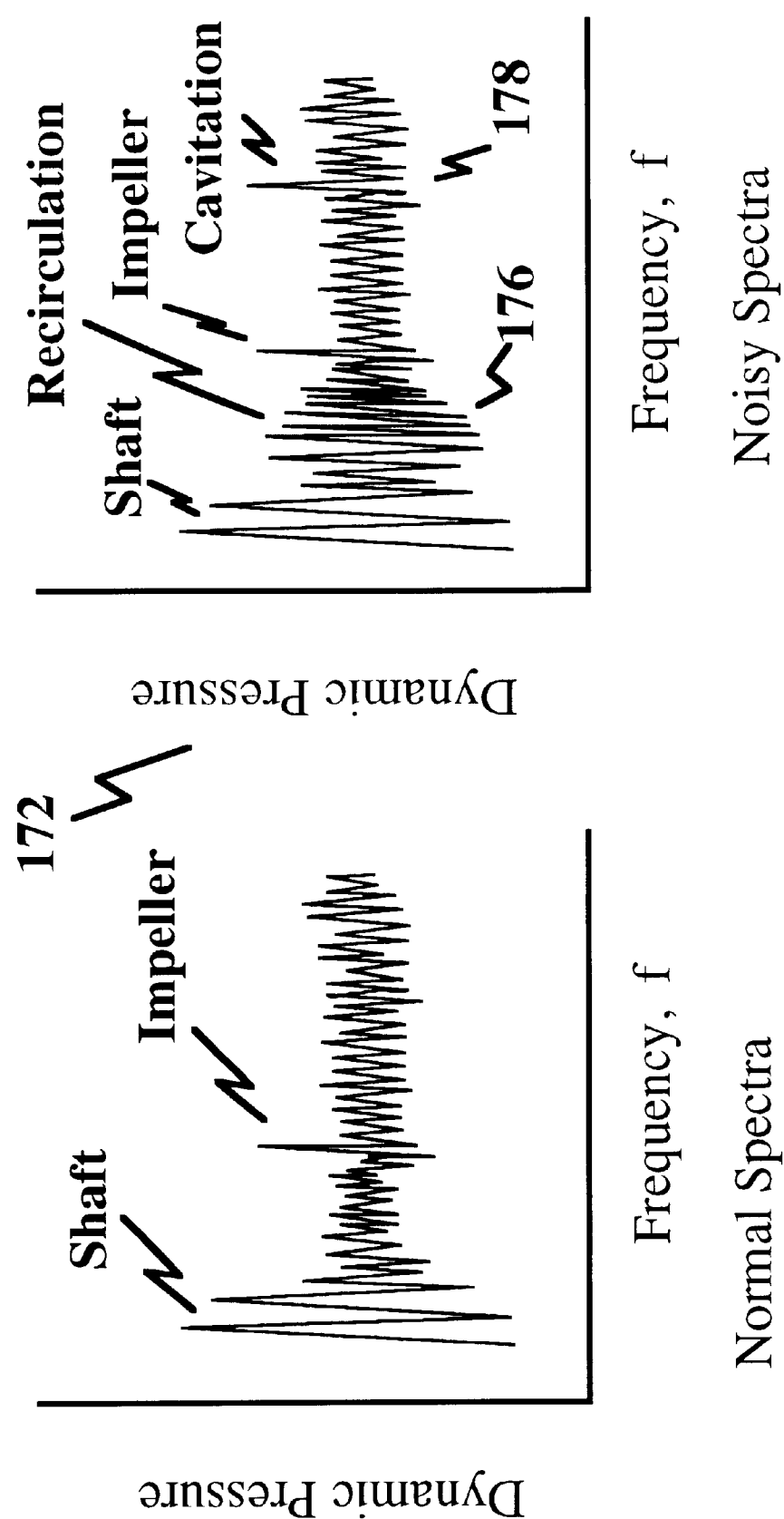
FIGURE 7a. Dynamic Pressure Spectra

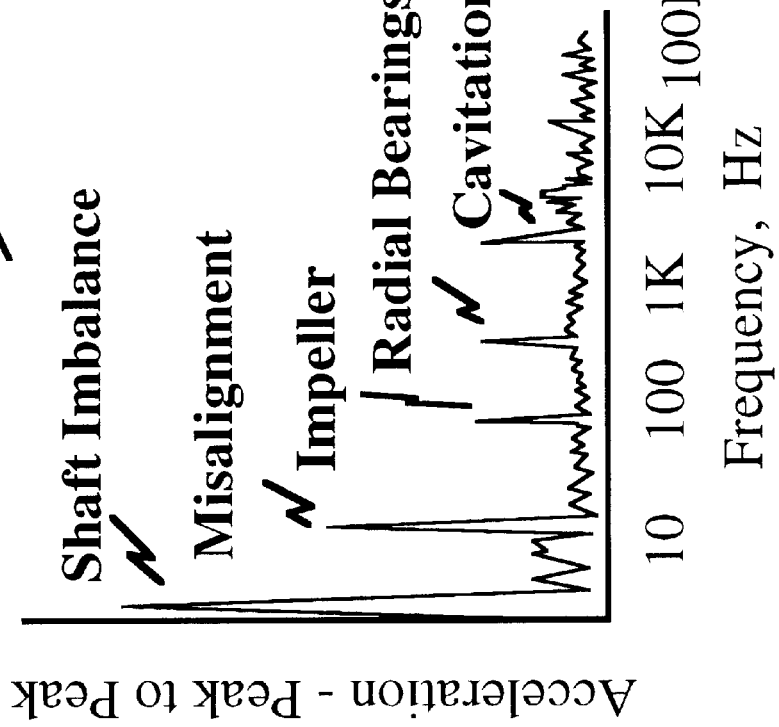
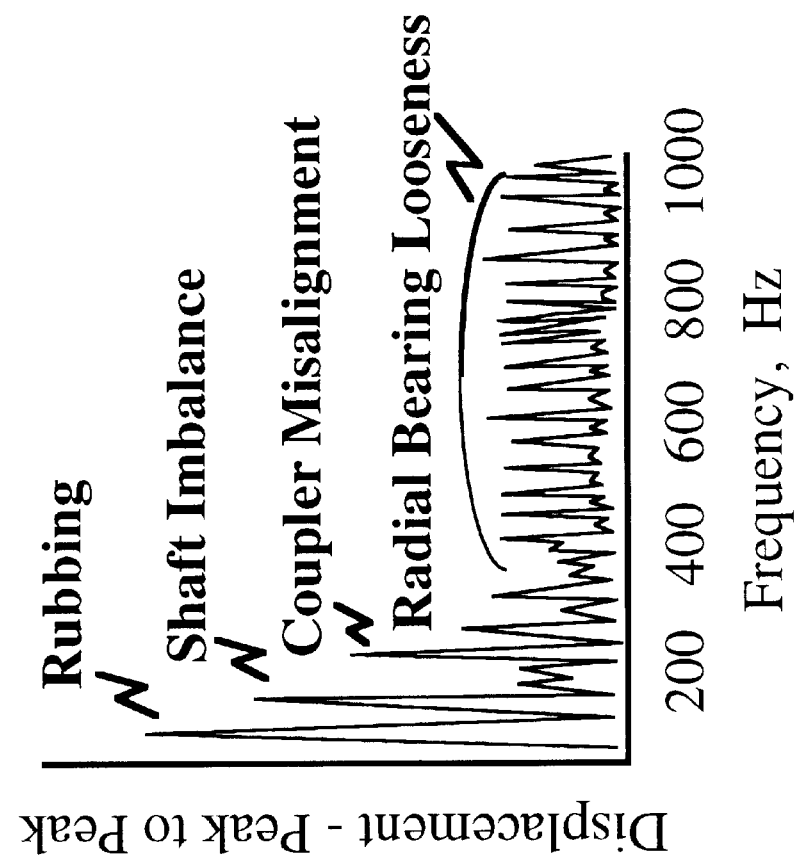
Figure 7b. Typical Vibration Spectra

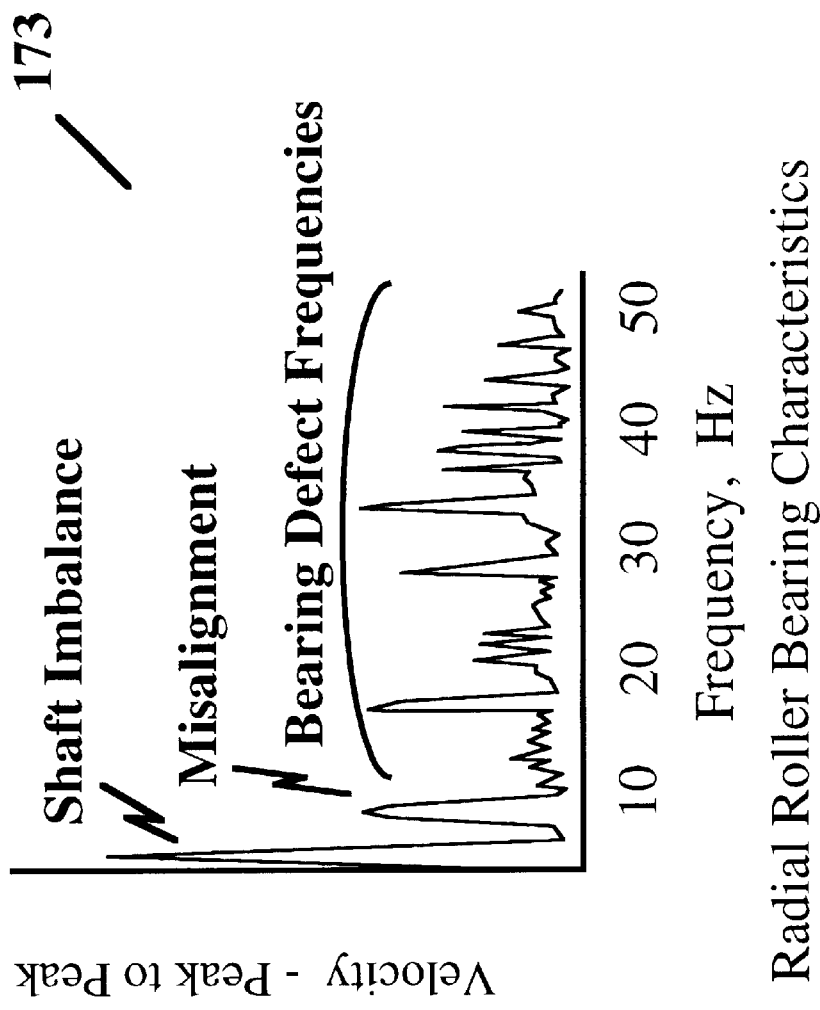
Figure 7b. contd. Typical Vibration Spectra

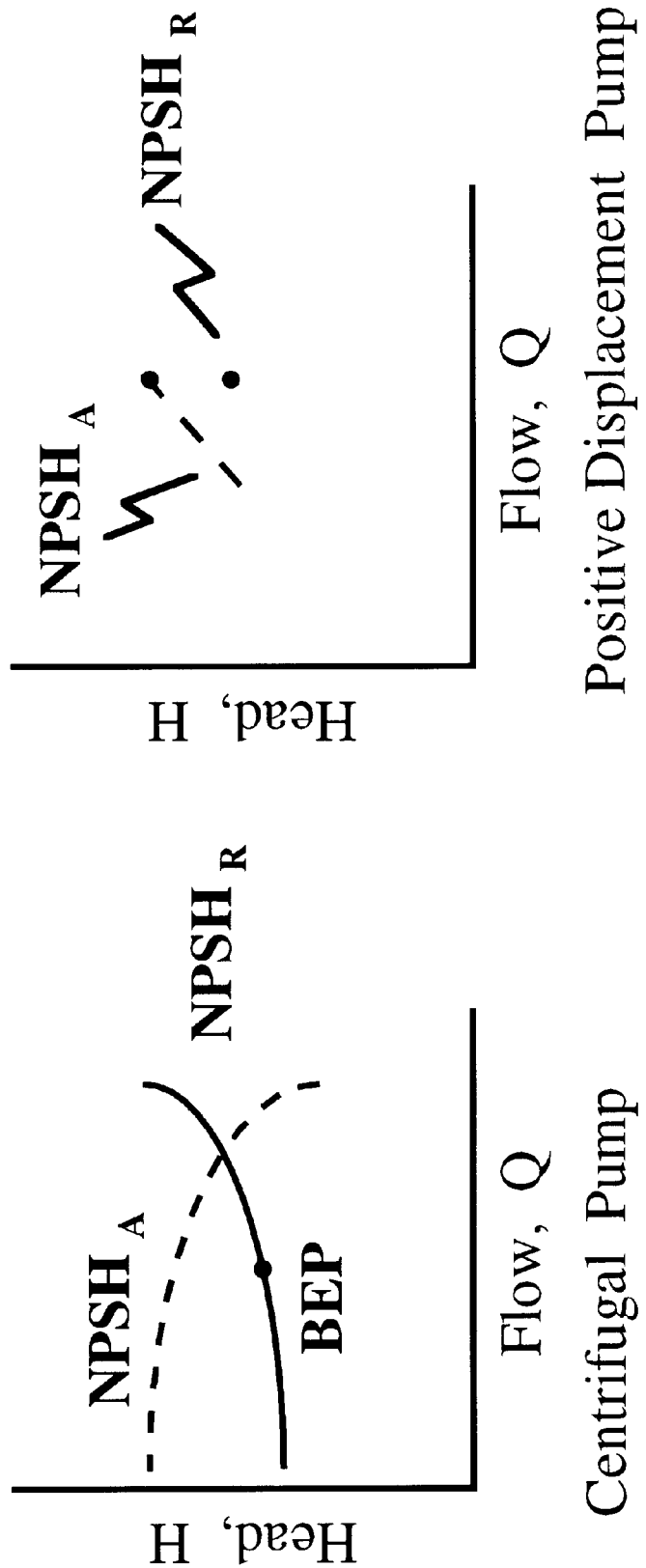
Figure 7c. NPSH$_A$ VS NPSH$_R$

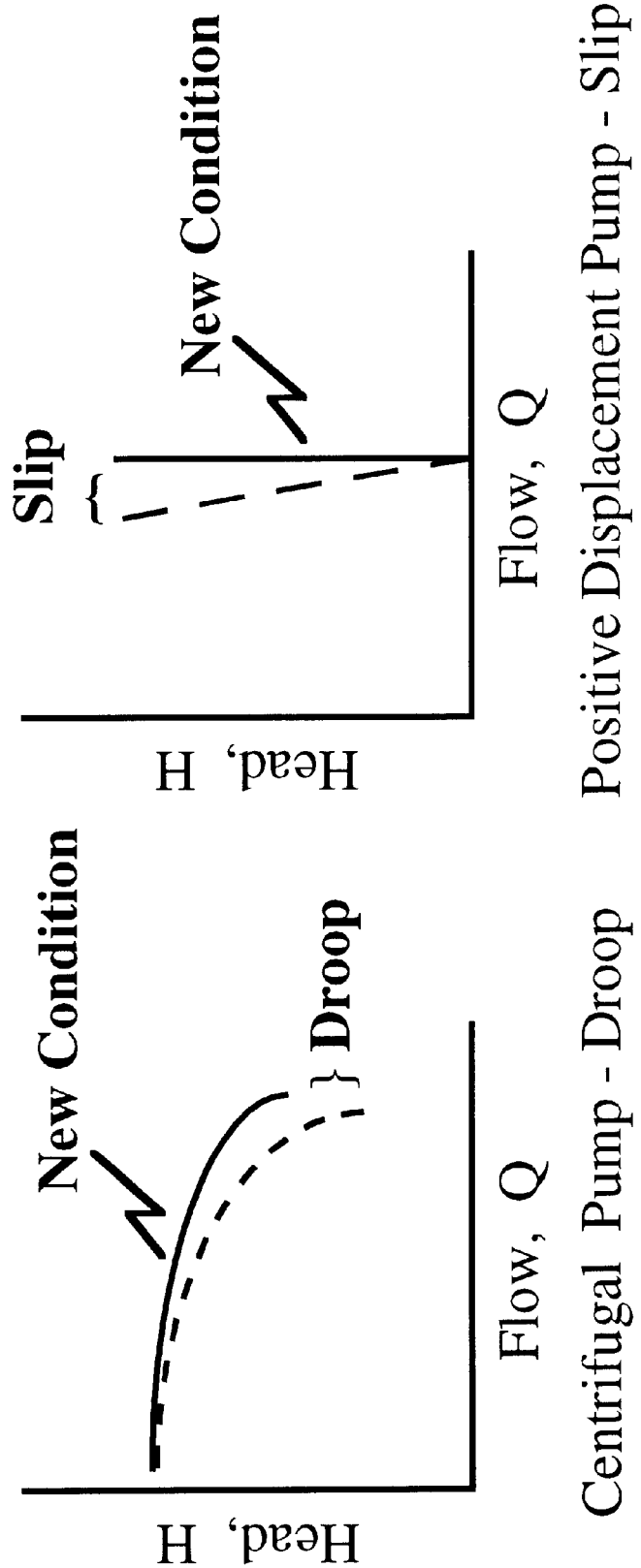
Figure 7d. Performance Curves - Droop & Slip

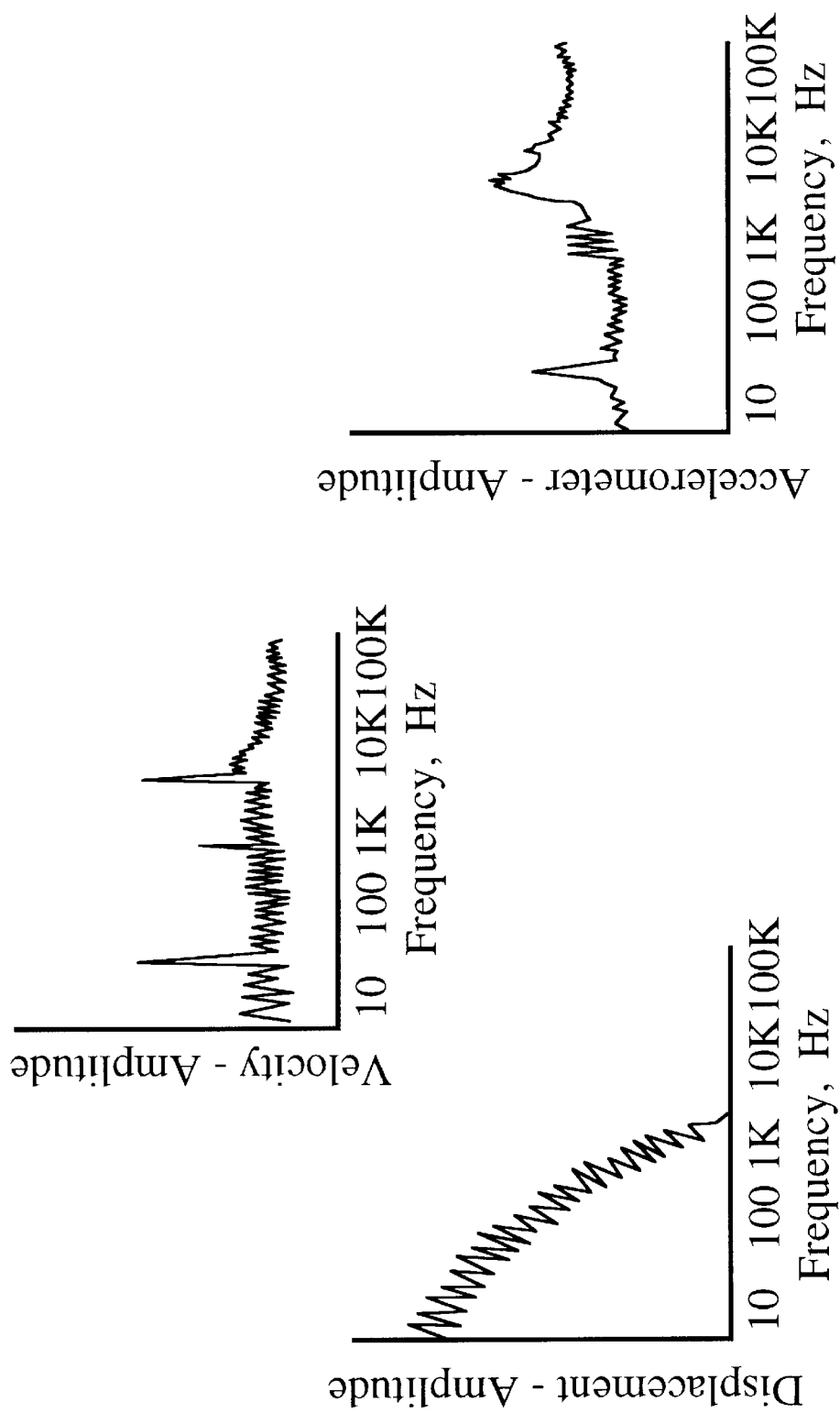
Fig 8. Spectra of Same Vibration Source Obtained with Different Types of Transducers

Figure 9. Pump Secondary Performance Curves
9a. Centrifugal Pump
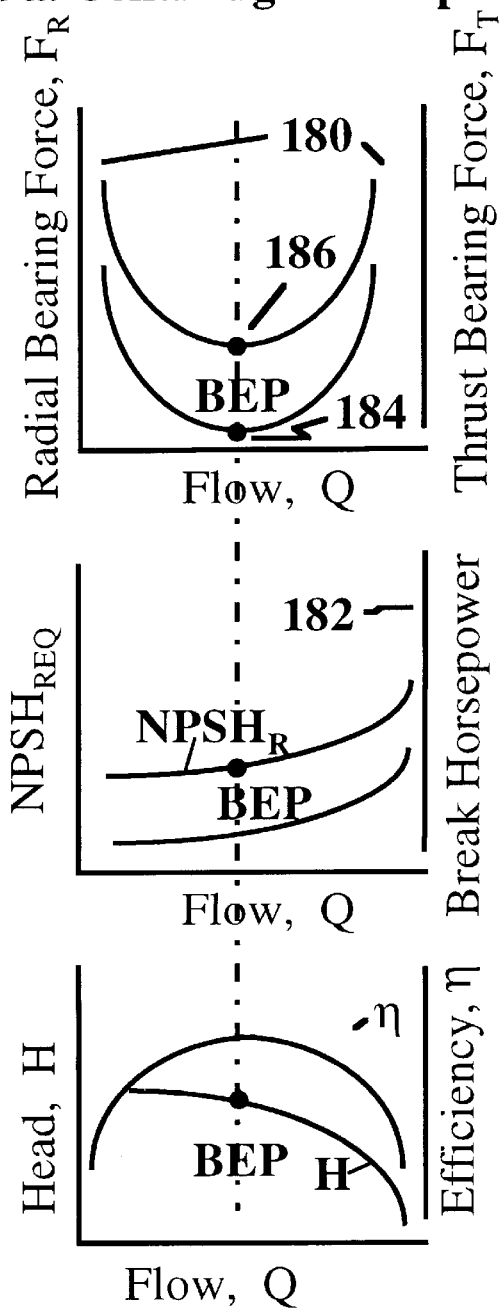
9B. Positive Displacement
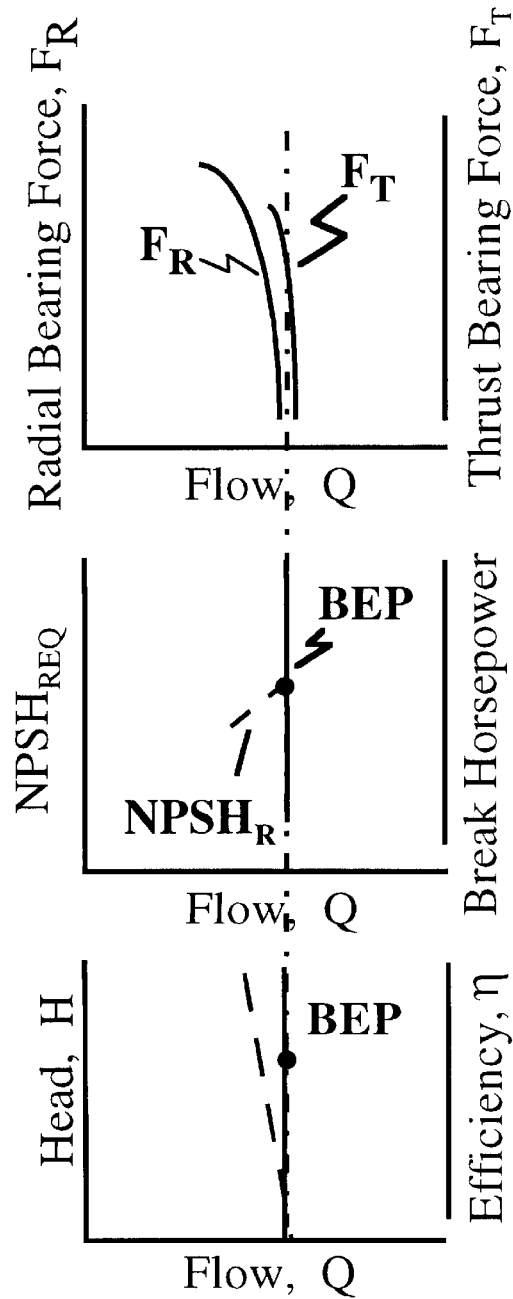

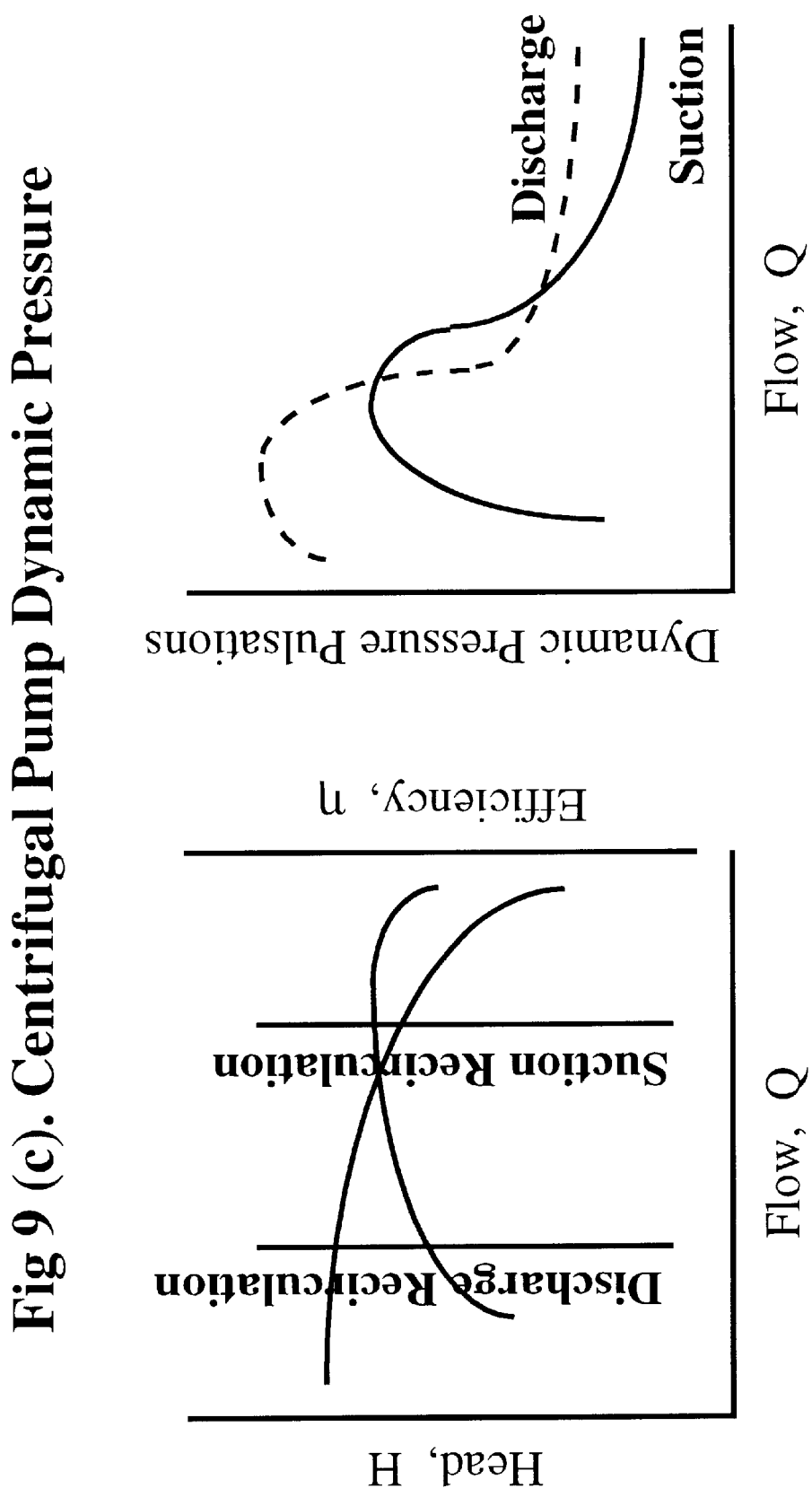
Fig 9 (c). Centrifugal Pump Dynamic Pressure

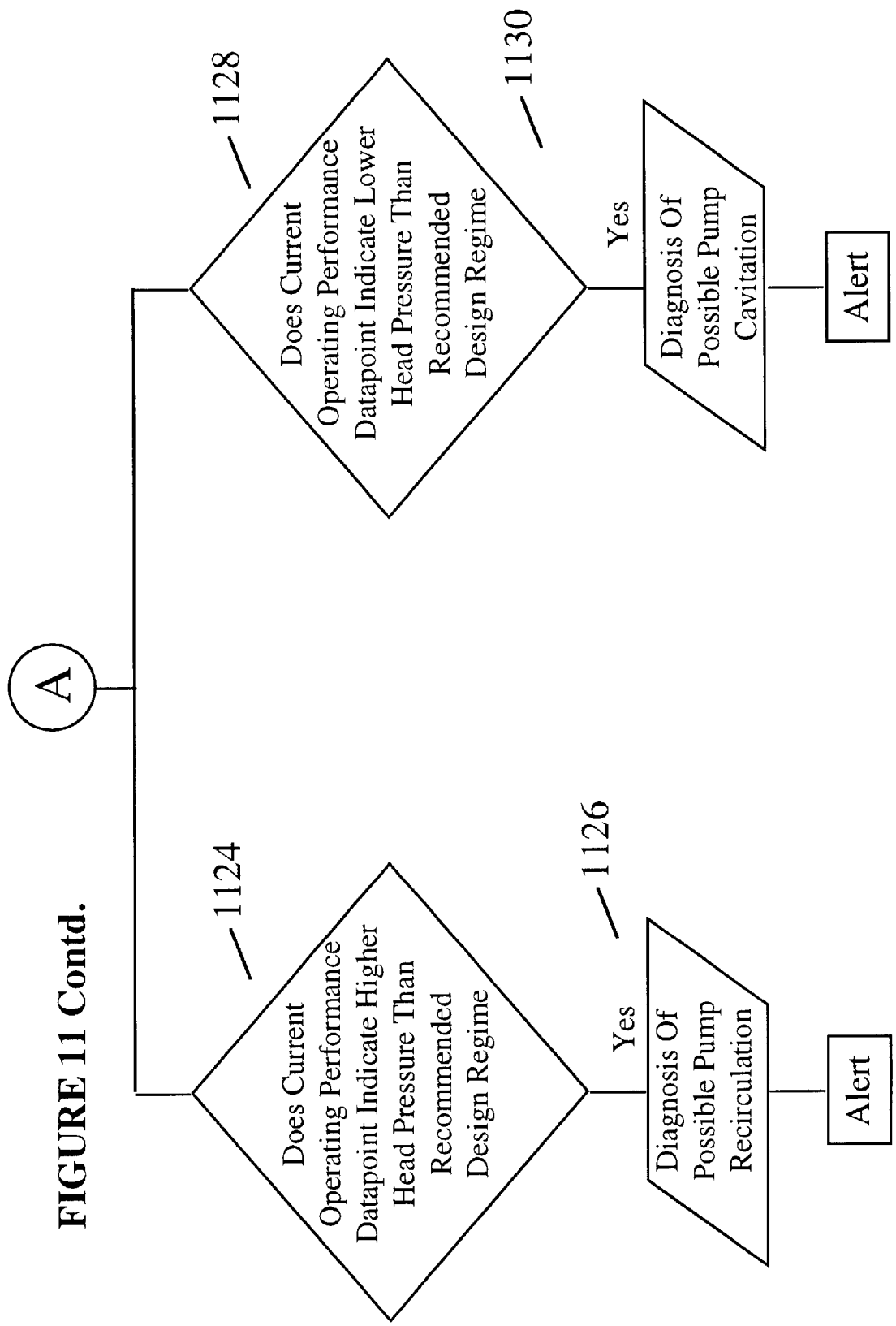
FIGURE 11 Contd.

FIGURE 30

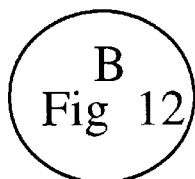

- Construct an original performance curve from original data — 3210
- Construct an original secondary curve from original data — 3212
- Construct measured performance curve from equipment condition monitoring variables — 3214
- Construct measured secondary curve from equipment monitoring variables — 3216
- Comparing the original performance and secondary curves with measured curves — 3218
- If change exceeds recommended value, generate alert — 3220
- Alerting a controller to correct pump operating conditions to within said operating design regime — 3222

METHOD AND APPARATUS FOR DIAGNOSING A PUMP SYSTEM

CROSS-REFERENCE OF RELATED APPLICATION

Not applicable.

BACKGROUND OF THE INVENTION

1. Field of the Invention

The present invention relates to a method and apparatus for diagnosing a pump system.

2. Background

Pumps are among the least reliable components in a process plant with the average Mean Time To Repair (MTTR) averaging two years. Recent advances in vibration sensor based condition monitoring are now routinely used to measure the vibration profile of a pump system to determine if large velocity or acceleration vibration levels are present. Such vibration levels are indicative of a failed or failing pump.

Pump maintenance is most often required due to operating a pump under conditions where bearing loads are high and where there is fluid induced damage to the impeller, i.e., cavitation and recirculation. The desirability of operating at the pump's Best Efficiency Point (BEP) is well known in the pump industry. At the to be at a minimum, vibration levels are lowest, and cavitation and recirculation are avoided. Examples of the impact on pump life due to off-BEP operation can be found in *Pump Characteristics and Applications* by M. S. Volk.

No commercial product, method or system has the ability to provide an operator or maintenance engineer with the actual operating pump performance curve and process operating point. An understanding of the operating point or range versus the intended operating range on a pump performance curve is key to operating a pump near its BEP and to diagnosing pump component damage when operating in off-BEP regions.

Vibration monitoring equipment such as that provided by Bently Nevada is well-known for condition monitoring of rotating equipment. The Bently Nevada system consists of sensors (typically accelerometers, displacement sensors, proximity velocity transducers and temperature sensors) that are appropriately mounted to rotary equipment such as turbines, compressors, fans, pumps and drive units such as motors.

Monitoring machine performance through vibration signature analysis is a practice spanning more than two decades. Many standards used for overall vibration measurements are based on specific rotational frequencies and integer multiples of these specific rotational frequencies. Vibration data is routinely collected either manually or with on-line systems from bearings on rotating machines. Bearing vibration measurements should include measurements in both the horizontal and vertical planes of each bearing. At least one axial vibration is made for each shaft.

Vibration readings on the bearing housing, using an accelerometer (acceleration) or a velocity transducer (velocity), provide sufficient data to detect the onset of bearing failure. Displacement or proximity probes measuring the motion the shaft relative to the bearing also provide useful data for diagnosing bearing failure. The motion of the shaft within the bearing as measured by the proximity sensor is commonly called an "orbit".

Rotating machines and pumps, by their very nature are dynamic machines. Vibration and proximity sensor data is also dynamic and is typically collected as trend data, FFT and waveforms. Most faults are identified by distinct frequency peaks or patterns and therefore frequency bands may be defined which bracket specific faults. These bands may be specifically scanned for amplitude changes which signal the need for further analysis. These scans will include comparing recorded vibration levels against alarm levels as well as a statistical analysis of variation and comparison to baseline values. The defined frequency bands will include the calculated or measured resonant frequencies of the major rotating machine mechanical components such as the shaft, impeller, radial bearings and thrust bearings. Analysis of vibrational data to identify known faults are further described in the CSI Application paper:

"Vibration Monitoring of Common Centrifugal Fans in Fossil Fired Power Generation".

Further analysis will include a review of the amplitude and phase versus frequency spectra, sometimes a referred to as the Bode plot, for the proximity and vibration sensors. Multiples of the machine component resonant frequencies, commonly termed harmonics, are also examined.

These known vibration monitoring techniques are applied in combination with the rotating machine performance curves to provide for root cause analysis the rotating machine in a method previously not performed.

The sensors are mounted for the purpose of detecting impending motor bearing or pump bearing failures through sensor signal analysis using conventional spectral analysis such as the Fast Fourier Transform (FFT).

The use of a vibration spectra is well known, but such use often requires a human expert to examine the spectra and deduce damage. Expert analysis is required since the frequency components for all of the mechanical components (bearings, impeller, piping, etc.) are all present at the same time. Therefore, discrimination of the vibration by component requires substantial skill. As vibration sensors provide a spectral output (frequency domain), the vibration peaks correspond to a multiplicity of failure modes that may be present at the same time. A single vibration spectra is likely to show the shaft frequency, impeller frequency, radial bearing fundamental frequency, thrust bearing fundamental frequency, motor harmonic frequency, pump/piping resonant frequency, mounting plate frequency, etc. In addition to these fundamental frequencies, the harmonics or multiples, and submultiples of these frequencies will also be present.

Traditional condition monitoring systems are used to detect damage that has already occurred to a rotating machine. The pump diagnostics method is able to detect rotating machine operating conditions that may lead to pump damage. The pump diagnostics method also provides an ability to focus the maintenance engineer or technician to examine a specific area of vibration spectra for evidence of a pending failure detected through knowledge gained from the pump performance signature.

Additional analysis is provided through the measurement of the pump to motor shaft alignment using position or proximity sensors and through the measurement of the shaft "orbit" within the bearing. Temperature measurements are strategically positioned to provide data on bearing "hot spots". Bently's system provides for off-line or "pseudo real time" acquisition of the above data and field processing of the sensor dynamic data which can be communicated to a centrally located display for viewing either via a proprietary communication or the Modbus protocol. Real time analysis has not been possible in the past due to bandwidth limitations in communications protocols.

Vibration sensors (piezoelectric accelerometers, velocity transducers and proximity sensors) are available from many suppliers such as Bently Nevada, Vibrametrics, Dytram and CSI and are often used with FFT algorithms for determination of vibration spectra for rotary equipment.

Vibration monitoring systems are available in portable "walk around" versions versus in situ systems where the vibration spectra is measured periodically. These portable vibration systems can provide for diagnosis of bearing failure, but are not as effective in determining the "root cause" for the bearing failure.

A diagnostics method is needed that provides for guidance in the repair of a failing pump, but most importantly, provides the operator with a root cause analysis that enables elimination of the cause of failure, which is often operation of the pump outside the BEP range. Available condition monitoring-only solutions provide limited guidance on elimination of the cause of failure as they observe the failure of the mechanical components, but do not identify the operating condition that caused the failure.

a. Electric Motor Diagnostics

Several manufacturers provide partial solutions for the off-line diagnosis of electric motors. Framatome and Liberty Technologies both provide for PC based electric motor diagnostics systems consisting of vibration sensors to detect motor bearing failure, a measurement of motor voltage wherein current and phase are coupled to an FFT for the calculation of a motor signature, and temperature sensors to sense elevated motor winding temperatures and, in some cases, flux analysis, and insulation characteristics of the motor windings and shaft alignment sensors to measure motor-to-coupler alignment.

CSI has recently announced a motor diagnostic system that provides data logging of key motor diagnostic attributes that are manually collected and uploaded to a PDM device at regular intervals.

Siemens has a smart motor system that provides pseudo real-time diagnostics information such as that summarized above via a sensor system connected to a field mounted motor analysis computer.

Current motor diagnostics systems capture only motor and motor power related diagnostic information such as power (P), voltage (V), current (I), phase (Ø), and flux (f). Current systems do not have the ability to look at the influence of the rotating machine (load) and its influence on the motor.

b. Alignment Systems

The need to provide for precise alignment of the pump and driver source through a coupling means or intermediate gear box is well known. A number of suppliers exist for the systems to facilitate optimum alignment of the pump to power source. Such systems may include traditional dial indicators, electronic position sensors and most recently laser alignment systems such as the ones manufactured by Vibra Align Inc. and Ludeca, Inc. These systems provide assistance to the pump technician for the installation or validation of proper motor and driver alignment with the pump. Many alignment systems provide an electronic output that can be displayed at the pump in the field.

c. Pump Diagnostic Systems

Pumps are one of the least reliable devices in a process plant. The proper pump selection and application, installation, use and maintenance must be assured for long life.

Pump manufacturers such as Gould Pumps commonly provide a pump performance curve with each pump. A pump curve is intended to assist a user in properly selecting the correct pump and pump impeller as well as to assist a user in operating a pump in the most efficient manner while producing the desired flow and pressure (head). Pumps are often used with constant speed power sources such as a 1800 RPM electric motor, or with a variable speed drive (VSD) where the pump speed can be changed to vary the pump flow and head output. When pumps are used with variable speed drives, distinct pump performance curves can be provided by the manufacturer at each desired speed. However, such curves are often calculated using the pump affinity law from the originally provided pump curve. The pump affinity laws are well known and are described in Yedidiah, *Centrifugal Pump User's Guidebook*.

Several manufacturers use commercial personal computer systems for the measurement and calculation of the pump performance curve at the factory for new or repaired pumps. These systems are sometimes used by pump manufacturers to calculate and is provide the pump performance curves for the end user. These systems may include sensors for determining pump shaft speed (RPM), inlet and outlet pressures, outlet flow, shaft horsepower (brake horsepower) and fluid temperature. Standard algorithms, such as those described by Yedidiah, author of *Centrifugal Pumps User's Guidebook*, are applied to provide the pump performance curve.

MARINTEK has undertaken work for the development of a knowledge-based diagnostics system called ROMEX, which is designed for rotating machines. The ROMEX system is a PC-based system which integrates data from commonly used condition monitoring systems and covers mechanical and performance related faults with coverage of the rotating machine rotor, stator, coupler, bearing, blades, aerodynamics and combustion chamber for gas turbines. The ROMEX system does not use a pump performance curve as a method for diagnosing possible off-BEP operating conditions or changes in the pump performance curve as a primary source of diagnostics for pump maintenance.

d. Pump Sensor Fusion

Recent published research from the Colorado School of Mines and their SHARP system (System Health Assessment and Real-Time Prediction) suggest that a diagnosis of pump health can be made via the fusion of physical variables such as pump inlet pressure, outlet pressure and flow in conjunction with a large artificial intelligence system made by Gensym. Artificial intelligence expert systems are used with some maintenance systems and often involve hundreds and even thousands of rules necessitating a large and expensive computing workstation. The SHARP system does not use the pump performance curve as a primary source of diagnosis for pump maintenance.

e. Pump Field Diagnostics Systems

Ingersoll-Dresser Pump has a remote pump monitoring system tradenamed PumpTrac® which provides for the collection of vibration data, physical process variables including pressure, flow, temperature and motor amperage. The monitoring systems provide for the trending and data logging of input variables, an alarm mode for each variable and a phone modem connection for alerting a plant operator of an alarm. The system is able to provide pump variable monitoring for up to eight pumps.

Ingersoll-Dresser's PumpTrac Remote Pump Monitoring System has a hardened pump diagnostics system with I/O that displays local trending data of the input sensors, typically pump inlet and outlet pressures, process and gearbox oil temperatures, flow and vibration condition monitoring sensors. The display provides trend displays for each variable with the ability to display multiple windows so visual correlation of process variable trends with vibration can be made.

Further, the Ingersoll-Dresser system has the ability to set soft alarm points that can be actuated when an alarm point is exceeded. In one option, a soft alarm can actuate a traditional modem built into the system to call a predetermined number to indicate what variable has been exceeded with data messages or a pre-recorded message.

The Ingersoll-Dresser device requires AC power and a dedicated telephone line. The system is not networked with process industry standard protocols and the use of AC power prevents certification to industry electrical intrinsic safety standards.

The Ingersoll-Dresser PumpTrac system provides the variables needed to establish a pump performance curve described in the present application, but does not provide the pump curve. However, the PumpTrac system does not provide for use of the secondary performance curves which provides a basis for root cause analysis of pump component failures, which is described in the method herein.

f. Field Diagnostics Systems

Field diagnostics systems are known for air operated valves and motor operated valves such as commercial systems available from Framatome, ABB, Liberty Technologies and Fisher Controls. There is no known field diagnostic for rotating equipment.

g. Point Diagnostics Devices

Several manufacturers provide sensors that can be applied to a pump system for the partial determination of pump health. These sensors may measure the corrosion of the pump casing based on a thickness measurement through ultrasonic thickness detection systems such as those manufactured by Stresstel, or by corrosion sensors such as those manufactured by Diagnetics. Similar portable monitoring devices, such as manufactured by Vibrametrics, provide point measurements of pump casing corrosion and thickness.

Pump and gearbox oil contamination and breakdown are commonly known problems with pump systems. In situ measurements of oil conditions can be provided by devices such as the Digital Contamination Alert particle counter provided by Diagnetics or through taking oil samples for off-line laboratory analysis.

High bearing stress resulting from operation outside said design regime will lead to bearing degradation. Bearing degradation can be detected via vibration monitoring. If degradation is severe enough, bearings will exhibit wear, which can be detected by oil sample analysis for wear particles.

None of these techniques identify improper operation which results in equipment stress leading to progressive damage, and ultimately, failure.

h. Need For Root Cause Analysis Method and Apparatus

Consequently, there is needed a rotating equipment diagnostic method and apparatus that identifies the operating conditions which create damaging stress to said equipment.

Further, there is needed a diagnostic method and apparatus that is effective in determining the root cause for bearing failure of rotating equipment. Additionally, there is a need for a diagnostic method that provides guidance in the repair of a failing pump by supplying the root cause analysis to an operator. By supplying root cause analysis to an operator, the diagnostic method enables elimination of the cause of failure.

Further, a system that has the ability to look at the influence of a load from a rotating machine.

A system is further needed that uses a pump performance curve as a method for diagnosing possible operating conditions outside of the recognized, recommended operating design regime or BEP.

Still further, there is a need for a system that does not require large and expensive artificial intelligence computing workstations yet still accomplishes the forgoing function.

There is further a need for a second level of pump component diagnosis that provides an ability to conduct root cause analysis of a pump or rotating equipment failure or an operating condition responsible for the failure.

SUMMARY OF THE INVENTION

The present invention provides an apparatus for a diagnostics system for rotating equipment commonly used in the process control industry. Also provided is a method for diagnosing rotating equipment commonly used in the factory and process control industry.

a. Apparatus

The system apparatus is intended to provide diagnostics of impending failure of turbines, compressors, fans, blowers, generators and pumps. The system can be effectively used for validating correct installation of a rotating machine and ancillary equipment attached to the machine. The system may also be used to diagnose change in the operating condition of a system for purposes of diagnosing maintenance and/or diagnosing change in the operation and control of the system. Additionally, the system may be used to verify that maintenance was properly conducted through a validation of the performance signature curves on the newly installed equipment, and acquisition of equipment base line performance data for use with maintenance information systems to provide a maintenance records audit trail. Further, the system may be used for continuous monitoring of rotating machine health and for advising a control system operator of operation outside of a recommended design regime or BEP operation to provide the opportunity to correct the machines operation conditions to BEP regime for reducing pump wear.

The apparatus can be applied to diagnose any rotating machine. However, the preferred embodiment of this apparatus is for the diagnosis of a pump system.

Thus, the present invention is a rotating equipment or pump diagnostics system intended to provide field diagnosis of a rotating equipment or pump system, which includes rotating equipment, such as a pump and, optionally, rotating equipment or pump system ancillary components, such as a coupler for connecting the rotating equipment to a driver source, or pump to a driver source or gear box and a driver source and a driver source controller. The driver source is typically an electric motor, diesel engine or turbine, and the driver source controller is typically a motor control system or variable speed drive and measurement devices for key process and equipment monitoring variables.

The pump diagnostics method will be most frequently embedded in firmware resident in a microcontroller in the pump diagnostics apparatus.

Four embodiments of the pump diagnosis apparatus are envisioned. The embodiments will have a common set of core elements, with additional elements provided to optimize the apparatus for its intended end use.

Apparatus Common Elements.

Elements common to all of the apparatus embodiments described include:

(a) sensors for process control variables and condition monitoring and Input/Output (I/O);

(b) A/D converters and signal conditioning appropriate to the type of sensor;

(c) a microcontroller ($\mu$C) for providing signal reduction and execution of the method described in the Pump Diagnosis Method;

(d) an output device;

(e) memory for storage of tables, logging data, and storing the data and pump signatures resulting from the method;

(f) tables of pumped fluid properties, tables of rotating machine geometry and installation dimensions; and (g) a data input device.

The four embodiments of the apparatus include: (a) a portable, battery powered field diagnostics apparatus; (b) a field-hardened, remote powered, networked diagnostics apparatus; (c) a diagnostics apparatus with controller; and (d) a diagnostic apparatus with host computer.

Portable, Battery-Powered Field Diagnostics Apparatus.

The portable, battery powered field diagnostics apparatus preferably may be a laptop computer, field hardened smart terminal, pen operating system based terminal, or Apple Newton®, etc. The field diagnostics apparatus preferably has sensors, I/O, A/D converters, a microcontroller for executing the required signal conditioning and method described herein, memory, fluid property tables, rotating machine dimensional and performance signatures, installation geometry tables, an input device (keypad) and a display and optionally a network connector. The primary end use of this apparatus will be to guide field repair of a rotating machine and for validation of a successful repair and installation.

Field Hardened, Remote Powered, Network Monitoring Apparatus.

The field hardened, continuously monitoring apparatus is comprised of sensors, I/O, A/D converters, a microcontroller for executing the method, a communication port for connecting the apparatus to a host computer, memory, data logging, and communication capability for real time acquisition and diagnosis of the rotating machine, and optionally for a remote display or host displaying the pump signatures.

The field hardened, remote powered, network monitoring apparatus may be either a 2-wire powered apparatus, common to the process control business, a multi-wire communicating DC powered apparatus or an AC powered communicating apparatus. A special embodiment of the field mounted apparatus will include the ability to power the apparatus and communicate with the apparatus over a standard 2-wire system with a variety of communication protocols. Examples of communication protocols include HART, Foundation Fieldbus, PROFIBUS PA, Ethernet TCP/IP and proprietary protocols such as Honeywell's DE, Yokogawa's Brain, Foxboro's Foxnet, etc.

The 2-wire embodiment includes a field hardened enclosure and is powered with a DC power supply used with 2-wire communication systems and is capable of complying with industry standard (FM, CSA, CENELEC, etc.) safety requirements for intrinsic safety and explosion proof certifications. The 2-wire apparatus has a subset of the total functionality described due to a power limit (typically 10 volts and 4 ma for HART and up to 50 ma and 9 volts for fieldbus) required by safety standards.

A second embodiment of the field mounted and hardened apparatus is a multi-wire communicating apparatus. The multi-wire communicating apparatus provides DC power at a higher power level than is used for intrinsic safety standards, but is in compliance with wire industry standard protocols such as Modbus (RS232, RS485), Foundation Fieldbus H2, Profibus FMS, Ethernet TCP/IP, ControlNet etc. In the multi-wire communicating apparatus embodiment, power is provided over one set of wires from a remote power supply. Communication is provided over the remaining wires using industry standard protocols. This version of the apparatus typically will be safety certifiable only for "Explosion Proof" based on the design of the mechanical enclosure provided to house the electronics.

An AC powered (120V or 220V) embodiment is also possible as is utilized in Ingersoll-Dresser Pump's Remote Pump Monitoring System, trademarked PumpTrac (1995).

Diagnostics Apparatus with Process Controller.

A third embodiment of the apparatus is a controller typically found in process plants. Typical controllers that could be used with modification for a rotating machine apparatus diagnosis include: motor controllers found in motor control centers used to control motor/pump systems, variable speed drive controllers, DCS system controllers, programmable logic controllers (PLC's), compressor or turbine control systems, single or multiloop controllers, etc.

Diagnostic Apparatus—Host Computer.

A fourth embodiment of the apparatus is a host computer typically used for maintenance information systems. The apparatus includes sensors or data from sensors gathered from a database (data historian from a digital control system), I/O and A/D converters as appropriate, a microprocessor with the pump diagnostics method, a database for storing pump diagnostic results, alarm and alert management system, communications for networking with other host computers, such as DCS, a maintenance engineer's PC via an Ethernet TCP/IP network, the Internet, or the plant information management (IS) system network.

b. Method.

The method of the present invention may be used to assist a maintenance engineer in the diagnosis of rotating equipment including turbines, compressors, fans, blowers and pumps. The preferred embodiment is a method for diagnosing pumps of all types; constant head pumps such as positive displacement or reciprocating pumps and in particular, variable head centrifugal pumps.

The method is based on the use of the pump performance curve as the basis for determining the degradation of the pump due to off design operation; fluid damage from erosion, cavitation and recirculation; and through normal wear and tear.

The primary "pump performance curve" and pump "head curve" is well known in the industry and for purposes of this patent will include the relationships between the dependent head or pressure and the independent variable, flow. This relationships are traditionally plotted on a graph, with the dependent pump performance variables plotted on the ordinate and flow, the independent variable plotted on the abscissa.

Additional variables may also be plotted versus flow, and for purposes of this method will be described as "secondary performance curves". For purposes of this patent, "secondary performance curves" will include, but are not limited to the relationships between the dependent pump performance variables, net positive suction head, brake horsepower, pump efficiency, thrust bearing force, radial bearing force, motor torque, pump specific speed, dynamic pressure, net positive suction head available, etc. all plotted vs flow, the independent variable. These secondary curves provide a basis for root cause analysis of pump component failures.

The method is based on a comparison of the current pump signature curves and operating point resulting from the acquisition of process variables from sensors that measure a current condition of the rotating equipment or pump, and the original data in the form of an original or previous pump performance signature curves from prior monitoring, and knowledge of the rotating equipment or pump geometry, installation and piping geometry, ancillary equipment knowledge and geometry, and properties of the pumped fluid. This diagnostics method can be applied to any rotating machine, but the method for pumps is described herein. The diagnostics method can be used in conjunction with an apparatus that provides for the acquisition of the required variables, the computation of the required pump signatures, operating points and curves, the display of computed variables, a logic element for deducing and diagnosing the pump by component, and optionally, a communication to a host computer.

The computing apparatus may be a portable, battery-powered field hardened PC with I/O for use in field diagnosis of the rotating machine, or a field mounted continuously monitoring apparatus with data I/O, logging, and communication capability for real time acquisition and diagnosis of the rotating machine, and optionally displaying the pump signatures on a remote display or host. The computing apparatus may also take the form of a host with I/O and a means of executing the claimed method. Hosts capable of using this method include a compressor or turbine control system, a maintenance information system, a personal computer, supervisory control and data acquisition system (SCADA) or a traditional process control system. The method may also be implemented in a motor controller or a PLC often used in a motor control center for the motor used to drive the pump.

The apparatus may also be used with more than one rotating machine or pumps through the multiplexing or networking of the sensors from multiple pumps.

BRIEF DESCRIPTION OF THE DRAWINGS

FIG. 1b is a cross sectional view of the pump.

FIG. 2 is a schematic of diagnostic apparatus of the present invention.

FIG. 3 is a schematic of a field hardened remote embodiment of the invention.

FIG. 3a is a field hardened remote embodiment of the invention.

FIG. 4a is a pump diagnostic apparatus using a programmable logic controller (PLC) as a platform.

FIG. 4b is a pump diagnostic apparatus using a host computer as a platform.

FIG. 5 is a typical pump performance curve.

FIG. 6 is an original performance curve.

FIG. 6a is a pump performance curve at operating point.

FIG. 6b is a pump performance curve with operating point below BEP performance shifted downward.

FIG. 7a is a typical dynamic pressure sensor spectra.

FIG. 7b is a typical velocity and acceleration vibration spectra.

FIG. 7c is a $NPSH_{Avail}$ v. $NPSH_{Req'd}$ graph.

FIG. 7d is an H v Q curve illustrating a "droop" condition.

FIG. 8 is a graphical representation of spectra of same vibration source obtained from different types of transducers.

FIG. 9 is a graphical representation of data pump secondary performance curves.

FIG. 9a is a graphical representation of centrifugal pump secondary performance curves.

FIG. 9b is a graphical representation of positive displacement pump secondary performance curves.

FIG. 9c is a graphical representation of centrifugal dynamic pressure curves.

FIGS. 11 through 41, are additional flow charts representing embodiments of the method of the invention.

DETAILED DESCRIPTION OF THE PREFERRED EMBODIMENTS a. Apparatus

Figure 1:
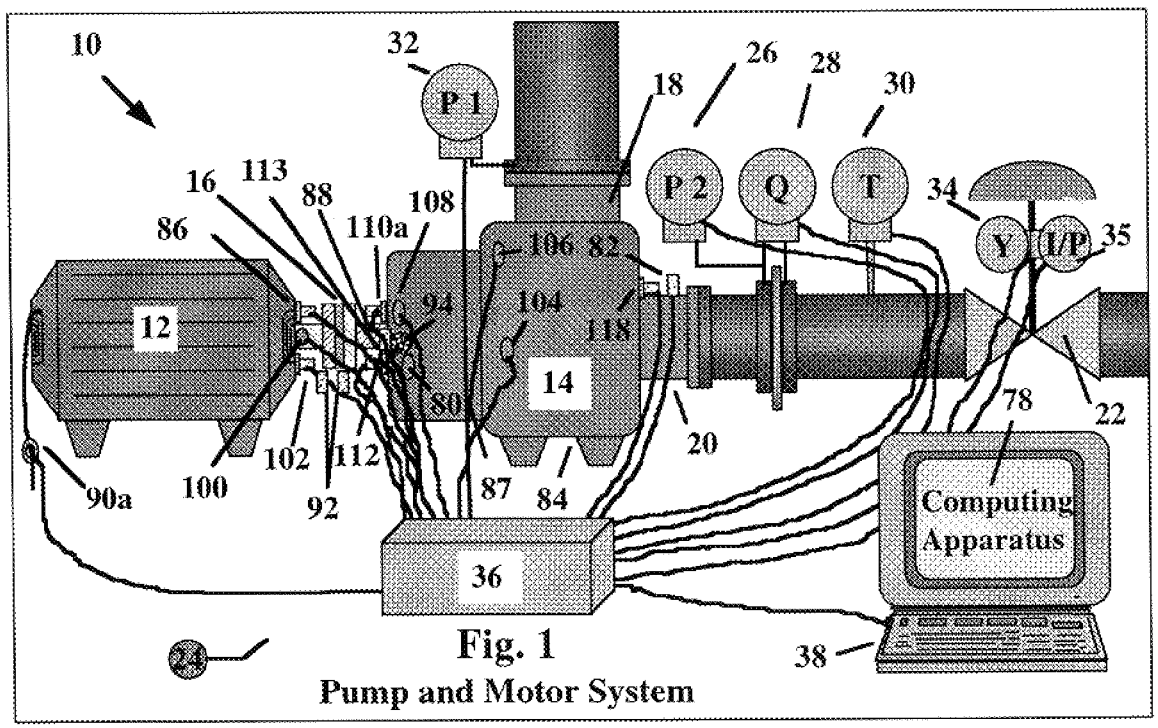
FIG. 1 is a representation of a rotating machine and motor system.

Referring to FIG. 1, shown is a rotating machine and motor system designated generally 10. It should be understood that the apparatus for diagnosing a rotating machine and motor system may be used to diagnose rotating equipment including pumps, turbines, fans, blowers, compressors or other types of equipment. A pump and motor system is shown in FIG. 1 for purposes of example only. Pump and motor system 10 includes motor and a rotating machine or rotating equipment, such as pump 14. Motor 12 may be an electric motor, diesel engine or turbine, or other power source. Motor 12 is operatively connected to rotating equipment 14 via coupler 16. Rotating equipment 14 has inlet 18 and outlet 20. Downstream from outlet 20 of rotating equipment 14 is typically provided a final control element, such as control valve 22.

The diagnostic apparatus for one embodiment of the invention is designated generally 24 (FIG. 2). The system can be used effectively used for:

a) validation of correct installation of pump 14 and ancillary equipment attached to pump 14;

b) diagnosis of change in an operating condition of pump and motor system 10 for purposes of maintenance and for changing the operation and control of pump and motor system 10;

c) verification that maintenance was properly conducted through a validation of the correct dynamic performance of the repaired equipment; and d) collection of equipment base line or original performance data for use with maintenance information systems to provide an audit trail of maintenance records.

Diagnostics apparatus 24 can be applied to any rotating equipment. However, the preferred embodiment of this apparatus is the diagnosis of the centrifugal pump. Diagnostic apparatus 24 includes process sensors for measuring process conditions and for generating process variables, which are key to determining a change or degradation of performance of pump and motor system 10. Sensors, including process sensors, may communicate variables and diagnostics parameters via a network connection to a host computer including digital control systems (DCS's) such as the Foxboro I/A®, supervisory control and data acquisition (SCADA) systems such as that provided by the Intellution Fix®, or a maintenance information system such as that provided by the SAP for the purpose of providing predictive and preventative maintenance information. Process sensors may include outlet pressure sensor 26, shown in FIG. 1, which is positioned proximate outlet 20 of pump 14, for determining pump outlet pressure. Process sensors may also include flowmeter 28 for determining a flow rate of product downstream of rotating machine 14, or other sensors for monitoring process conditions.

Further examples of process sensors include temperature sensing device 30, which is approximately positioned upstream or downstream of rotating machine 14 for determining temperature of a process fluid; inlet pressure sensor 32, which is positioned proximate rotating equipment inlet 18 of rotating machine 14 for determining rotating machine inlet pressure; and valve position sensor 34. Valve position sensor 34 is preferably mounted on control valve 22 and communicates with input/output device 36 for converting electrical signals to digital signals. Valve position sensor 34 is provided to determine the position of a control valve or shaft. Additionally, valve position sensor 34 provides input for a method to calculating flow through pump or rotating equipment 14. The flow through valve 22 can be calculated from the valve position, the pressure drop across the valve and known fluid properties and geometry from the valve supplier. The flow through valve 22 may then be and stored as original data. This information enables a baseline head vs. flow (H v Q) performance reference curve to be developed in the absence of a flowmeter. Additionally, knowledge of valve position provided by valve position sensor 34 is used to alert possible deadheading of pump or rotating equipment 14.

Input/output device 36 of diagnostic apparatus 24 communicates with process sensors for receiving process variables therefrom. Input/output device 36 transmits process variables received from process sensors to computing device 38.

The computing apparatus may be:
a) a portable, battery powered field hardened PC with I/O for use in field diagnosis of the rotating machine, shown in FIG. 2, or
b) a field mounted continuously monitoring apparatus, shown schematically in FIG. 3, with data I/O, logging, and communication capability for real time acquisition and diagnosis of the rotating machine, and optionally displaying the pump signatures on a remote display or host, shown in system with a remote host in FIG. 3*a*, or
c) a host with I/O shown in FIG. 4*b* and a means of executing the method described herein. Hosts capable of using this method include a compressor or turbine control system, a programmable logic controller (PLC), a maintenance information system, a personal computer, supervisory control and data acquisition system (SCADA) or a traditional process control system, or
d) the method may be implemented in a motor controller or a PLC, shown in FIG. 4*a*, often used in a motor control center for the motor used to drive the pump.

FIG. 2 is a schematic of diagnostic apparatus 24. Box 40 represents pump and motor system 10. Data is shown being transmitted from pump and motor system box 40, as represented by a plurality of arrows generally designated 42. Examples of data being transmitted include process variables generated by process sensors and condition monitoring variables generated by machine sensors, to be discussed below. Data is transmitted to a sensor excitation and conversion device, represented by box 44. Converted data signals are then transmitted from sensor excitation and conversion device 44 to signal multiplexers, represented by box 46. Alternately, the sensor inputs may be inputted directly to the A/D converter shown in box 52.

Sensor data may be multiplexed to microprocessor 48 to provide for asynchronous measurement of selected inputs which are not time critical or do not need to be sampled continuously. Converted data transmitted by sensor excitation and conversion device 44 to signal multiplexers 46 is represented by arrows, designated generally 50. From signal multiplexers 46, data is then preferably transmitted to an A/D converter, such as those manufactured by Analog Devices and Crystal Semiconductor, represented by box 52. Examples of microprocessor 48 include Motorola's 16-bit 68 HC16 or 32-bit LC302. D/A converter, represented by box 54, is provided in the preferred embodiment so that microprocessor 48 may communicate with the pump and motor system, represented by box 40. Diagnostic apparatus 24 may also include a real time clock 59 with optional battery backup that can be used to time stamp data acquired synchronously or asynchronously. Real time data may be alternatively acquired via the network 115 from a host computer as is provided with Foundation Fieldbus or Ethernet networking technology.

In the preferred embodiment, microprocessor 48 is in communication with memory storage 56, co-processor 58, and a disk drive or other data storage or retrieval means 60. Co-processor 58 is optional. Examples of a suitable co-processor include Texas Instrument's DSP microcontroller, with embedded frequency analysis algorithms such as fast fourier transform (FFT) or wavelets. Co-processor 58 may be provided to process spectral data from sensors such as accelerometers. The co-processor is used to offload microprocessor 48. Additionally, diagnostic apparatus 24 may be provided with the following: an A/C power supply receiving device 62, as is commonly known in the art; charger 64; battery 66; power supply 68, commonly known in the art; communication receiving device 70; keypad 72; keyboard 74; and an output device, such as printer 76 and CRT display 78.

In the preferred operation of diagnostic apparatus 24, microcomputing device 48 receives data 42 from input/output device 36 and stores data in memory storage 56. To establish an original condition, original data must be entered into memory storage 56. For purposes of this application, original data includes tables of machine geometry, machine installation parameters, ancillary equipment parameters original performance curves and fluid properties of the pumped product, as well as previous condition data. Previous condition data refers to data gathered in a previous set of measurements that is stored for retrieval and comparison purposes. Therefore, measured data, including process variables and condition monitoring variables, may be compared to original data to determine performance deterioration of rotating machine and motor system 10. Microprocessor device 48 of diagnostic apparatus 24 compares measured data with original data for generating an output via printer 76, CRT display 78 or other output devices based on the comparison.

Referring again to FIG. 1, in the preferred embodiment diagnostic apparatus further comprises machine sensors for generating condition monitoring variables. Machine sensors to allow data to be gathered from individual components for determining specific problems with pump and motor system 10. Computing device 38 is used to compare condition monitoring variables with stored original data for diagnosing rotating equipment degradation and for generating an output based upon that comparison. A discussion of various types of machine sensors follows.

Machine sensors may include rotating equipment vibration sensor 80, which is preferably mounted on rotating equipment 14 for determining vibration of rotating equipment 14. Vibration sensor 80 is in communication with input/output device 36 for providing condition monitoring variables to computing device 38. A further machine sensor is dynamic pressure sensor 82, which is positioned in the product fluid stream downstream from rotating equipment outlet 20 or positioned within rotating equipment casing 84 of rotating equipment 14 and is in contact with the process fluid.

Diagnostic apparatus 24 (FIG. 2) may include additional machine sensors, including motor vibration sensor 86, which is preferably mounted proximate a bearing for determining bearing vibration. Motor vibration sensor 86 is preferably in communication with input/output device 36 for providing condition monitoring variables thereto.

By receiving data from gearbox vibration sensor 88, which is mounted proximate gearbox 87 of rotating equipment 14, and from motor supply sensor 90, which senses motor current and motor voltage, and from alignment sensor 92, diagnostic apparatus 24 may diagnose whether rotating equipment 14 requires impending maintenance.

Diagnostic apparatus 24 may also include rotating machine seal leakage detector or sensor 94. Seal leakage sensor 94 is mounted proximate a shaft seal on rotating machine 14 for detecting seal leakage. Seal leakage sensor 94 provides condition monitoring variables to input/output device 36 for providing computing device 38 with condition monitoring variables.

Diagnostic apparatus 24 may include additional machine sensors, such as oil contamination sensor 96. Oil contamination sensor 96 is preferably mounted in gearbox 87 or on an oil sump for detecting oil contamination. Oil contamination sensor 96 provides condition monitoring variables to input/output device 36 for providing computing device 38 with condition monitoring variables.

Additional machine sensors, such as viscosity degradation sensor 98, may also be provided. Viscosity degradation sensor 98 is preferably mounted proximate a gearbox for detecting oil viscosity degradation. Oil viscosity degradation sensor 98 is for providing computing device 38 with an oil condition monitoring variable.

Additional machine sensors include torque sensor 100, which is preferably mounted proximate to the shaft of rotating machine 14. Torque sensor 100 is in communication with input/output device 36 for providing computing device 38 with torque data. Machine sensors may also include angular velocity sensor 102, preferably mounted proximate to shaft of rotating machine 14. Angular velocity sensor 102 is in communication with input/output device 36 for providing computing device 38 with angular velocity data for computing input power to rotating machine 14 and computing the output fluid power of rotating machine 14 and the efficiency of rotating machine 14.

Additional machine sensors include corrosion sensor 104. Preferably, corrosion sensor 104 is mounted on rotating machine casing 84 for measuring degradation of rotating machine casing 84 resulting from undesirable conditions, such as corrosion, pump cavitation or erosion. Corrosion sensor 104 is preferably in communication with input/output device 36 for providing condition monitoring variables thereto. A typical corrosion sensor uses electrical potential generated by corrosion to provide a voltage measurement. Corrosion sensor 104 can be located anywhere in rotating equipment 14 of pump and motor system 10 where high corrosion is expected, e.g., a thin section or areas of high flow.

Further machine sensors include ultrasonic thickness sensor 106. Ultra-sonic thickness sensor 106 is preferably mounted on rotating machine casing 84 for measuring degradation of rotating machine casing 84 from undesirable conditions such as corrosion, pump cavitation or erosion. Ultrasonic thickness sensor 106 is preferably in communication with input/output device 36 for providing condition monitoring variables thereto.

Additional machine sensors include accelerometer 108, bearing temperature sensor 110, bearing vibration sensor 112, and axial displacement sensor 113.

Diagnostic apparatus 24 may be configured in one of two classes. In a first class, embedded systems, such as microcontrollers, contain software that is burned into the chip's logic, i.e., firmware. The embedded system provides a software instruction set which is permanent. Embedded systems are used in a field hardened embodiment of diagnostic apparatus 24, discussed below.

Another form of the embedded system embodiment uses downloadable executable code in electrically alterable memory such as EEPROM or FLASH for equipment identification numbers, specific flow data—fluid parameters, pump performance curves, etc.

A second class of diagnostic apparatus comprises a real time computing platform. Configurable logic will normally be remotely located in a computing host. Examples include personal computers, workstations, PLC, DCS, and minicomputers. A secondary form of this real time computing platform is a portable real time computing platform. A portable computing device allows testing to be performed near pump and motor system 10, thereby allowing for observation of the equipment. In one embodiment of the invention, diagnostics apparatus 114, FIG. 3, operates via a bus wherein there exists no central controller. Such a system is provided with the enhanced digital HART protocol, proprietary protocols, such as Honeywell's DE, Yokogawa's Brain, proprietary protocols as provided by Bailey and Foxboro for their field instruments, and emerging field buses such as Foundation Fieldbus, Profibus, or World FIP, Ethernet, etc.

In a more fully featured embodiment shown in FIG. 3a, the diagnostic apparatus 24 is powered by and communicates over a multi-wire network, such as a three-wire network in which DC power 117 is remotely provided over a separate set of wires or a four-wire network in which DC power is remotely provided over a separate set of wires. Protocols typically used include Modbus (RS232 and RS485), Foundation Fieldbus H2, Profibus H2, and Ethernet, I/P, TCP/IP, UDP/IP, etc.

In one embodiment of the invention, shown in FIG. 1, machine sensors are integrated with input/output device 36 and computing device 38 for comparing measured performance signatures of rotating machine 14 at a second time with an original condition signature at a first time for diagnosing degradation of rotating machine performance. In the preferred embodiment, process sensors and machine sensors are electrically isolated from the apparatus. Comment: Electrical isolation is well known. It is accomplished with transformers or optically with OPTO/couplers.

In another embodiment of the invention, shown in FIG. 4a, a PLC is used as the diagnostic apparatus platform, and the PLC's microcontroller 188, which is positioned proximate rotating machine 14 for controlling rotating machine 14. For example, microcontroller 188 may control rotating machine 14 by issuing a control set point to control valve 22, I/P 35. Preferably, microcontroller 188 possesses firmware for providing instructions to rotating machine 14.

A further embodiment of the invention, shown in FIG. 3a, provides that field hardened computing device 114 of diagnostic apparatus 24 is positioned proximate rotating machine 14 and that computing device 114 provides a control signal to the control valve 22 or variable speed drive. By providing that diagnostic apparatus 114 controls the process as a hardware platform, one benefit is the ability to utilize a combination of known condition monitoring variables, e.g., vibration variables from machine sensors, with process variables from process sensors. Process sensors provide information about the performance of pump and motor system 10. Machine sensors provide knowledge of the health of rotating equipment and motor system 10. Examples of machine sensors that provide vibration variables include motor vibration sensor 86 or bearing vibration sensor 112. When known condition monitoring variables and process variables are combined, decisions can be made through logical deduction about the condition of pump and motor system 10, the process and the ability of pump and motor 10 to provide its intended function.

Referring now to FIG. 3, a field hardened remote embodiment of the invention is shown. Field hardened computing device, designated generally 114, of diagnostic apparatus 24 is designed to be positioned proximate rotating machine 14.

Field hardened, networked diagnostic apparatus 114 may be used with pumps using standard communication protocols used in the process control and factory automation industries.

Preferably, field hardened apparatus 114 is configured to download executable code specific to a particular rotating machine 14 for operating rotating machine 14. Field hardened remote embodiment 114 is preferably encased in field hardened enclosure 116, is remote-powered, and is a networked. In a preferred embodiment, field hardened computing device 114 has digital communications with a network 146 and serves both as a publisher and a subscriber of data over the network. Preferably, field hardened computing device 114 is powered by a remote power supply 115, shown in FIG. 3a. The field hardened embodiment is preferably designed for operation in inclement environments without additional protection. The device may be mounted on or proximate to the pump or other rotating machine 14 and should be designed to withstand high humidity, extreme temperatures, high EMF (electrical noise), rain and snow and other harsh environmental conditions. Additionally, field hardened apparatus 114 should be provided with explosion-proof protection, i.e., be designed not to cause a spark or explosion in hazardous gases. Such an apparatus may be powered by and communicate over a two-wire loop.

The process control industry routinely uses field-hardened sensors, actuators, and instruments that are remotely powered with a DC power supply 115 (typically 12–24 V) over a twisted shielded pair of wires. Communication is also provided in a full duplex fashion with process industry protocols to and from the field device from host computers such as a PLC or DCS.

Field hardened apparatus 114 is preferably capable of satisfying international safety standards for electronic apparatus such as FM, SAA, JIS, CENELEC, and CSA two-wire intrinsic safety and explosion proof devices. Field hardened enclosure 116 is also preferably moisture proof (NEMA 4) and capable of achieving IEC CE mark requirements for heavy industry electrical field mounted instruments. Intrinsic safety standards limit the available power to the field device to avoid ignition of hazardous or flammable gases that may be in the area near the device. Use of low power consumption electronics and microcontrollers is essential to meet these safety requirements.

Field hardened apparatus 114, shown in FIG. 3, is encased in field hardened enclosure 116, and receives data from process and machine sensors, designated generally 120. Data received from process and machine sensors 120 is transmitted to I/O, 121 and then to an excitation and conversion device, represented by box 122. Converted data signals are then preferably transmitted from sensor excitation and conversion device 122 to signal multiplexers, represented by box 124. Converted data is then preferably transmitted to an A/D converter, represented by box 126, which communicates with microcontroller 128. Conditioned sensor data signals may be optionally transmitted directly to an A/D converter 126 without use of the multiplexer 124. Microcontroller 128 is preferably in communication with co-processor 130, which has the ability to time-stamp data received. ROM 127 communicates with A/D converter 126, microcontroller 128 and co-processor 130 for providing instructions. Time-stamping of data is facilitated by an optional real time clock 132. Additionally, microcontroller 128 is in communication with electrically alternatable memory 134 for acquisition of pump system, fluid property, pump signature data. Communications device 136 is in communication with microcontroller 128 for transmitting information to a network. Finally, in the preferred embodiment, field hardened apparatus 114 is provided with display 138 so that an operator can get information from the device in the field. An optional communication port 146 permits data transfer from handheld vibration monitors 142 or pump diagnostic subsystems 150.

Referring now to FIG. 4a, an additional embodiment of diagnostic apparatus 24 uses a programmable logic controller (PLC) 240 as a platform. Programmable logic controllers are commonly used for control in factory and process control applications and are frequently used for motor control in motor control centers. PLCs by construction provide I/O, the ability to power sensors and actuators through the I/O, A/D converters and a microcontroller with configurable logic algorithms. PLCs also have communication interfaces 190 with standard process control protocols as well as support for remote PC hosts and printers. PLC logic is often configured using a HMI 194 such as those provided by S-S Technologies as well as PLC manufacturers such as Allen Bradley or Siemens. The PLC has all of the necessary elements for implementing the disclosed diagnostic method.

The shortcomings of a PLC implementation include the inability to obtain intrinsic safety (two-wire) approvals due to the high power consumption of a PLC and the need to house a PLC in a Division II, sheltered environment. The PLC does, however, provide an ideal platform for the diagnostics method as it is a cost effective package for the necessary elements and has the ability to provide the logic configuration needed for the pump diagnostics method. Further, the diagnostics method running on the PLC can provide the diagnostics alerts 154 for off-BEP operation of a pump so that operator could provide immediate corrective control action to operate the pump in a BEP regime through a change in the control set point.

In this embodiment, shown in FIG. 4a, diagnostic apparatus 240 uses a PLC platform for providing sensor I/O, A/D conversion and signal conditioning. The PLC platform additionally provides microcontroller 188 and method logical elements that are embedded in firmware resident in the PLC's microcontroller 188. This embodiment further includes a PLC output 192 and communication network port 190.

Additionally, this embodiment of diagnostic apparatus 240 may further include logic configurator 194 for establishing pump method logic in PLC language and for downloading pump logic into PLC microcontroller 188. Examples of logic include ladder logic, sequence charts, function blocks, etc. The apparatus may further include a function block with sensor inputs, outputs, alerts and the pump method.

A further embodiment of diagnostic apparatus 240, shown in FIG. 4*b*, wherein a host computer 236 is used as the platform. A host computer is most often used for maintenance information or maintenance systems, but may also be the DCS control system. The apparatus will include sensors or data from sensors gathered through from a database (data historian from a digital control system) 210, I/O 228 and A/D converters as appropriate 238, a microprocessor with the pump diagnostics method, a database for storing pump diagnostic results 210, alarm and alert management system, communications 212 for networking with other host computers 256, such as DCS, maintenance engineer's PC via an Ethernet TCP/IP network, the Internet, or the plant information management (IS) system network.

The host computer embodiment of diagnostic apparatus 240 acquires sensor input via point-to-point or multidrop wired sensors or transmitters such as 32, 28, 26, and 30, wired to I/O 228, which provide conversion and networks digital sensor data via a bus to the microprocessor based host. Sensor data may be alternatively gathered via a bussed sensor network 230 commonly called fieldbus.

Commercial workstations, PCs, and servers like the IBM 400 are the preferred computing platforms for maintenance information systems. I/O interfaces with appropriate A/D converters and signal conditioning which convert the required sensors (physical and condition monitoring) to digital data are readily available from companies like GE Fanuc and National Instruments. The maintenance information system can process sensor inputs using diagnostics methods within the workstation or PC microprocessor. Plug-in communication output boards are readily available from National Instruments for the many process communication protocols, and can be readily networked with the DCS or maintenance engineer's PC with Ethernet TCP/IP based network protocols.

Host computers are able to share data over a network connection through the use and support of standard data sharing network services such as those provided by Microsoft's Windows environment through OLE, OPC, JAVA, netDDE, DDE and to databases through standard database services like ODBC, OLEDB, SQLSERVER, etc.

In the host computer platform embodiment, shown in FIG. 4*b*, the diagnostic apparatus 236 may further include sensors wired to a central input/output 228, A/D card 238 with sensor signal conditioning, a card connection to an input/output network, sensor input/output network 240, such as a DCS data highway, computer 236, such as a PC DCS workstation, etc., that includes data input bus 240, computing element, memory, input device, such as a keyboard, network communications, a display 224, data storage 210, real time clock, and a software-based implementation of the pump method.

Diagnostic apparatus 236 preferably includes an alert device that responds to a condition of rotating equipment 14. An alert is transmitted to a host computer 256 via the network 212.

Apparatus may further include network services, such as OLE, OPC, Net DDE, or ODBC, for publishing pump data and alerts with software applications resident on the computer.

In the preferred embodiment, shown in FIG. 3*a*, diagnostic apparatus 114 possesses communication port 70 for importing condition monitoring variables from portable hand-held data logging device 142. Examples of data logging devices include hand-held vibration monitoring systems, oil analysis devices, corrosion and ultra-sonic thickness gauges, etc. Preferably, portable hand-held data logging device 142 possess a database for storing the input devices. Additionally, portable hand-held data logging devices 142 may use an intelligent network device.

Diagnostic apparatus 114 may additionally possess process communication port 70 for communicating with intelligent network devices. Examples include Hart, Foundation Fieldbus, Profibus, Modbus, Ethernet TCP/IP, etc. An example of an intelligent network device for communicating with process variable digital bus 70 includes a control valve position sensor 34, shown in FIG. 3*a*.

Diagnostic apparatus 114 may further include monitoring system digital bus 146 for communicating with intelligent network devices having computing engines for collecting condition monitoring variables.

In one embodiment of the invention, diagnostic apparatus 114 includes condition monitoring subsystems 150 for rotating machine 14. The apparatus can serve to collect data from other smart diagnostics subsystems such as a smart motor and provide a database for the entire rotating equipment system over a network for analysis by others with a maintenance information system, expert system, control system or SCADA system.

Condition monitoring subsystems 150 are interfaced with computing device 114 via standard communication network interfaces for transmitting subsystem data over a standard communication network. Examples of condition monitoring subsystems include a Bentley Nevada Trendmaster 2000, a smart motor, and gearbox condition monitoring system and Fisher Controls Fieldvue® valve diagnostics system. A Bentley Nevada system is primarily used with compressors and steam turbines for determining vibration and uses a proximity sensor positioned near a shaft for determining eccentricity or orbit of the shaft in the bearing.

In a further embodiment of the invention, diagnostic apparatus 114 comprises external processed data storage device 152 for storing subsystem data. The storage of subsystem data is necessary when diagnostic apparatus 114 is a network client having a memory database for storing data from a network rotating machine subsystem. In this embodiment, subsystem data is stored as a substitute for direct sensor or pump subsystem component condition monitoring inputs. If any other subsystem is analyzed, then data must be stored. Otherwise, diagnostic apparatus 114 must include its own sensors. One reason that subsystem data must be stored is that a subsystem may already have a fast fourier transform (FFT). Therefore, this embodiment of diagnostic apparatus 114 must treat data differently since information has already been preprocessed.

In the embodiment of the invention, schematic FIG. 3 shows co-processor 158 of diagnostic apparatus 114 is in communication with microcontroller 128 for providing spectral signal reduction of condition monitoring variables from the frequency domain sensors 120. These include pump vibration sensor 80, motor vibration sensor 110*a*, dynamic pressure sensor 82, and bearing vibration sensor 112, shown in FIG. 1.

Further examining the diagnostic apparatus schematic, FIG. 3, diagnostic apparatus 114 is preferably provided with alert device 154 for indicating when undesirable equipment conditions occur. Undesirable equipment conditions are determined by comparing process or equipment conditions with user configured levels for sensor-computed variables or high limits. Examples of undesirable equipment conditions include vibration levels that exceed the manufacturer's recommended amplitude levels.

In one embodiment, when an alert indicates an undesirable equipment condition, an optional contact closure 156 is provided to shut down pump and motor system. Contact closure 156 is located in diagnostic apparatus 114 to switch voltage or current to provide an alert or safe equipment operation. For example, in one embodiment, contact closure 156 is always "ON" and disconnects when an alert is generated. Conversely, contact closure 156 may default to the "OFF" position and connect when an alert is generated. Other uses for contact closures include lighting a warning light, disconnecting a motor, reducing power to a motor, etc. If a variable speed drive motor is utilized, contact closure 156 can be located proximate the motor or may be positioned in a control room. The combination of contact closure 156 with diagnostics results in improved control of the pump and motor system 10.

FIG. 3a shows field hardened apparatus 114, in a process control system connected to an host computer, 236, typically a DCS system.

Diagnostic apparatus 114 may additionally include a final control element, such as control valve 22 whereby the final control element is responsive to the output communication 70 generated by computing device 38 for operating pump 14 and motor system 12 in a recommended operating design regime. A final control element is typically used to control flow through pump 14 to meet piping and process system requirements, and may be used to conduct tests required to generate a performance curve. Closing control valve 22 by providing an output signal to the valve I/P 35 increases resistance and causes rotating equipment or pump 14 to operate at a higher pressure and a lower flow rate. Similarly, opening control valve 22 results in reduced system resistance, increased flow and lowering pressure.

Another example of a final control element is a variable speed drive connected to the pump which may be used as a controller. A variable speed drive works to provide a required flow and pressure demand by adjusting the speed of the rotating equipment 14.

FIG. 3 shows diagnostic apparatus 114 includes, in the preferred embodiment, optional real time clock 132 in communication with computing device 128, for time stamping process variables and original data for time-based comparisons.

Diagnostic apparatus 114 may further comprise a display for displaying a performance signature at a first time and at a second time.

In an additional embodiment shown in FIG. 2, diagnostic apparatus 24 is a portable battery-powered field apparatus. In this embodiment, diagnostic apparatus 24 further includes co-processor 58 which contains a software resident spectral analysis engine 158. Spectral analysis engine 158 is for processing signals from frequency domain sensors. Frequency domain sensors include rotating equipment vibration sensor 80 and dynamic pressure sensor 82, as well as motor vibration sensor 110a and bearing vibration sensor 112. Co-processor 58 receives data from microprocessor 48 or directly from frequency domain sensors.

Diagnostic apparatus 24 may also include a network communication port 160. Network communication port 160 is for communication with portable vibration monitor 142 for communicating output from computing device 48 to a network 115, and communication device 70 for communicating data from computing device 48 to a networked host.

b. Method

The method of practicing the invention enables diagnosis of rotating equipment commonly used in the factory and process control industry. The method is intended to be used to assist a maintenance engineer in the diagnosis of turbines, compressors, fans, blowers and pumps. The preferred embodiment is a method for diagnosing pumps, particularly centrifugal pumps.

The method of the invention is based on a comparison of measured pump signature curves resulting from the acquisition of process variables from sensors monitoring a current condition of the pump and the original or previous pump performance curve from prior monitoring or knowledge of pump geometry, installation data, ancillary equipment data and properties of pumped process liquid.

The diagnostics method can be used in conjunction with diagnostic apparatus 24, shown in FIG. 2, apparatus 114 shown in FIGS. 3 and 3a, PLC apparatus shown in FIG. 4a or PC host 236 shown in FIG. 4b, which provides for the acquisition of process and condition monitoring variables, the computation of the required pump signatures and curves, the display of the computed curves, a logic element for deducing and diagnosing the pump by component, and optionally a communication to a host computer.

The method of the invention identifies and interprets changes in the performance curve, or pump performance curve, by monitoring and analyzing key pump conditions. Typical pump performance curves are shown in FIG. 5. Changes in the pump performance curve may be used to diagnose a root cause of pump component failures. The diagnosis is beneficial in failure prognosis, maintenance planning, changing the operating condition of the pump to avoid damage and is often used with a companion host system.

The centrifugal pump performance curve in FIG. 6 is provided by a pump manufacturer based on a standard test described by the Hydraulics Institute, the recognized standards authority for the pump industry. The pump performance curve is routinely used by the end user to properly select the appropriate pump and impeller to provide the desired fluid flow or head condition.

Changes to the pump performance result from the use, wear, misapplication and operation of the pump outside the design conditions. These changes alter the pump performance curve. These changes can be used as the first step in diagnosing: 1) root cause analysis of failing pump components; 2) incorrect pump application or installation; 3) pump operation at flow/pressure conditions different than original design (BEP).

The method of the invention uses the pump performance curve to identify possible problems, which are often due to pump misapplication or failing components. Misapplication problems are diagnosed by comparing the measured operating conditions with the BEP region or recommended operating design regime of the pump performance curve. Misapplication results in operation outside the recommended operating regime, leading to pump stress, wear and failure.

Pumps are designed by the manufacturer to operate at the best efficiency point (BEP) or recommended operating design regime. The highest reliability occurs at the best efficiency point of the pump. Pump designs preferably minimize radial and thrust bearing loads, vibration levels, preclude recirculation or cavitation, and provide for the best conversion of mechanical energy to fluid energy at the BEP. Operation at conditions different from the BEP (off-BEP) can result in rapid deterioration of the pump. The diagnosis of off-BEP operation can facilitate pump component failure analysis. If diagnostic information is communicated to a control system, adjustments to pump operation for operating closer to the BEP increases pump life.

The method of the invention utilizes the full range, at all operating conditions, of pump performance curves. The pump operating variables of head, pump efficiency, brake horsepower, net positive suction head required, and specific speed are plotted vs. flow rate, as shown in FIG. 9. The current pump operating performance curve is plotted vs. the original or previous (at last maintenance/commissioning) pump performance curve and is adjusted for operating fluid properties.

Figure 10:
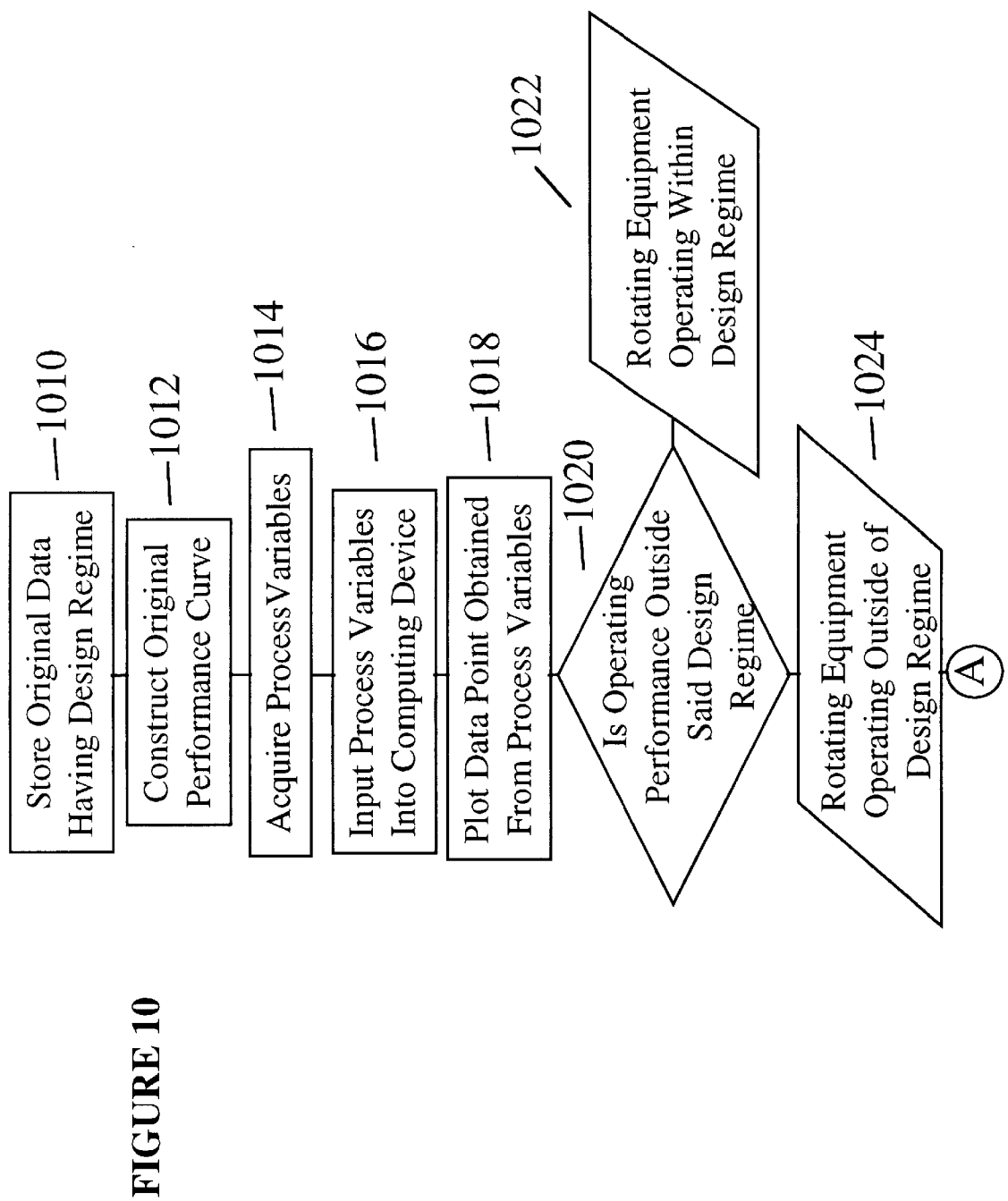
FIG. 10 is a flow chart representing one embodiment of the method of the invention.

In particular, the method of the invention for diagnosing rotating equipment includes forming a hypothesis of component failure from the a pump operating condition. Referring now to FIG. 10, to generate a hypothesis, diagnostic apparatus 24 first stores original data, represented by box 1010. Original data may further include geometric parameters of a pump system and the components of a pump system, a new or original condition pump performance curve, a previously measured pump performance curve, fluid properties data, maintenance record data and output display drivers. Original data may be used to construct an original performance curve for rotating equipment or pump 14, as shown in FIG. 6, and represented in box 1012 of FIG. 10. The original data possesses a recommended operating design regime 166, referred to as Best Efficiency Point (BEP) 164 when referring to a pump as shown in FIG. 6a. Recognized recommended operating design regime 166 is shown in FIG. 6a on an example pump curve. The acquisition of process variables from process sensors that gather process data from pump or rotating equipment 14 is represented by box 1014.

The method of the invention includes inputting process variables from process sensors into computing device 38 (FIG. 1), as represented by box 1016. A process data point is then obtained from the process variables, as represented by box 1018, which represents an operating condition of rotating equipment or pump 14. Computing device 38 then compares the process data point with the original data, as represented in box 1020, to determine whether the operating performance is outside of recognized recommended operating design regime 166 (FIG. 6a). If the data point is determined to be inside the recommended operating design regime 166, the pump is operating efficiently. If the data point is determined to be outside the recommended operating design regime 166, the pump is operating inefficiently, as represented by boxes 1022 and 1024, in FIG. 10.

In a preferred embodiment, computing device 38 also determines from a comparison of process data with original data whether the process data point, referred to in box 1018, is below the recommended operating design regime 166, as shown in FIG. 6a, wherein the process data point is designated 168. Operating a pump below the recommended operating design regime 166 will cause a pump to experience possible recirculation. Therefore, diagnostic apparatus 24 (FIG. 2) will then form a hypothesis that the pump is operating in an area of possible recirculation. Additionally, diagnostic apparatus 24 performs an analysis to determine whether the process data point is operating above the operating design regime 166. If a pump is operating above the recommended operating design regime 166, as represented by data point 170 in FIG. 6a, the pump will experience possible cavitation. Thus, diagnostic apparatus 24 will hypothesize that the pump may be operating in an area of cavitation. This process is set forth in FIG. 11.

Figure 11:
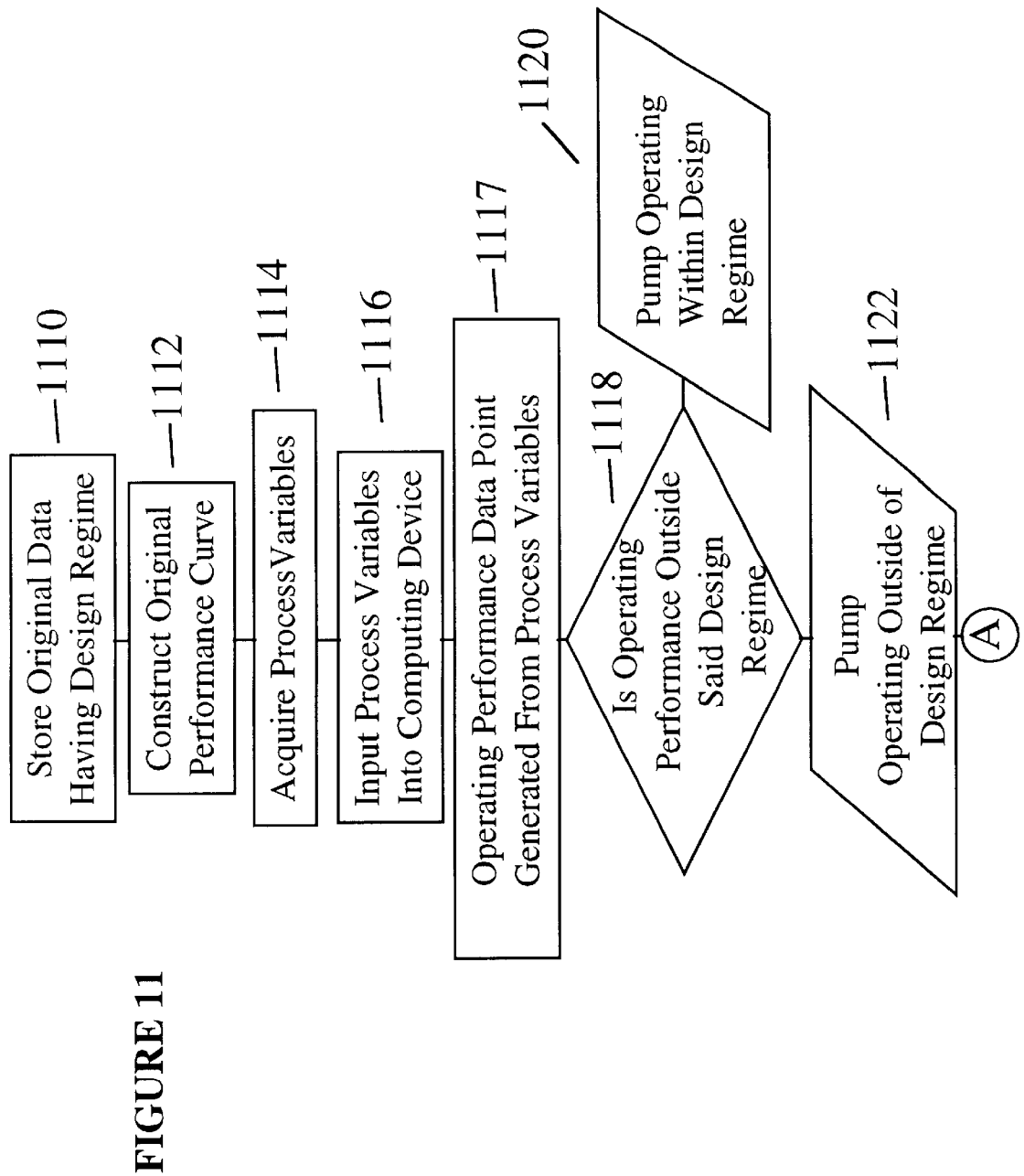

Referring now to FIG. 11, initially, original data having a recommended operating design regime 166 must be stored as represented in box 1110. A head vs. flow curve is then constructed from original data, as represented in box 1112.

Process variables are then acquired from process sensors, as represented by box 1114, and the process variables are input into computing device 38, as represented by box 1116. An operating performance data point is generated from the process variables as represented by box 1117. Diagnostic apparatus 24 then determines whether the pump is operating outside the recommended design regime 166, as represented by boxes 1118, 1120 and 1122.

If it is determined in box 1118 that the pump is operating outside of design regime 166, as indicated in box 1122, then computing device 38 determines whether a current operating performance data point indicates a higher head pressure than the recommended design regime 166, as represented in box 1124. If so, a diagnosis of possible pump recirculation is made by diagnostic apparatus 24, as represented in box 1126. Additionally, diagnostic apparatus 24 determines whether the operating performance data point indicates a lower head pressure than the recommended design regime 166, as indicated in box 1128. If the current operating performance data point is lower than the recommended design regime 166, then a diagnosis of possible pump cavitation is made by diagnostic apparatus 24, as indicated in box 1130.

A similar analysis will be conducted regardless of whether the rotating equipment is a pump or other type of rotating equipment. However, if the rotating equipment is not a pump, but is a gas rotating machine such as a compressor, fan, turbine or blower, then the diagnosis in the case of a current operating performance data point operating at a higher head pressure than the recommended design regime 166 will be surge as is shown in FIG. 5e for a compressor. An operating performance data point indicating a lower head pressure than the recommended design regime 166 will result in a diagnosis of stall as shown in FIG. 5e.

After a hypothesis has been formulated by diagnostic apparatus 24, in the preferred embodiment diagnostic apparatus 24 performs a step of verifying whether the process data point is outside the design regime 166, shown in FIG. 6a, and determines the cause of degraded performance. The step of verifying the hypothesis may be performed by analyzing equipment monitoring variables generated by machine sensors. When pump 14 is operating outside recommended operating design regime 166, or outside BEP 164, pump component failure can be hypothesized and verified through the use of a second tier of condition monitoring variables and curves.

Four secondary curves which permit confirmation of expected degraded pump components are included in this diagnosis method. The four secondary curves (condition signatures) include: 1) dynamic pressure sensor spectra 172 shown in FIG. 7a; 2) velocity 173 and acceleration vibration spectra 174 obtained from an FFT analysis of accelerometer sensor data shown in FIG. 7b; 3) bearing forces 180 vs. pump flow rate curve, shown in FIG. 9; and 4) a break horse power 182 vs. pump flow rate curve, shown in FIG. 9.

The vibration spectra for both velocity and acceleration provide a basis for diagnosing radial and thrust bearings, damage to the pump impeller from recirculation or cavitation causing impeller imbalance, pump shaft imbalance wear of pump seals and wear plates and degradation of ancillary pump system components.

Dynamic pressure spectra 172 provides for a means of measuring pump pressure noise which will indicate insufficient net positive suction head leading to flashing or cavitation and for evidence of recirculation. Dynamic pressure pulsations are also known to increase dramatically whenever the NPSH available drops below the NPSH required as shown in FIG. 7c. The NPSH required is computed from the manufacturer's recommended levels adjusted for fluid vapor pressure and operating temperature.

Examples of machine sensors, shown in FIG. 2, used to monitor pump and motor system 10 include rotating machine vibration sensor 80, dynamic pressure sensor 82, motor vibration sensor 86, gearbox vibration sensor 88, motor supply sensor 90a, which may be a motor current or motor voltage sensor, alignment sensor 92, seal leak detector or sensor 94, oil contamination sensor 96, viscosity degradation sensor 98, torque sensor 100, angular velocity sensor 102, corrosion sensor 104, ultrasonic thickness sensor 106, accelerometer 108, bearing temperature sensor 110, bearing vibration sensor 112, displacement sensor 113, and an motor insulation resistance sensor 90b or other sensors to monitor equipment conditions.

Figure 12:
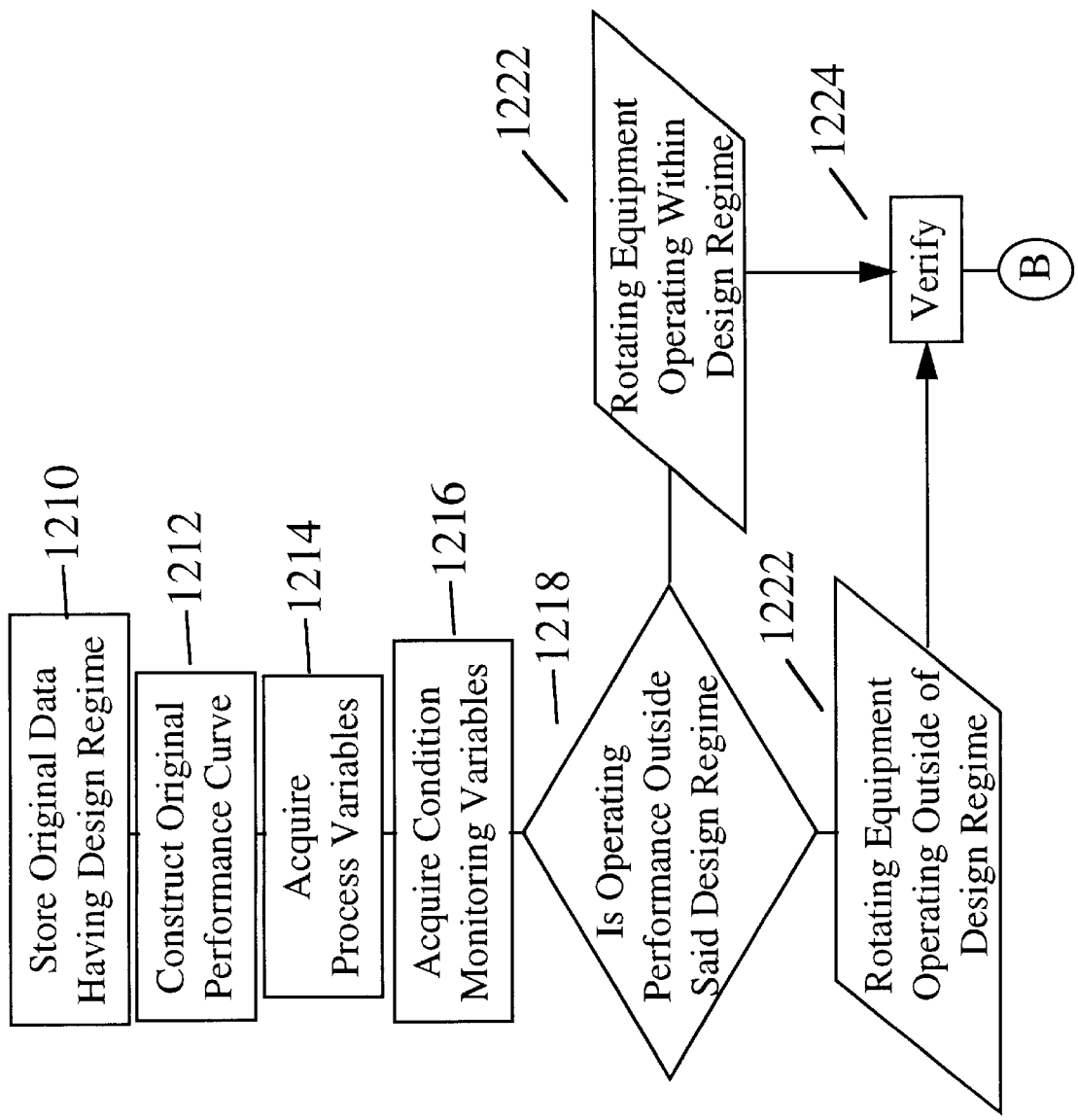

Referring now to FIG. 12, it can be seen that in the preferred embodiment of the method, original data is stored as represented by box 1210. Original data is used to construct an original performance curve, as designated by box 1212. An example of an original performance curve is shown in FIG. 6. Process variables are acquired from process sensors, as represented by box 1214. Condition monitoring variables are acquired from machine sensors, as indicated by box 1216. A hypothesis is formed by diagnostic apparatus 24 regarding whether rotating machine and motor system 10 is operating outside of recommended operating design regime 166, shown in FIG. 6a, as represented by box 1218, as shown in FIG. 10. If diagnostic apparatus 24 determines that rotating equipment 12 is operating within recommended operating design regime 166, as indicated in box. 1220, or if diagnostic apparatus 24 determines that rotating equipment 12 is operating outside recommended operating design regime 166, as represented by box 1222, diagnostic apparatus 24 then performs a verification step, as indicated by box 1224.

The general method described herein is applicable to pumps as well as other types of rotating equipment.

Figure 13:
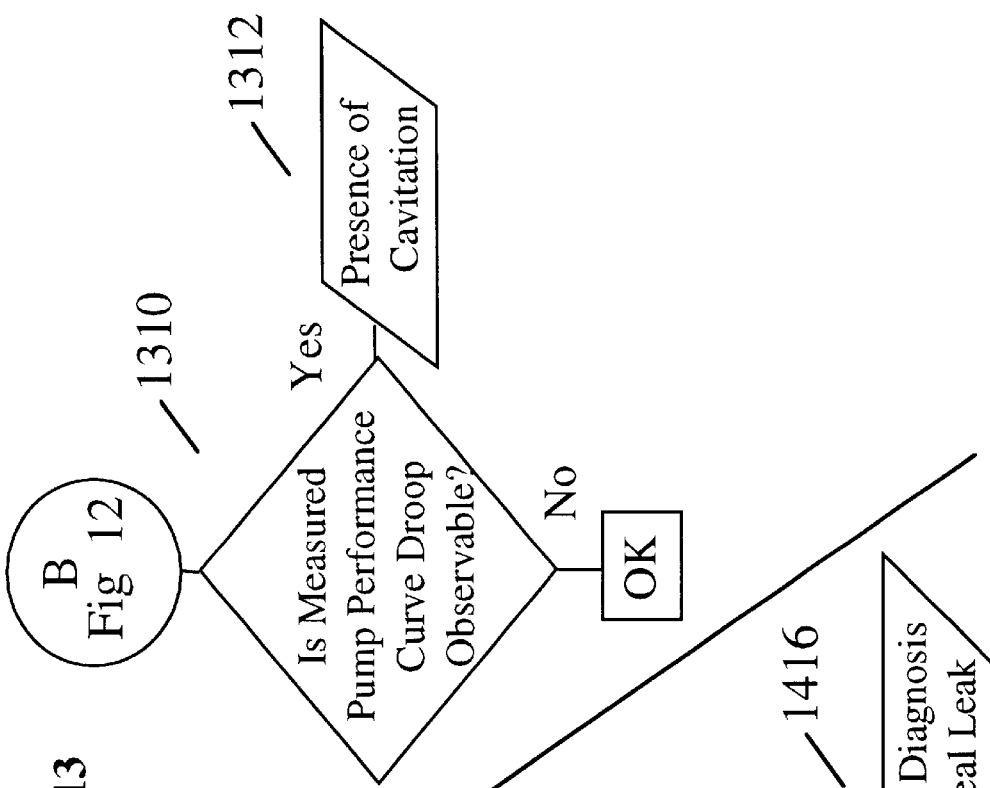

Referring now to FIG. 13, a method for verifying that a pump is cavitating includes constructing an original performance curve from original data, constructing a measured performance curve from process variables, and then comparing the measured performance curve with the original pump performance curve for determining if the pump is cavitating. By performing the comparison of the performance curves, it can be determined whether a "droop" condition exists. An example of a "droop" condition is shown in FIG. 7d. If diagnostic apparatus 24 determines that there is an observable droop, as indicated in box 1310, then a diagnosis can be made that cavitation exists, as indicated in box 1312. This determination can be made because a droop condition indicates that insufficient net positive suction head is available, which results in pump cavitation.

Figure 14:
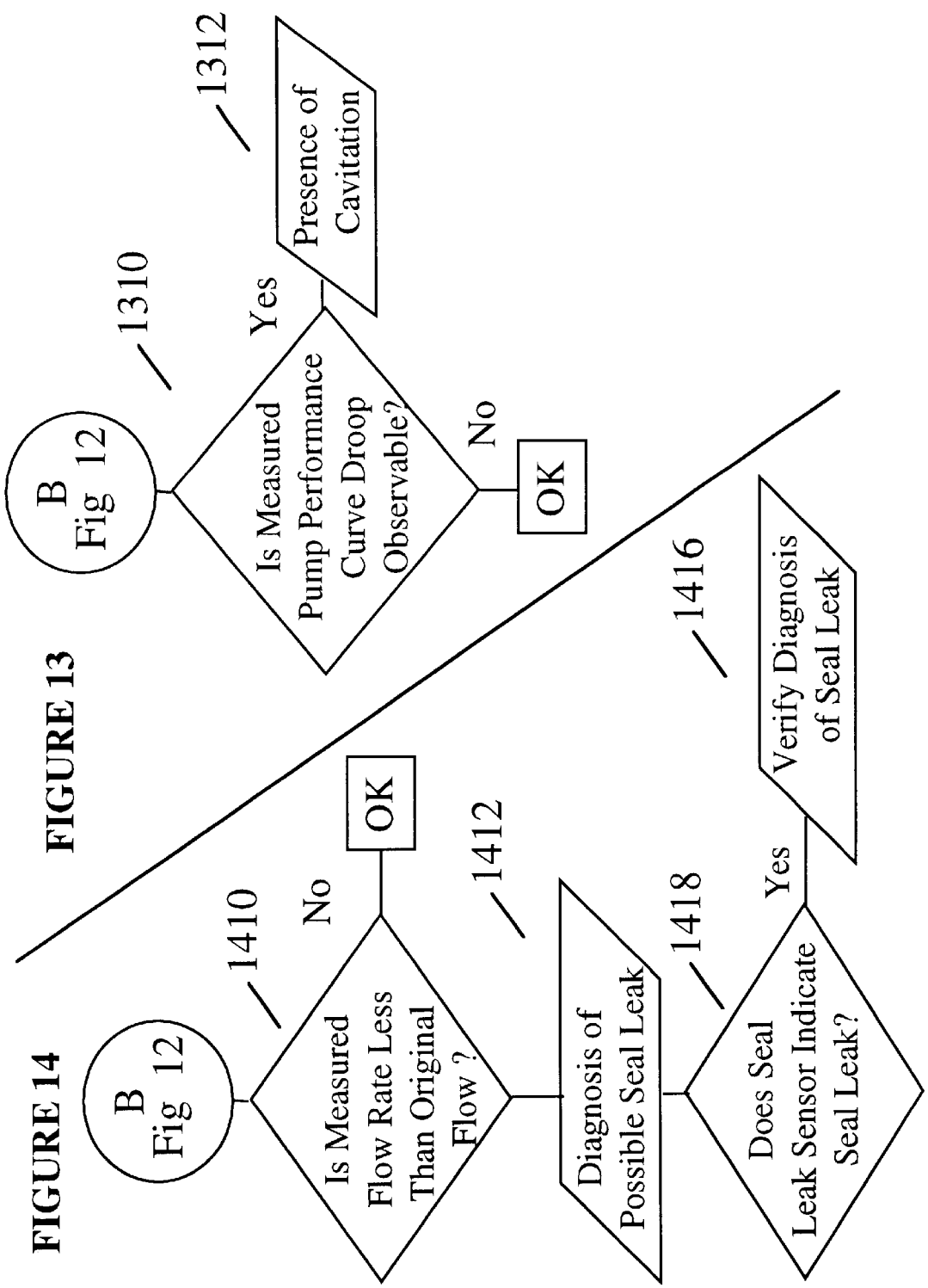

Referring now to FIG. 14, an additional verification step that can be undertaken that includes acquiring a measured flow rate from process sensors, such as flowmeter 28. Diagnostic apparatus 24 may determine if the measured flow rate is less than the original flow rate, as indicated in box 1410. If measured flow rate is less than the original flow rate, then a diagnosis of possible seal leakage is made, as represented by box 1412. [45] Apparatus 24 then gathers and examines leak sensor data from optional seal leak detector 94, as represented by box 1418. Diagnostic apparatus 24 then makes a diagnosis of verification as represented by box 1416.

The step of verifying a hypothesis and diagnosing specific problem areas by diagnostic apparatus 24 may be accomplished in a variety of ways and by examining a variety of machine sensors. The various machine sensors each gives diagnostic apparatus 24 information about different components for verifying or disproving a hypothesis and providing information on various aspects of pump and motor system 10. Each verification step is valuable for its information regarding a particular component and for its ability to verify or disprove a hypothesis generated by diagnostic apparatus 24 and provides a root cause analysis for the failure. Hereinbelow is a description of various verification methods that deal with different components of diagnostic apparatus 24.

Figure 15:
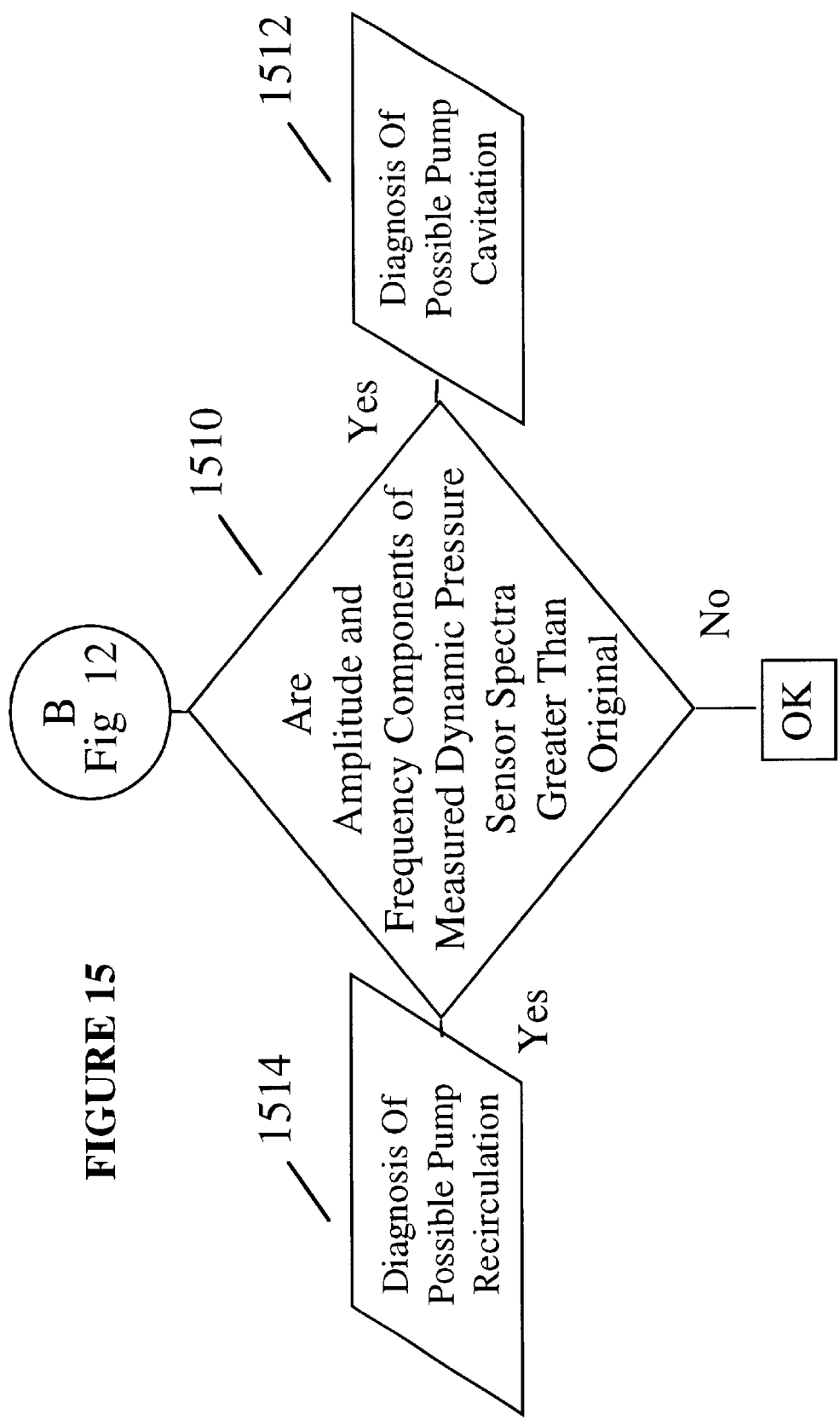

Referring now to FIG. 15, a verification step includes acquiring original condition dynamic pressure spectra having amplitude, frequency and phase components as well as acquiring equipment condition monitoring variables comprised of measured dynamic pressure sensor spectra having amplitude, frequency and phase components. FIG. 7a shows an example of dynamic pressure spectra wherein an increase in amplitude in frequency region 176 indicates a condition of recirculation and an increase shown in the amplitude of higher frequency region 178 indicates cavitation.

Diagnostic apparatus 24 makes a determination whether amplitude and frequency components of measured dynamic pressure sensor spectra 172 is greater than original condition amplitude and frequency components, as represented by box 1510. Diagnostic apparatus 24 then makes a diagnosis of possible pump cavitation, as represented by box 1512, or a diagnosis of possible pump recirculation, as represented by box 1514.

Figure 16:
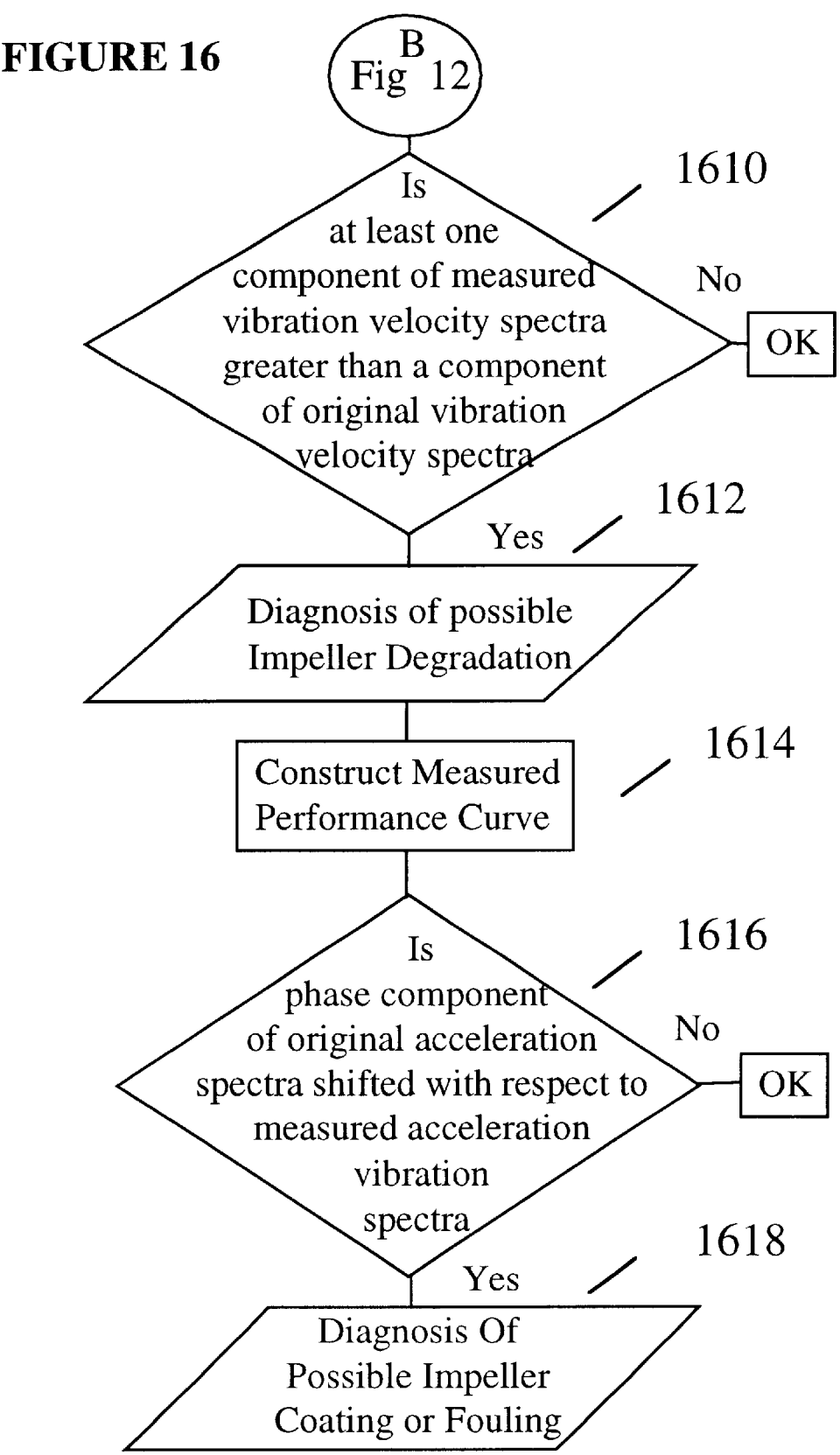

Referring to FIG. 16 and to pump cross sectional drawing FIG. 1b, an additional verification step may be conducted wherein original condition bearing velocity vibration spectra 174 and original condition acceleration vibration spectra are acquired, as well as measured velocity vibration spectra and measured acceleration vibration spectra. Each of the measured and original condition acceleration and vibration spectra has components of amplitude, frequency and phase. Diagnostic apparatus 24 compares at least one of these components selected from the group of amplitude, frequency and phase, as indicated in box 1610, to determine whether possible impeller degradation exists, as indicated in box 1612. It is noted that a continuous high level of vibration at impeller resonant frequency indicates impeller 316 degradation. Increased impeller vibration occurs prior to impeller degradation. Therefore, impeller degradation is preventable. If, during a comparison of the measured velocity vibration spectra, as represented in box 1610, it is determined that the measured vibration velocity spectra is higher than original condition velocity spectra, then it is possible that impeller degradation exists. If a diagnosis of possible impeller degradation is made by diagnostic apparatus 24, as represented by box 1612; then in one embodiment of the method, a measured pump performance curve is constructed as represented by box 1614.

A determination is then made whether a phase shift has occurred, as represented by box 1616, and if so, a diagnosis of possible fouling or coating of an impeller in the rotating equipment is made, as represented by box 1618.

Figure 17:
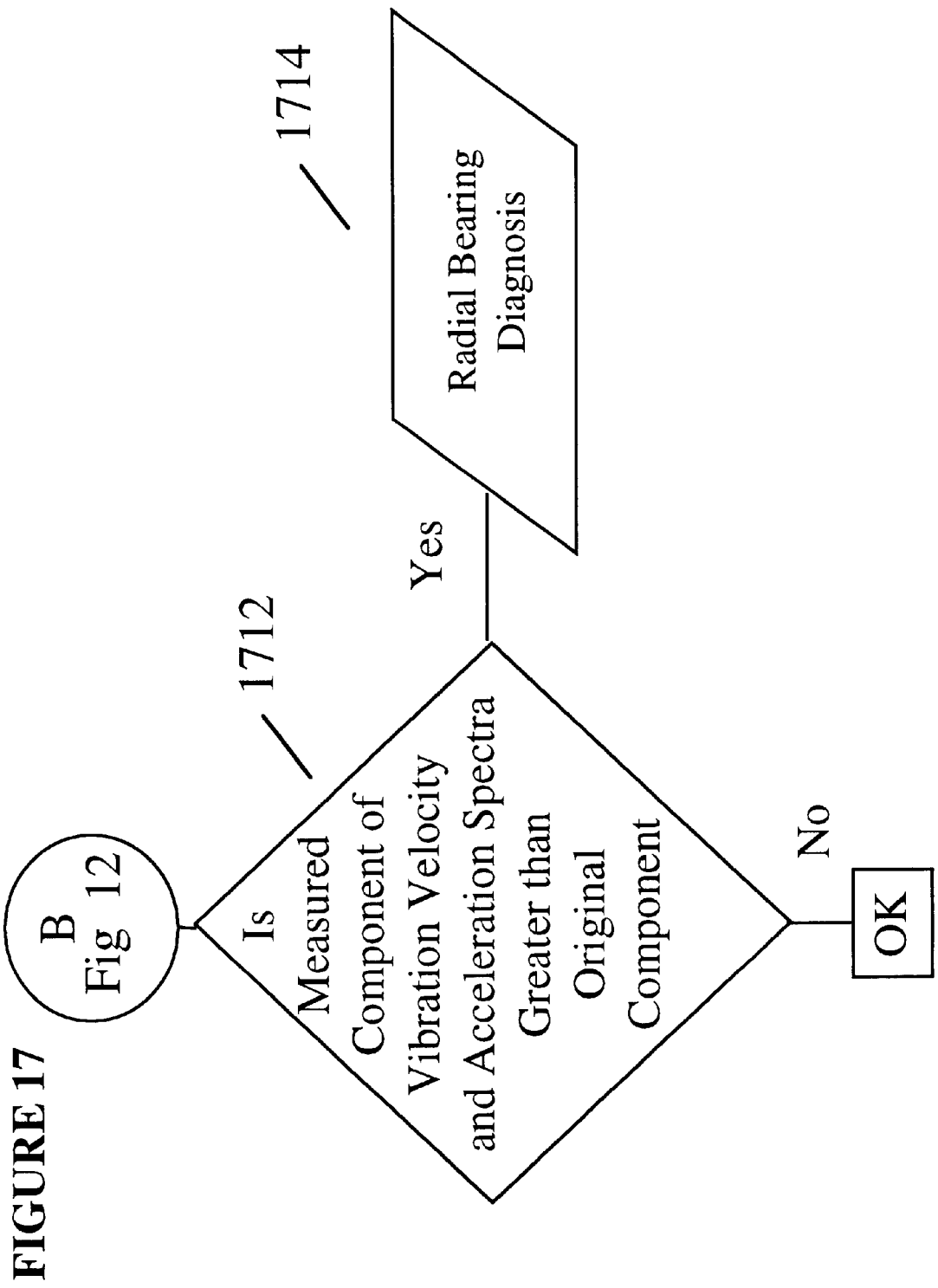

Referring now to FIG. 17, an additional verification step may be conducted wherein original data is comprised of original condition velocity vibration spectra 174 from rotating machine vibration sensor 80 and original condition acceleration vibration spectra from accelerometer 108, (FIG. 1) wherein the original and measured velocity and acceleration spectra have amplitude, frequency and phase components. A comparison is made of at least one of the components selected from the group of amplitude, frequency and phase of the original condition velocity vibration spectra with at least one of the components of the measured velocity vibration spectra, as well a comparison between one of the components of the original condition acceleration vibration spectra with at least one of the components of the measured acceleration vibration spectra, as represented in box 1712. A determination is then made whether radial bearing 310 degradation exists, as represented in box 1714.

Bearing frequency, resonant frequency and harmonics are distinct from impeller vibration, frequency and harmonics. Therefore, if the measured vibration velocity amplitude is higher and the impeller frequency than original condition velocity vibration amplitude 173, then possible impeller degradation exists.

Figure 18:
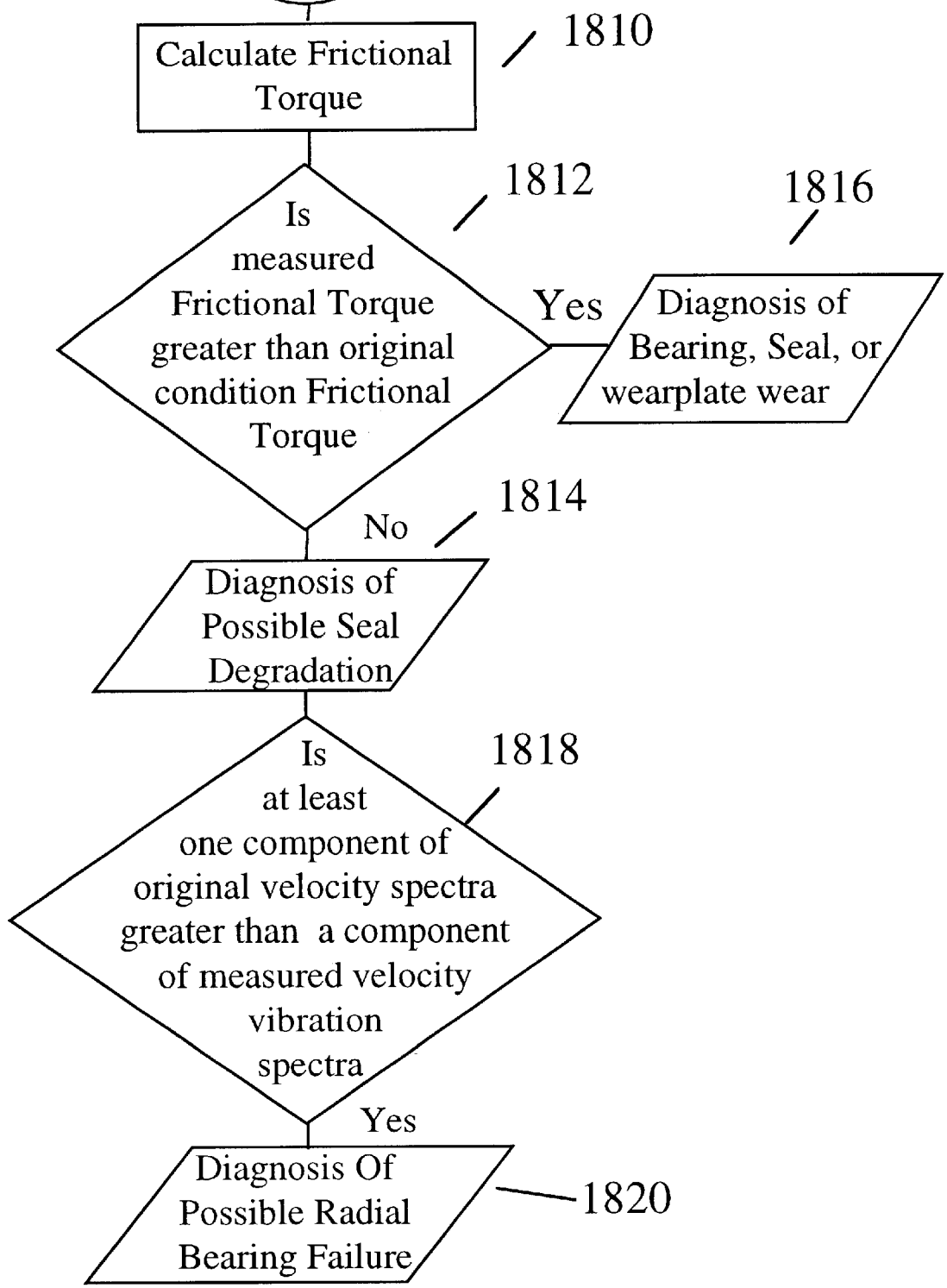

Referring now to FIG. 18, another verification step includes gathering equipment monitoring variables, including pump input torque data from torque sensor 100 and pump shaft angular velocity data from angular velocity sensor 102. With this condition monitoring data, a frictional torque is calculated for the rotating equipment, as indicated in box 1810. A comparison of the measured condition frictional torque with the original condition frictional torque is made, as represented by box 1812, to determine whether bearings 310, 312 and seal 314 or wear plate wear 320 is occurring. Diagnostic apparatus 24 will diagnose possible seal 314, degradation if measured frictional torque is less than the original condition frictional torque, as represented by box 1814. Alternatively, diagnostic apparatus 24 may diagnose bearings 310, 312 seal wear 314 or wear plate 320 wear if the measured frictional torque is greater than original condition frictional torque, as indicated by box 1816. Frictional torque may be calculated from the equation below:

$$Tp = \Sigma T's = I \times \frac{dN}{dt} = Tfl + Tb + Ts$$

where  Tp = Torque to pump
 $I$ = Moment of Inertia of pump shaft/impeller assembly
 $N$ = Pump Speed, rpm
 $Tf$ = Fluid Torque
 $Tb$ = Frictional Torque of bearings
 $Ts$ = Frictoinal Torque of Seal/packing The measured torque delivered by the motor can be compared to the motor manufacturer's recommended "torque to failure" to provide an early warning alert of imminent motor failure if the pump is not repaired and the high torque condition is not corrected.

In an additional verification step, original data is comprised of original vibration, acceleration and velocity spectra from rotating machine vibration sensor 80 or bearing vibration sensor 112, and measured velocity spectra from accelerometer 108, wherein both spectra have amplitude, frequency and phase components. After a diagnosis of possible bearing degradation is made, as indicated in box 1816, a comparison is made of at least one of the components selected from the group of amplitude, frequency and phase of the original vibration velocity or acceleration at the radial bearing resonant frequency or harmonics or acceleration spectra, with at least one of the components of measured vibration velocity spectra 174 to determine whether the measured vibration amplitude is greater than the original vibration amplitude, as indicated in box 1818. If so, a diagnosis of radial bearing 310, FIG. 1b, failure is made, as indicated in box 1820.

Figure 19:
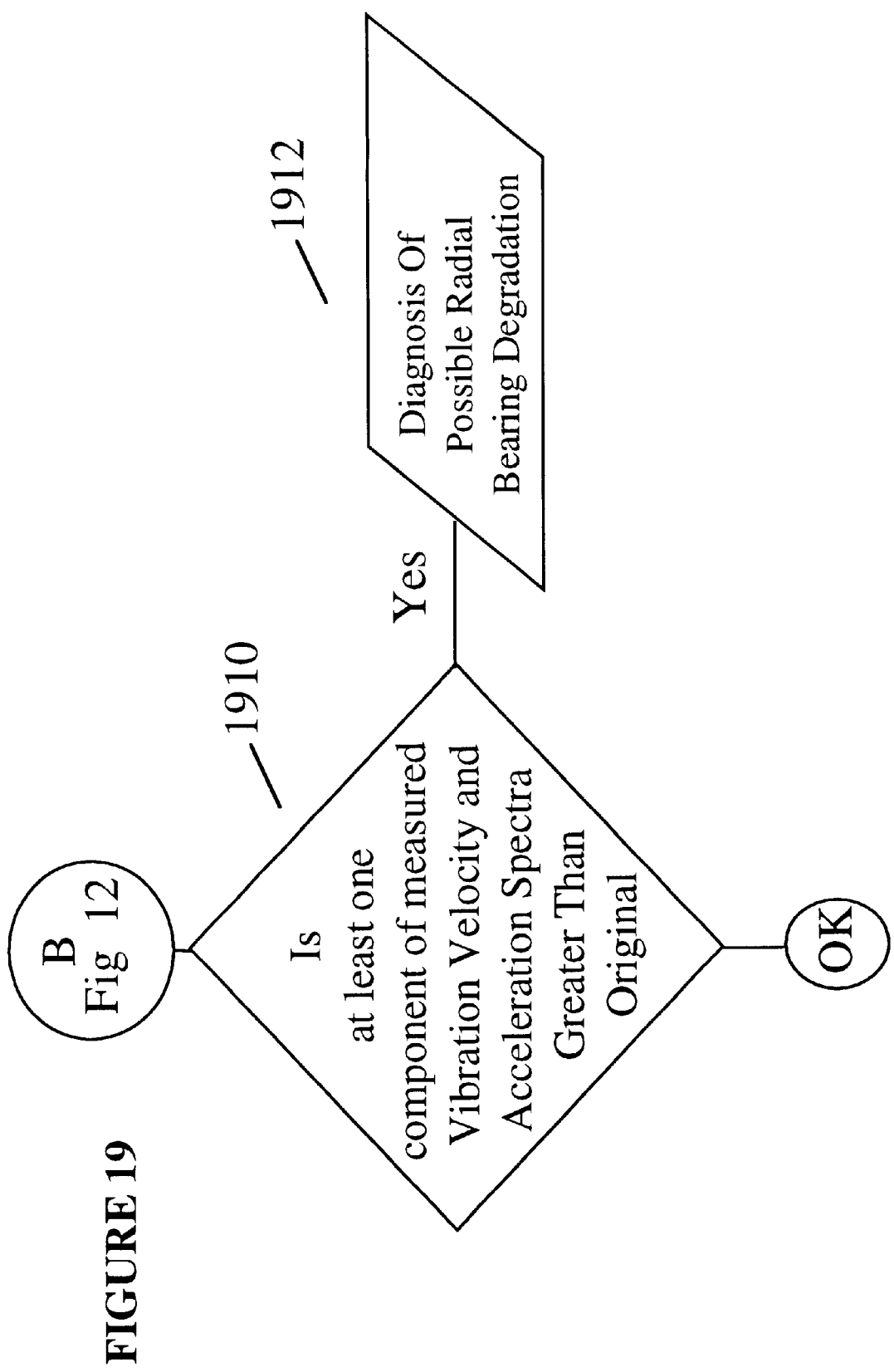

Referring now to FIG. 19, measured radial vibration velocity spectra and measured radial bearing acceleration spectra are obtained from bearing vibration sensor 112. Each of the original and measured radial bearing and acceleration spectra possesses components of amplitude, frequency and phase. A determination is made by comparing at least one of the components selected from the group of amplitude, frequency and phase of the original radial bearing vibration velocity spectra with a component of the measured radial vibration spectra as well as a comparison of the original radial bearing acceleration spectra with at least one component of the measured radial bearing acceleration spectra, as indicated in box 1910. If at least one component of the measured vibration velocity and acceleration spectra is greater than the original component, then a determination is made by diagnostic apparatus 24 of possible bearing degradation, as indicated in box 1912.

Figure 20:
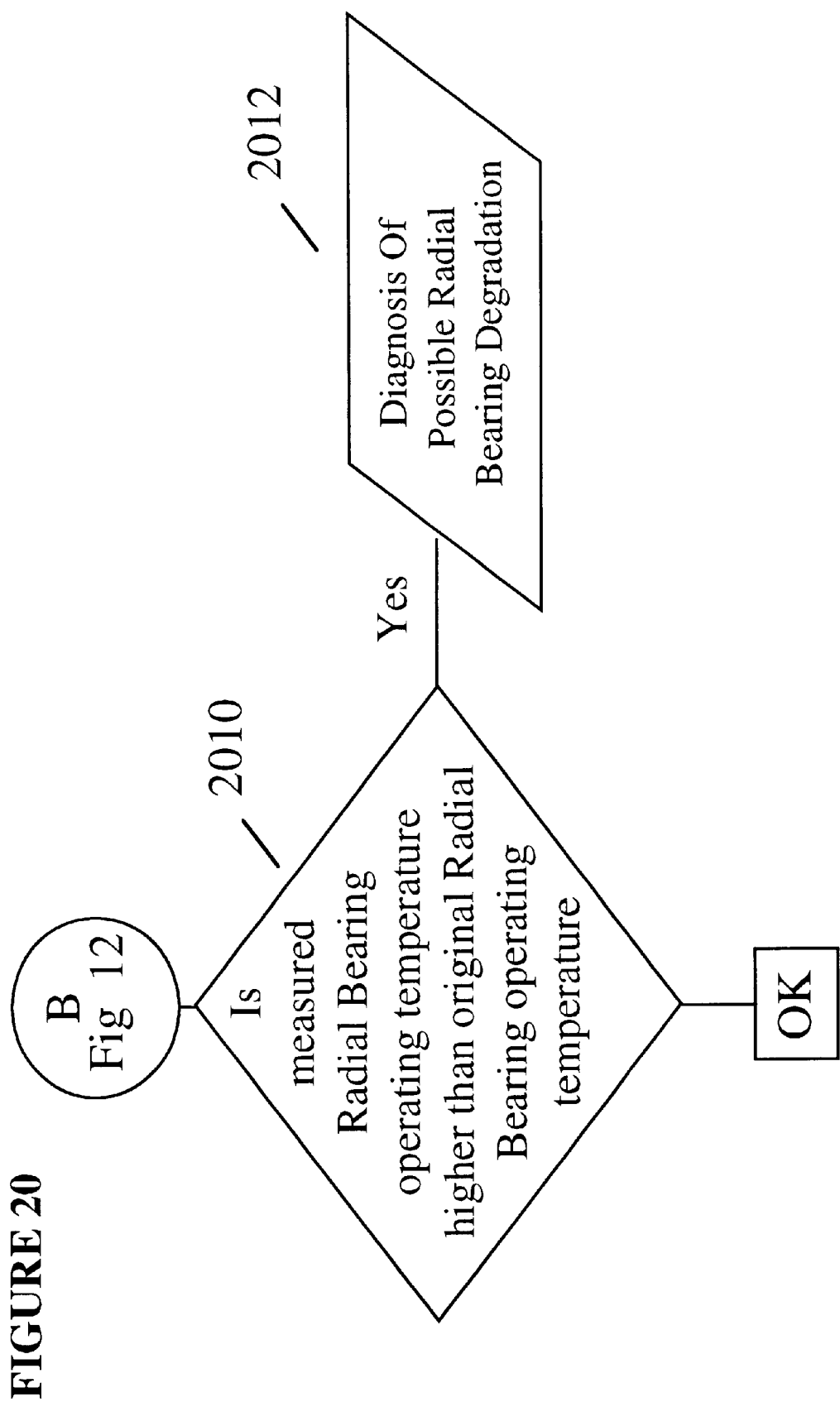

Referring to FIG. 20, a further verification step requires a comparison of original radial bearing 310 operating temperature with measured radial bearing operating temperature as indicated in box 2010. The original radial bearing operating temperature is obtained from original data and the measured radial bearing operating temperature is obtained from temperature sensor 118. If the measured radial bearing operating temperature is determined by diagnostic apparatus 24 to be greater than original radial bearing temperature, then a diagnosis of possible radial bearing degradation is made, as represented by box 2012.

Figure 21:
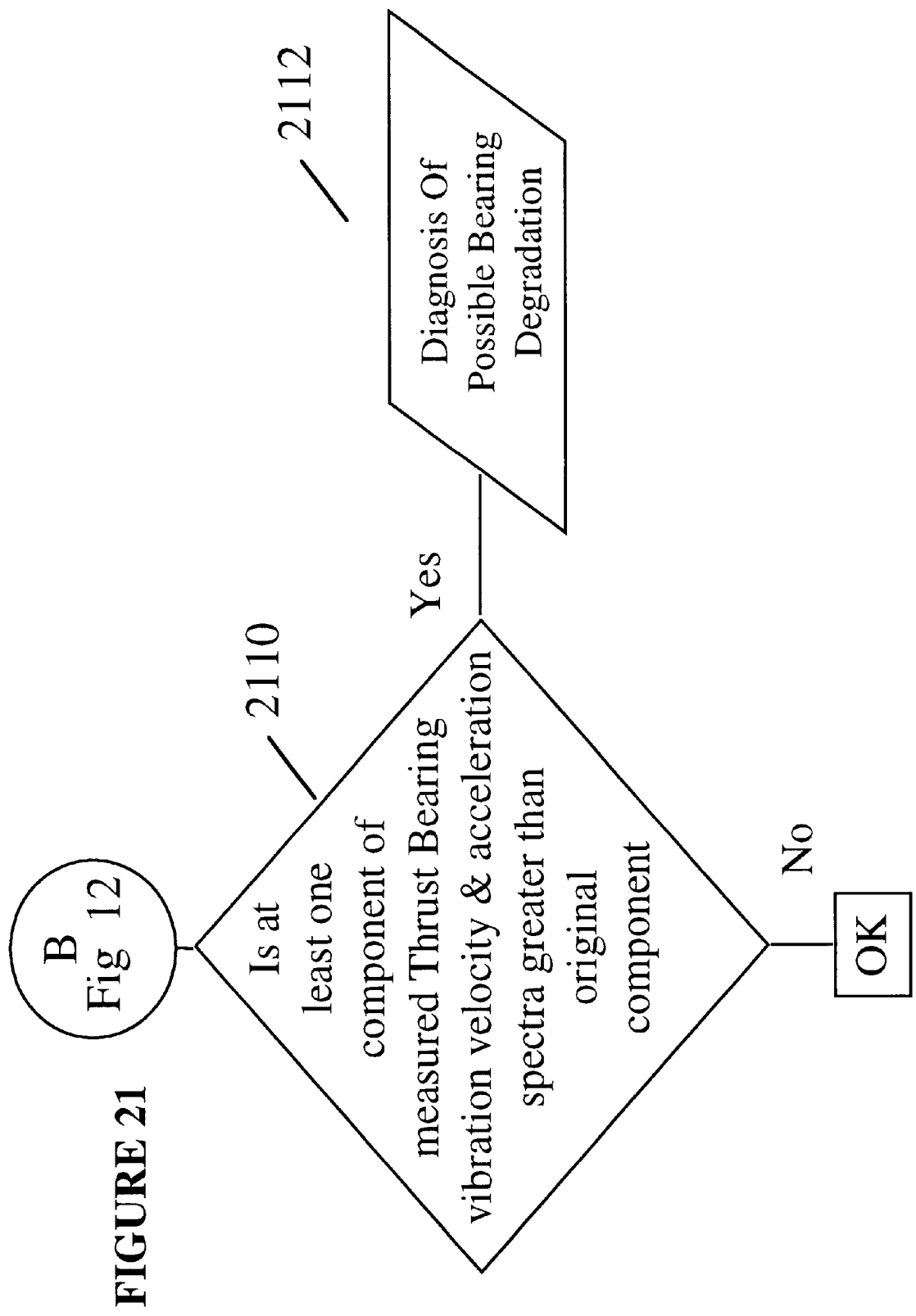

Referring to FIG. 21, a further verification step is that of comparing at least one of the components of amplitude, frequency and phase of original thrust bearing vibration velocity spectra with at least one of the components of measured velocity vibration spectra obtained from bearing vibration sensor 112. Additionally, a comparison is made between at least one of the components of original thrust bearing acceleration spectra with at least one of the components of measured acceleration spectra obtained from accelerometer 108, as represented by box 2110. If it is determined that at least one of the components of the measured vibration velocity and acceleration spectra is greater than an original component of vibration velocity spectra, then a diagnosis of possible thrust bearing 312 degradation is made by diagnostic apparatus 24, as represented by box 2112.

Figure 22:
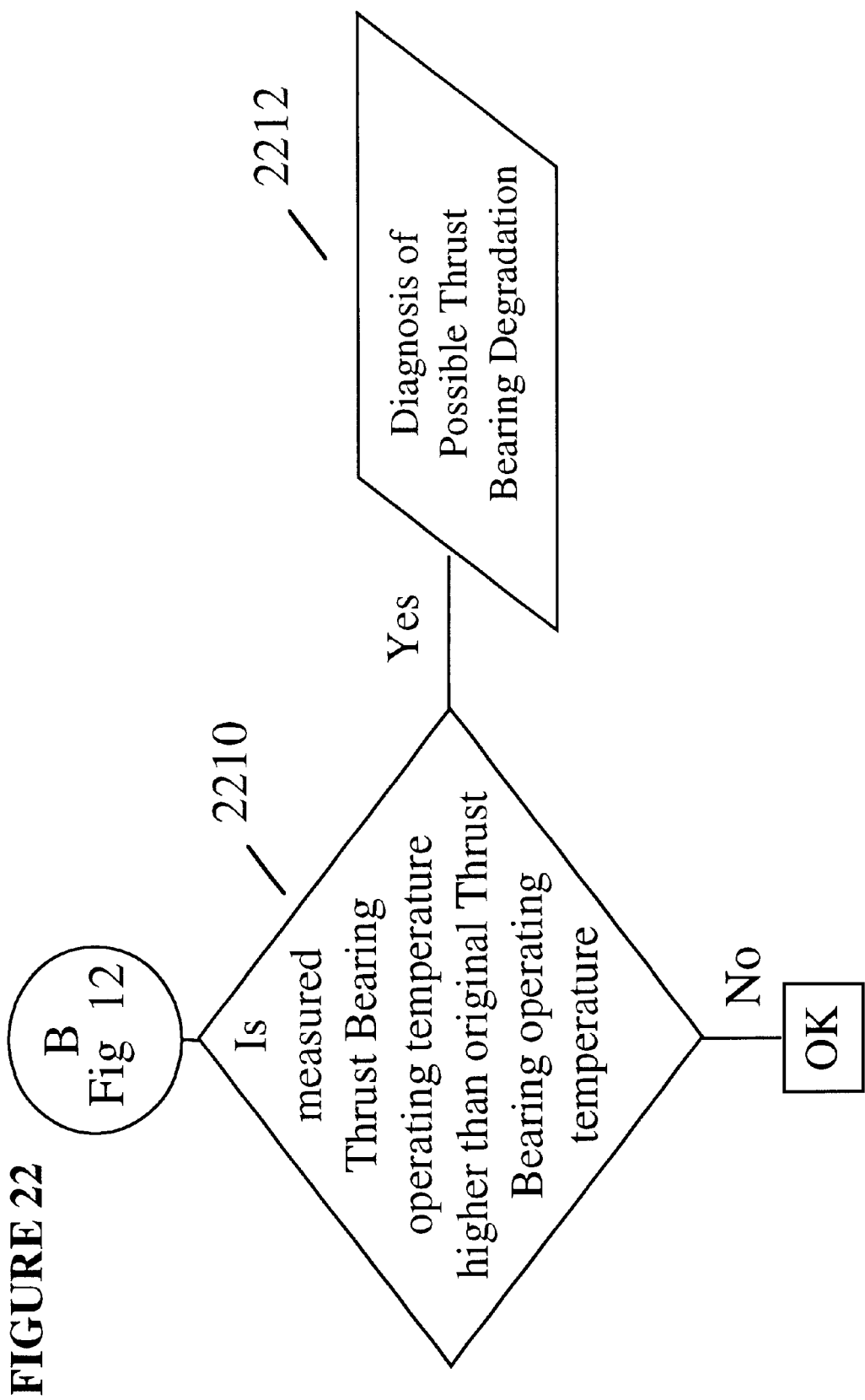

Referring now to FIG. 22, a further verification step may be conducted by comparing original thrust bearing 312 operating temperature obtained from original data, and measured thrust bearing operating temperature obtained from bearing temperature sensor 110 to determine whether thrust bearing degradation exists. If measured thrust bearing operating temperature is greater than original thrust bearing operating temperature, as indicated by box 2210, then a diagnosis of possible thrust bearing degradation is made by diagnostic apparatus 24, as represented by box 2212. Original thrust bearing operating temperature is obtained from original data.

Figure 23:
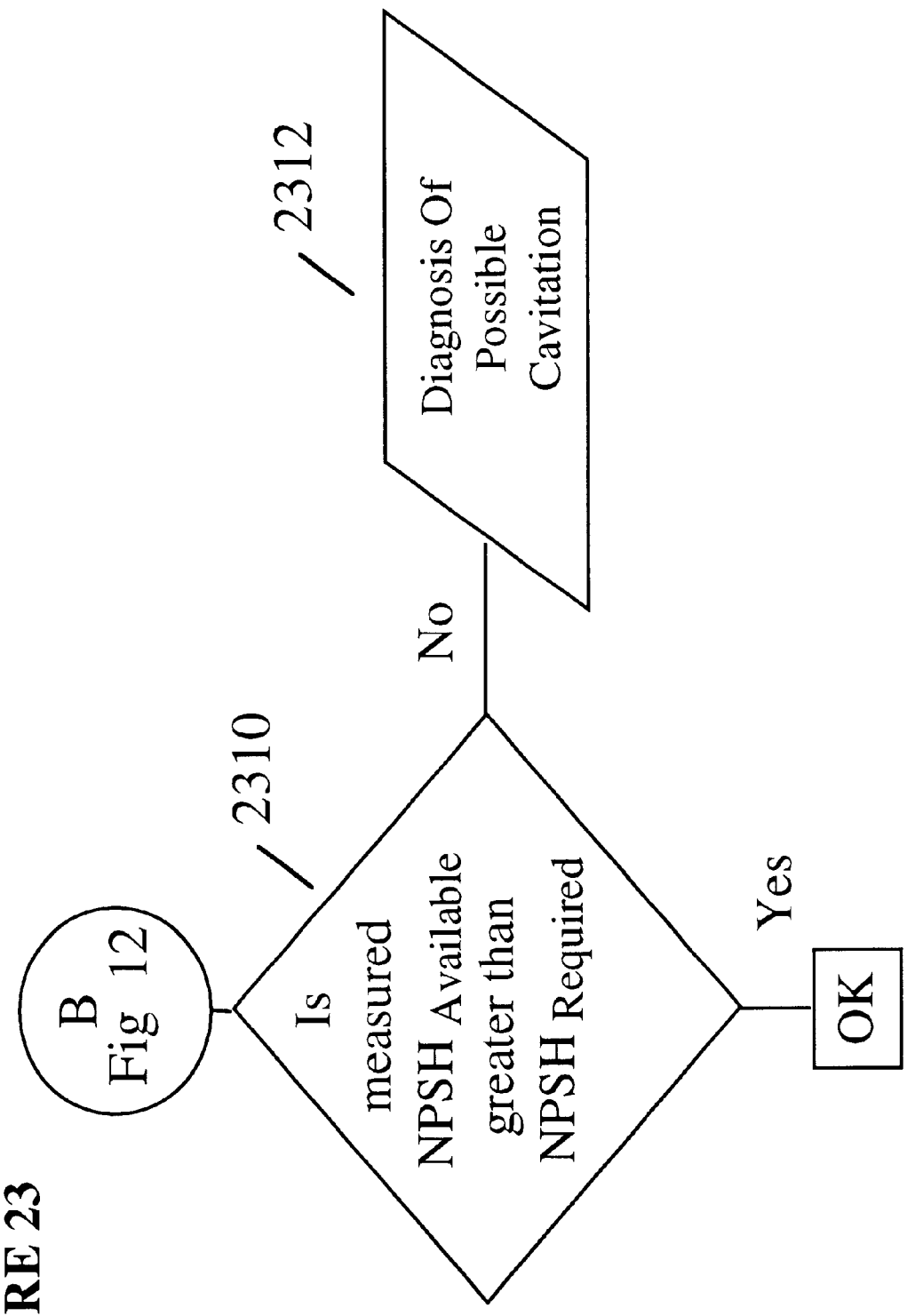

Referring to FIG. 23, an additional verification step is conducted to determine if sufficient measured available net positive suction head exists to operate pump 14 without cavitation. Measured available net positive suction head is calculated by using a well known equation from data obtained from inlet pressure sensor 32 (FIG. 1). This determination is made by determining if the measured net positive suction head is greater than the net positive suction head required, as represented by box 2310. If so, a diagnosis of possible cavitation is made by diagnostic apparatus 24, as indicated in box 2312.

Figure 24:
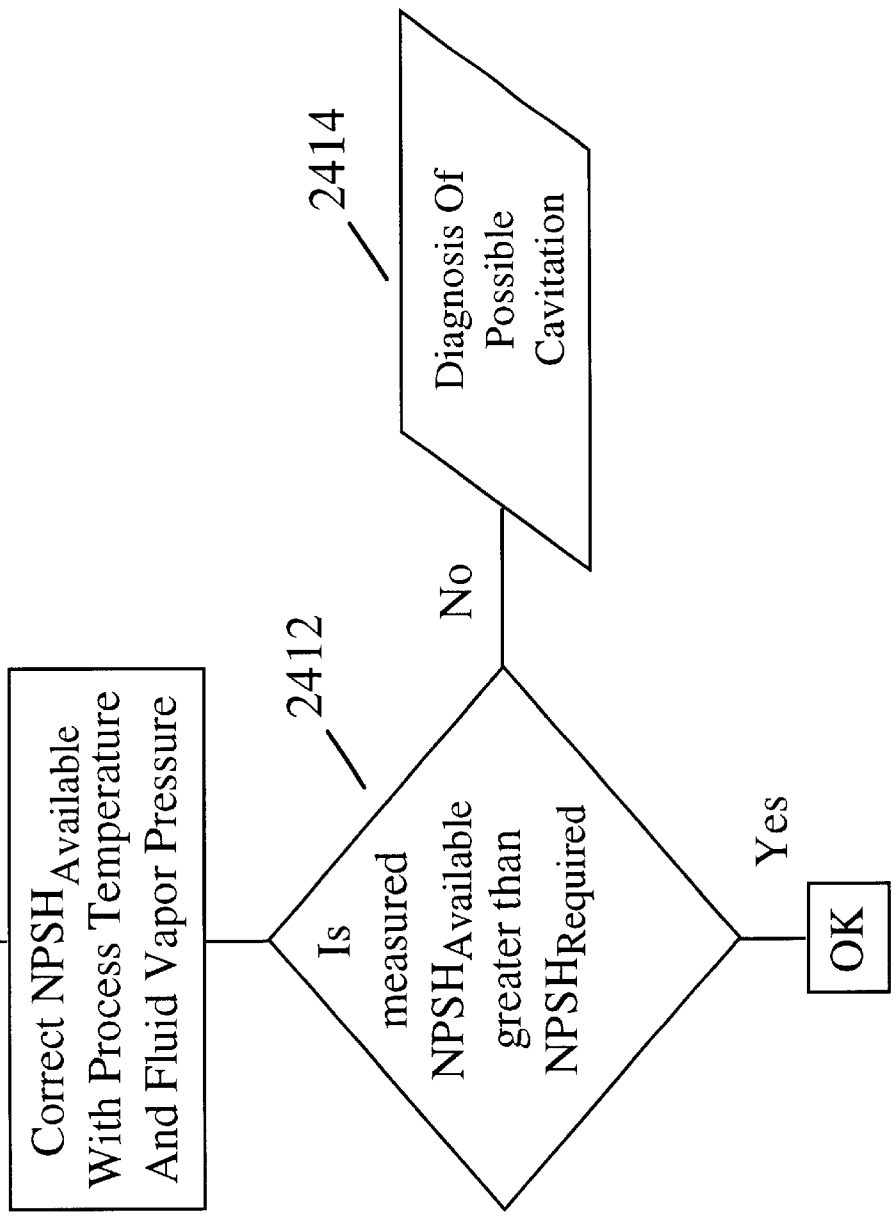

Referring now to FIG. 24, an additional verification step is made to determine if sufficient measured net positive suction head available exists to operate without cavitation. However, in the preferred method, the additional step of correcting the measured net positive suction head for the measured operating temperature and fluid vapor pressure is made, as represented by box 2410. A determination is then made whether the corrected measured net positive suction head available is greater than the required net positive suction head as represented by box 2412. If not, then diagnostic apparatus 24 makes a diagnosis of possible cavitation, as indicated in box 2414. The original required net positive suction head and the fluid vapor pressure, both of which are available from original data, are compared with the measured net positive suction head and the measured net positive suction head and calculated utilizing the measured operating temperature of the process fluid is obtained by temperature sensing device 30 (FIG. 1).

Figure 25:
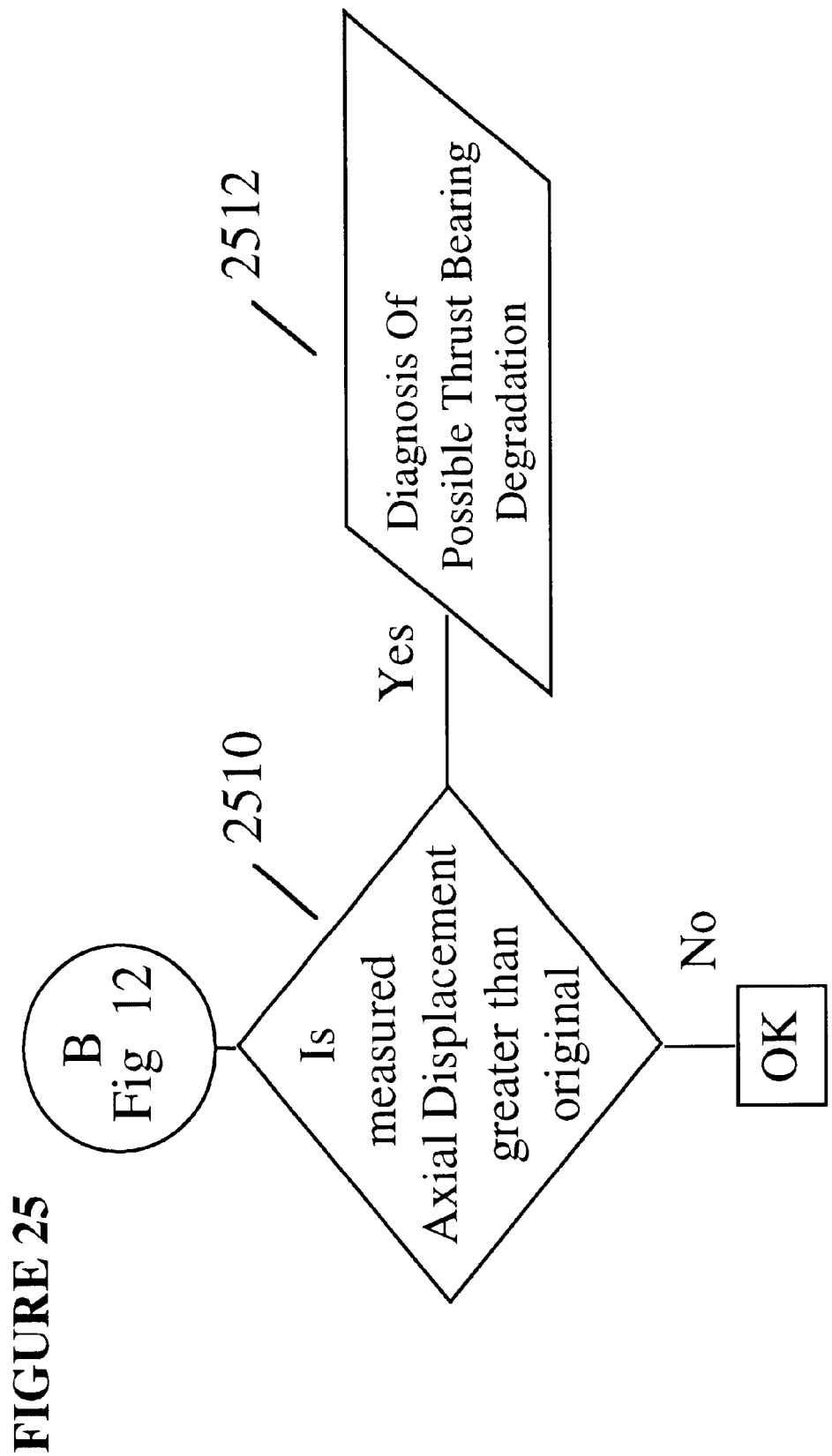

Referring to FIG. 25, a further verification step is conducted to determine if thrust bearing degradation exists. Original axial thrust bearing displacement data is obtained from original data and measured axial thrust bearing displacement data is obtained from displacement sensor 113. A comparison of the original axial thrust bearing displacement data with measured axial thrust bearing displacement data is conducted to determine whether measured axial displacement data is greater than original axial displacement data, as represented by box 2510. If diagnostic apparatus 24 determines that measured axial displacement data is greater than original, and the bearing clearance is in excess of the manufacturer's recommended clearance, then a diagnosis of possible thrust bearing 312 degradation is made, as represented by box 2512. It is noted that axial displacement sensor 113 measures the distance from thrust bearing 312 to a reference housing 322. Typically, bearing 312 will move due to backpressure from rotating equipment 14 which forces thrust bearing 312 into its race, thereby compressing bearing 312. A measurement may be made by an electronic proximity sensor such as those provided by Bently Nevada. Original axial thrust bearing displacement data is obtained from a manufacturer to provide an acceptable clearance specification for the thrust bearing. Displacement sensors may also be used to measure radial bearing clearance.

Figure 26:
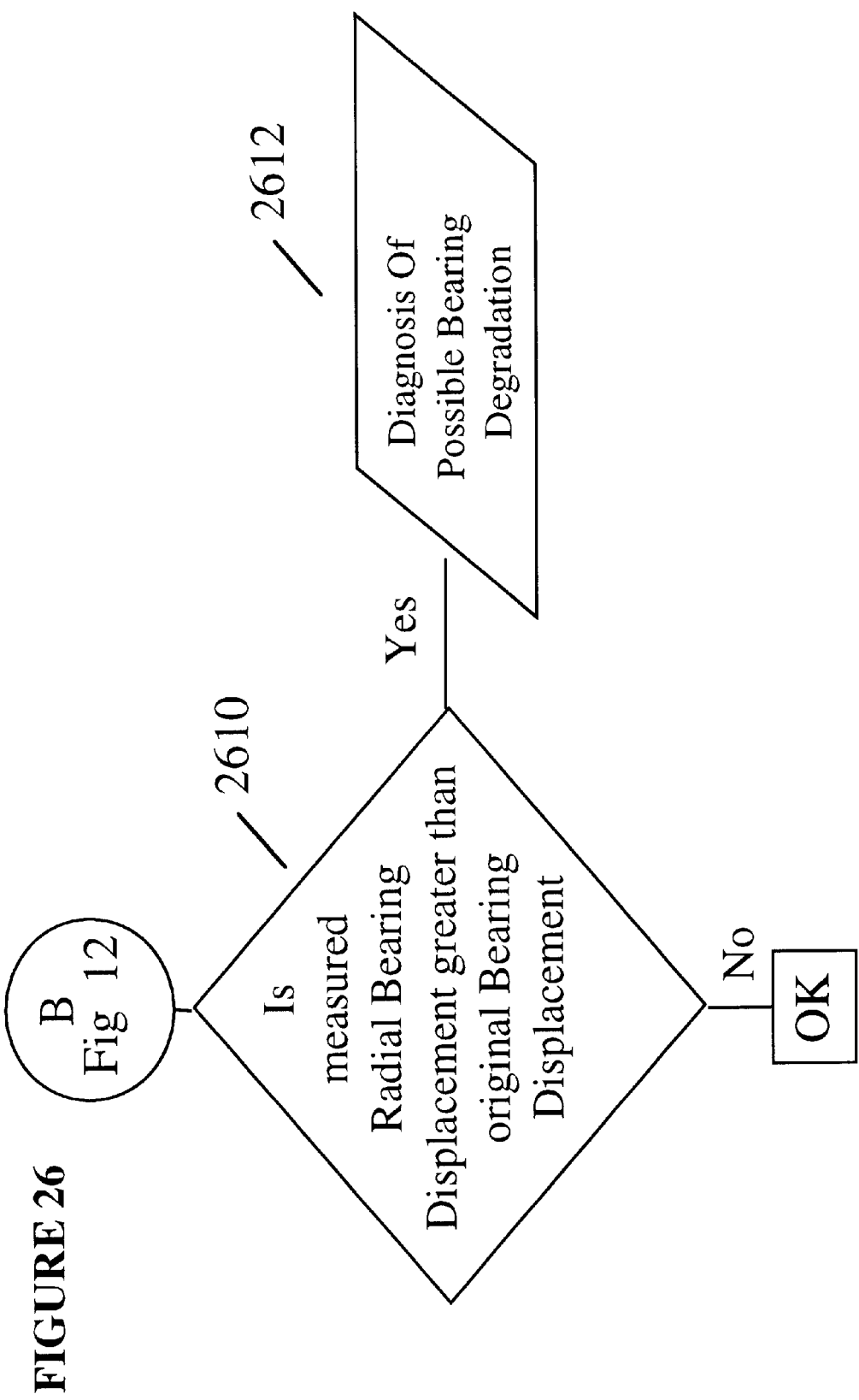

Referring now to FIG. 26, an additional verification step may be conducted to determine whether radial bearing 310 degradation exists. A comparison is made between original radial bearing displacement data obtained from original data with measured radial bearing displacement data obtained from proximity sensor 113. If measured radial bearing displacement data is determined to be greater than original radial bearing displacement data, as indicated in box 2610, then diagnostic apparatus 24 determines that radial bearing degradation exists, as represented in box 2612.

Figure 27:
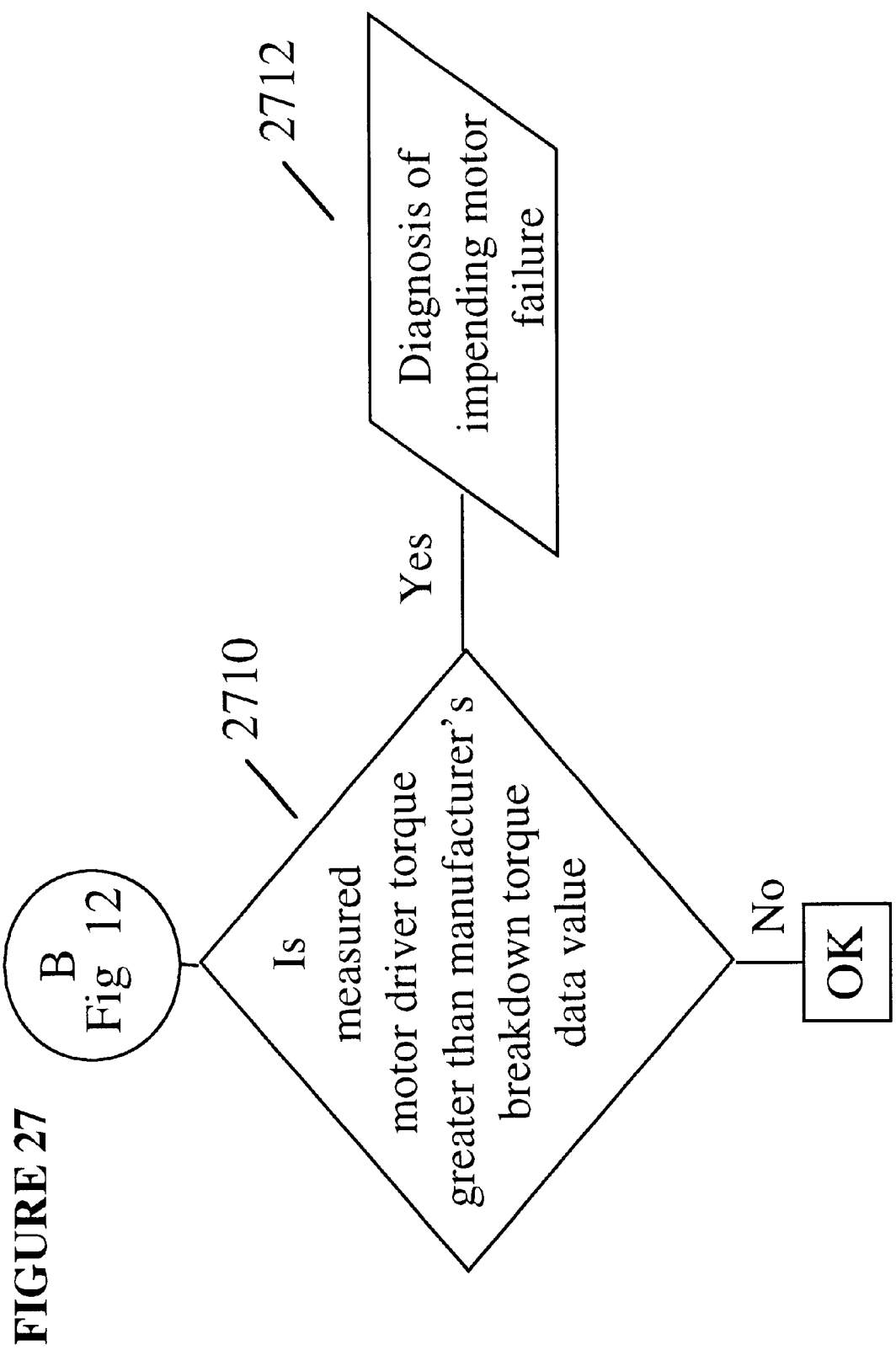

Referring to FIG. 27, an additional verification step may be conducted to determine whether impending motor failure exists. This diagnosis is made by comparing the manufacturer's original motor breakdown torque, which is obtained from original data, with measured electric motor output torque 100. Diagnostic apparatus 24 determines whether measured motor torque exceeds the manufacturer's recommended torque, as indicated by box 2710. If so, a diagnosis of impending motor 12 failure is made, as presented by box 2712.

Figure 28:
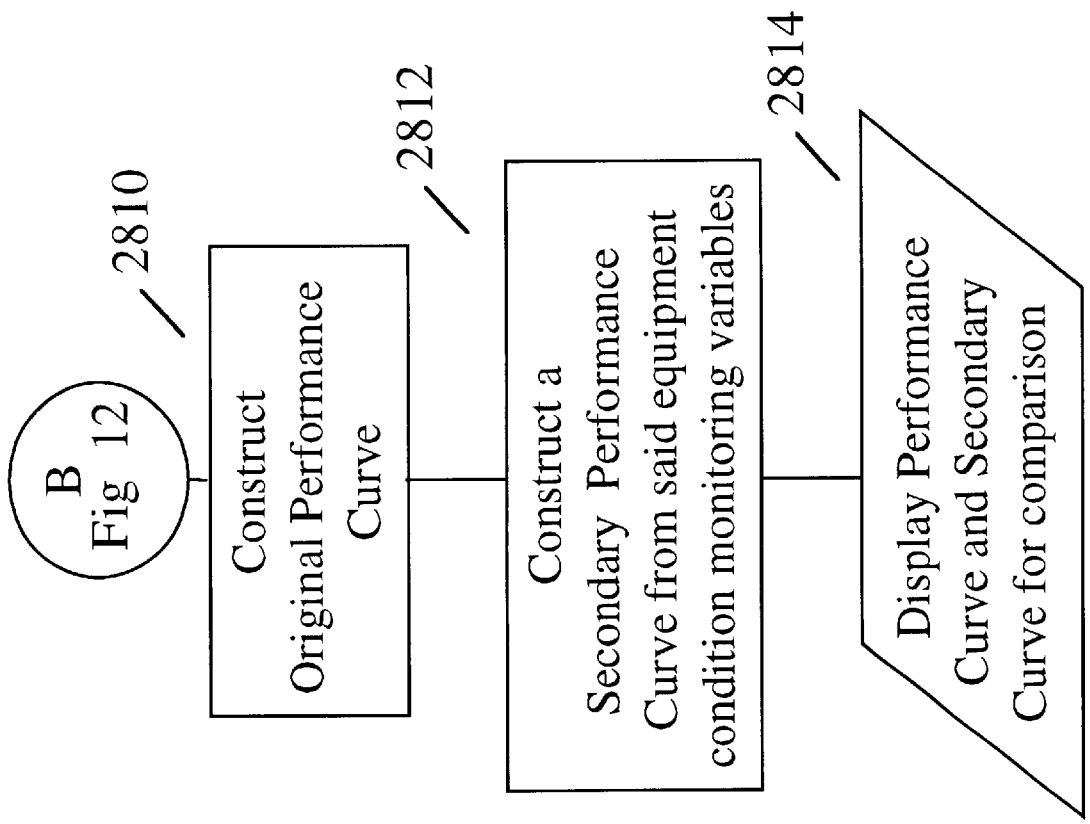
Figure 29:
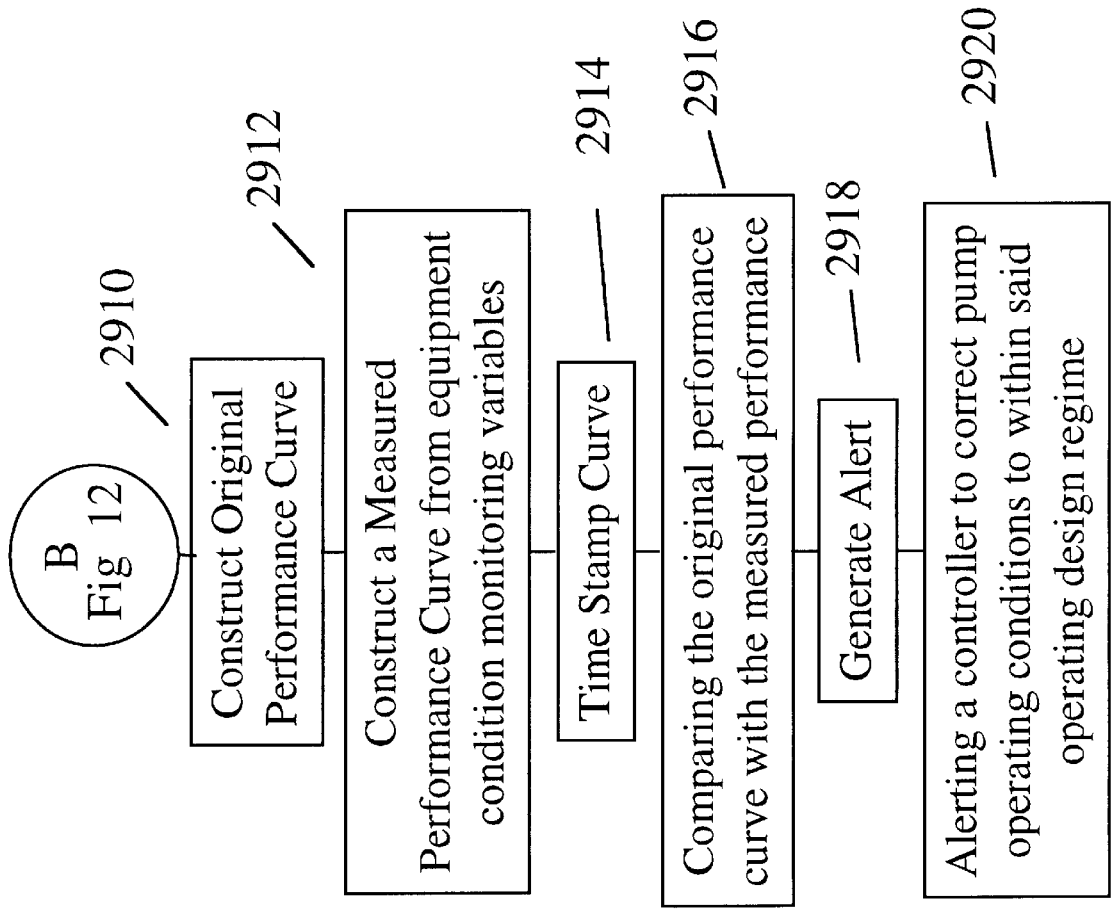

Referring now to FIG. 28, an additional verification step may be made wherein a display is generated of the performance curve and secondary curve for comparison. Examples of secondary curves in FIG. 9 include NPSH v. H&Q, BHP v. H&Q, efficiency v. H&Q, specific speed v. H&Q, bearing force v. H&Q, and Dynamic Pressure v. H&Q. To perform this verification step, a selected secondary curve is constructed from equipment condition monitoring variables, as represented by box 2812. An original secondary curve is constructed, represented by box 2810, and a display of the original performance curve and the secondary curve is made for comparison, as represented by box 2814.

An additional step may be conducted to generate alerts if rotating equipment 14 is operating outside of its recommended design regime 166 or BEP regime 164 (FIG. 6a). One method of acquiring data sufficient to generate an alert includes constructing an original performance curve from original data, as represented by box 2910, and then constructing a measured performance curve from equipment condition monitoring variables, as represented by box 2912. Optionally, diagnostic apparatus 24 time-stamps the measured performance curve, as represented by box 2914. Diagnostic apparatus 24 then compares the original performance curve and the measured performance curve to determine the change in the pump performance variables, as represented in box 2916. If the change exceeds the manufacturer's recommended range, then diagnostic apparatus 24 generates an alert, as represented by box 2918, so that action may be taken to prevent operation of rotating equipment 14 outside of its recommended design regime 166 (FIG. 6a).

Additionally, diagnostic apparatus 24 may alert a controller to correct pump operating conditions to within the operating design regime 166, as indicated by box 2920.

Additionally, a similar procedure may be undertaken, except that instead of constructing original performance curves and measured performance curves, a process data point may be plotted from process variables and a secondary data point may be plotted from equipment condition monitoring variables to determine if rotating equipment 14 is operating outside of its recommended design regime 166 (FIG. 6a).

Referring to FIG. 30, the verification step may also include alerting a controller to correct pump operating conditions to within a design condition. The steps of alert and correction are accomplished by constructing an original performance curve from original data, as represented by box 3210, constructing an original secondary curve from original data, as represented by box 3212, constructing a measured secondary curve from condition monitoring variables as represented by box 3214, constructing a measured secondary curve from equipment monitoring variables, as represented by box 3216, and then comparing the original performance curve with the measured performance curve to determine the change in the pump performance variables, as represented in box 3218. If the change exceeds the manufacturer's recommended range, an alert is generated, as represented by box 3220. From the comparisons, diagnostic apparatus 24 may alert a controller to correct pump operating conditions to within an operating design regime 166 (FIG. 6a), as indicated by box 3222.

Figure 31:
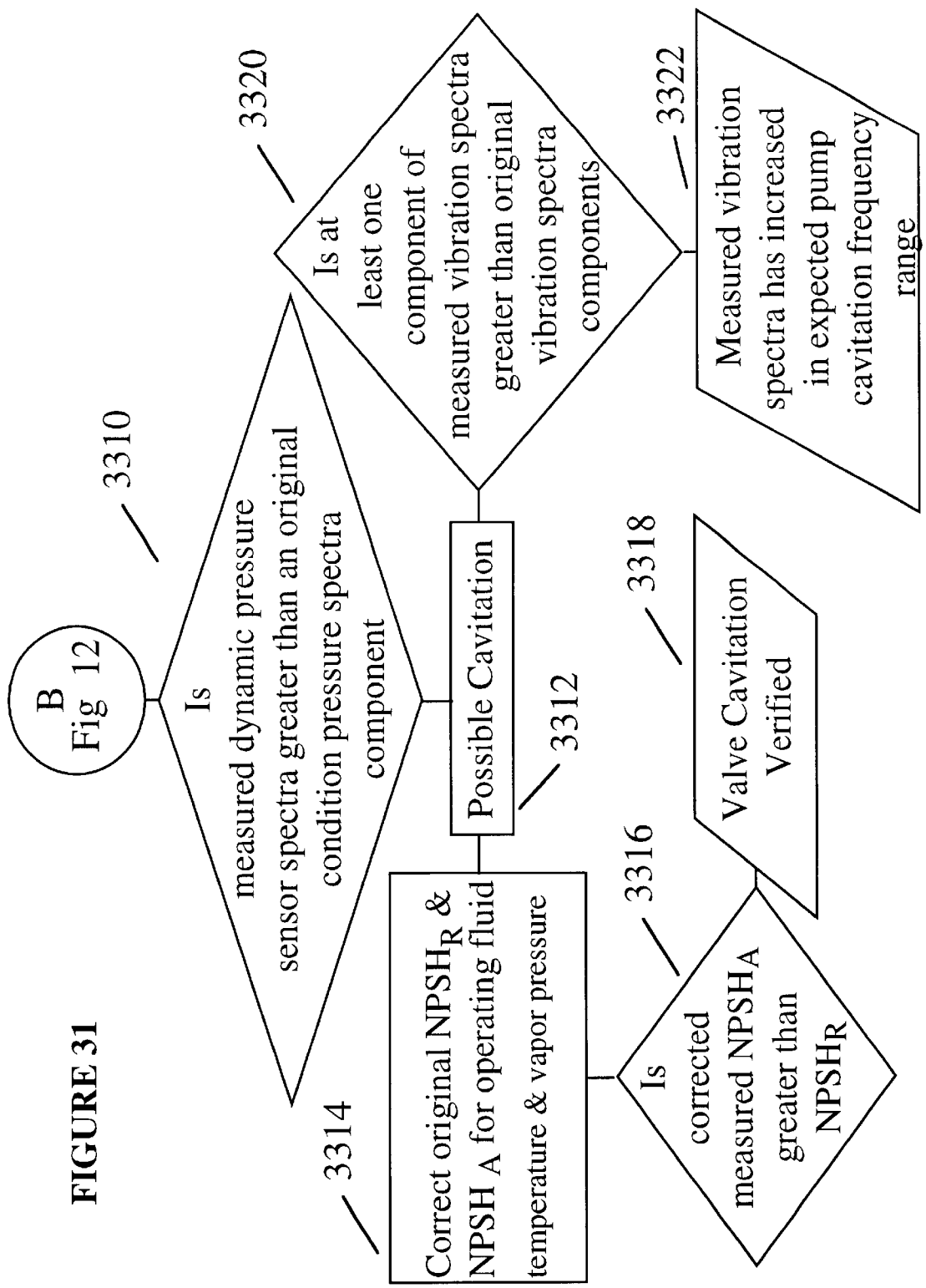
Figure 32:
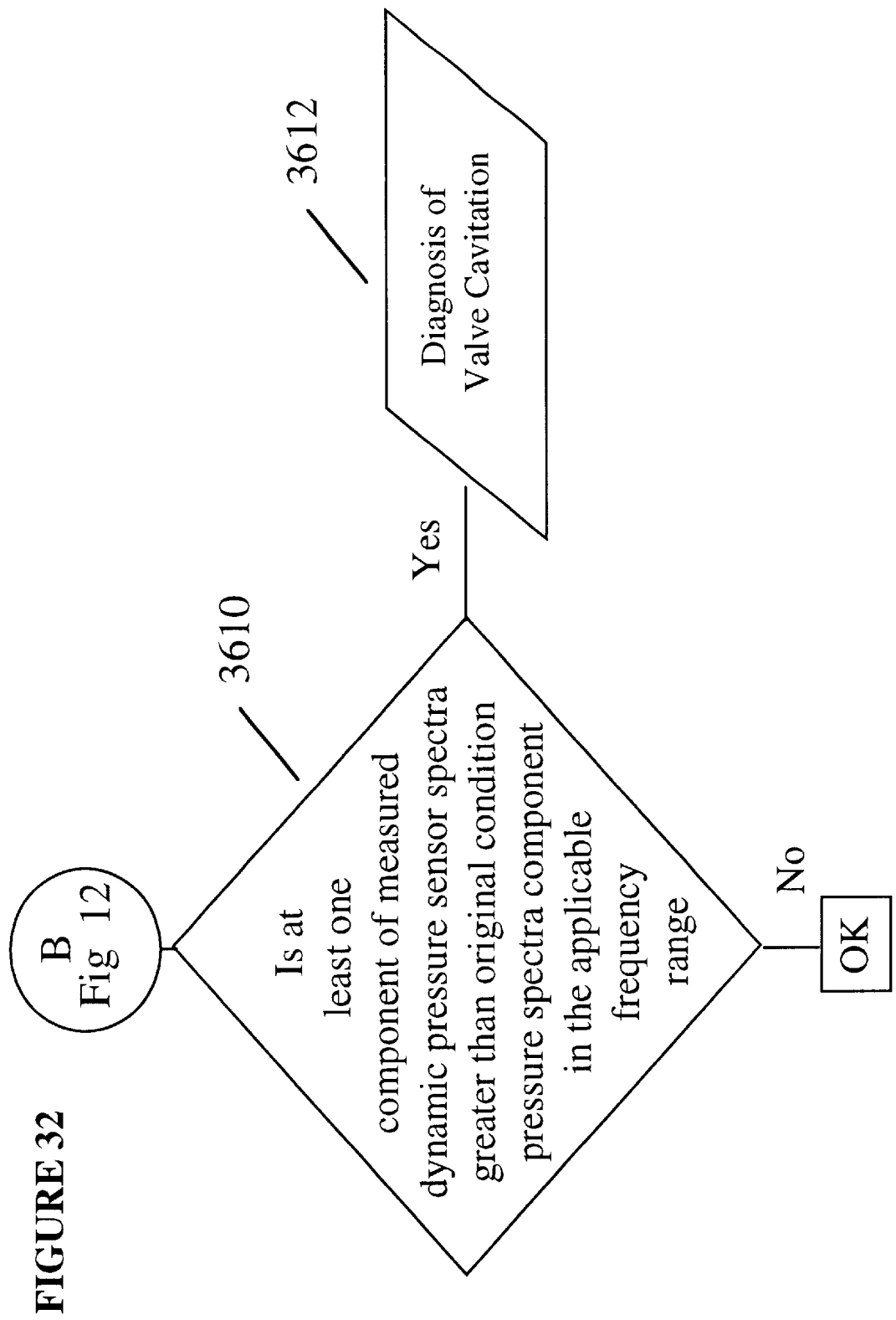

Referring now to FIG. 31, an additional verification step includes determining whether valve cavitation exists. This determination is made by comparing at least one of the components of amplitude, frequency and phase of measured dynamic pressure sensor spectra obtained from dynamic pressure sensor 82 (FIG. 1) with at least one component of original condition dynamic pressure sensor spectra obtained from original data, as represented by box 3310. If at least one component of measured dynamic pressure sensor spectra is greater than a component of original condition pressure spectra, as indicated by box 3310, then diagnostic apparatus 24 hypothesis possible valve cavitation, as indicated by box 3312.

An additional verification step may be made by determining if sufficient corrected measured net positive suction head available exists, such that the pump is not cavitating. This verification involves the step of correcting the original net positive suction head required for operating fluid temperature 30 (FIG. 1) and fluid vapor pressure, as indicated in box 3314. Diagnostic apparatus 24 then makes a determination of whether measured net positive suction head available is greater than net positive suction head required, as indicated in box 3316. If so, diagnostic apparatus 24 makes a determination that the diagnosis of valve cavitation is verified, as represented in box 3318. That is, if $NPSH_R > NPSH_A$, it is likely that the pump is cavitating. However, if cavitation is detected and pump $NPSH_A > NPSH_R$, then the source of cavitation is a valve and not the pump 14.

An additional verification step includes determining whether measured vibration spectra has increased in an expected pump cavitation frequency range. This determination is made by comparing at least one of the components of amplitude, frequency and phase of measured vibration spectra with at least one of the components of original condition vibration spectra to determine whether at least one component of measured vibration spectra is greater than a component of original condition vibration spectra, as represented by box 3320. If so, then the measured vibration spectra has increased in the expected pump cavitation frequency range, as indicted by box 3322, which verifies the determination of cavitation made above in box 3312.

Figure 36:
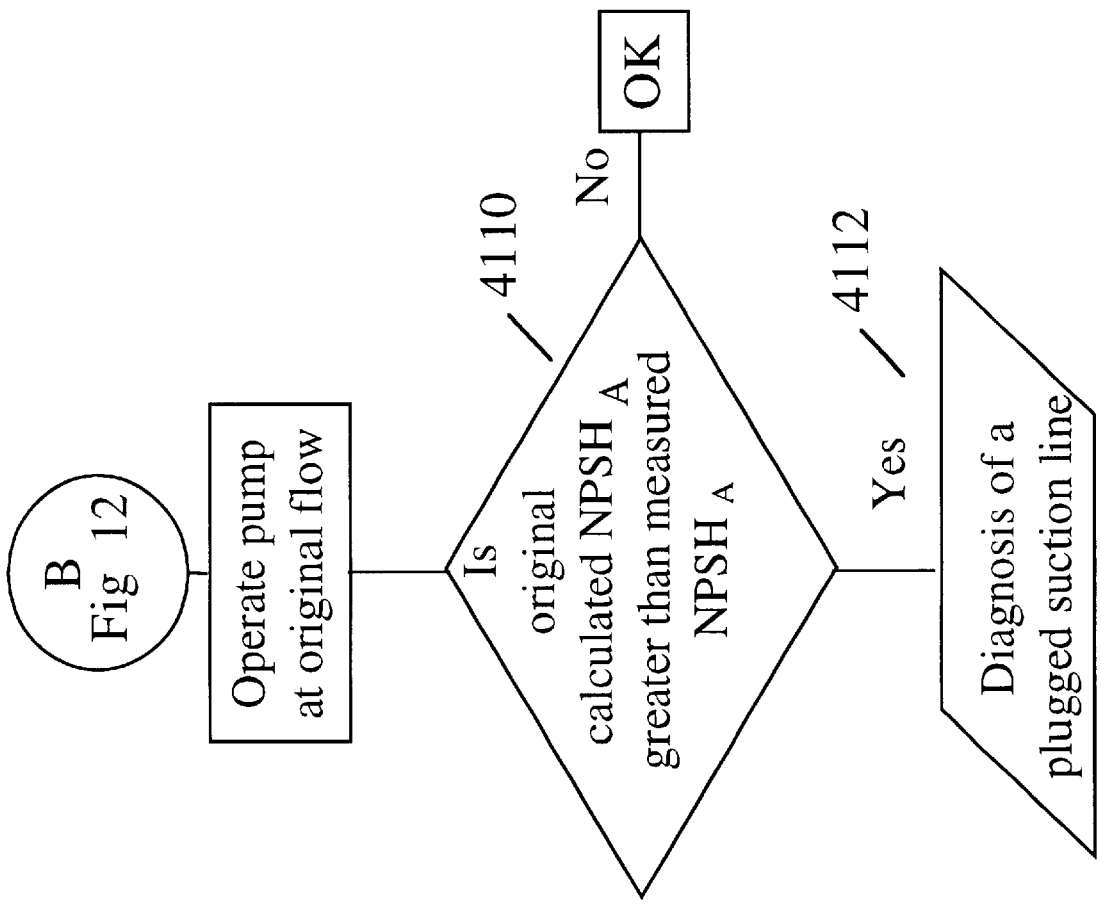

Referring to FIG. 36, a further verification step may be made to verify pump cavitation. This diagnosis is made by comparing at least one of the components of amplitude, frequency and phase of measured vibration spectra with at least one of the components of original condition vibration spectra to determine whether at least one of the components of measured dynamic pressure spectra is greater than at least one of the components of original condition pressure spectra, as represented by box 3610. It is noted, however, that the comparison must be made in the appropriate frequency range. If it is determined that at least one component of the measured dynamic pressure sensor spectra is greater than a component of the original condition pressure spectra, then diagnostic apparatus 24 diagnoses valve cavitation, as represented in box 3612.

Figure 33:
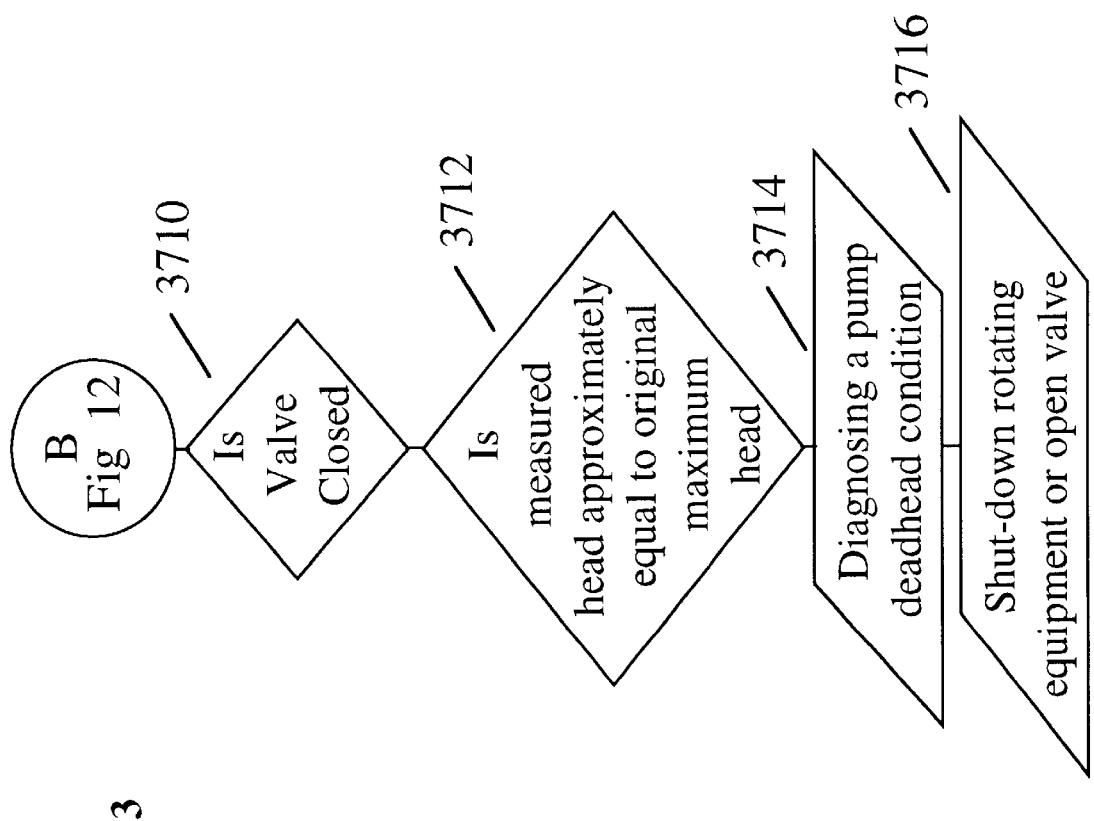

Referring now to FIG. 33, an additional step of diagnosing a pump deadhead condition and sending a signal to shut down rotating equipment (FIG. 1) 14 or open valve 22 is made by acquiring control valve shaft position data from control valve position sensor 34. From control valve shaft position data, a determination is made whether valve 22 is closed, as represented in box 3710. A determination is then made by comparing measured head with original condition head to determine whether head is at a maximum, as represented by box 3712. If so, a diagnosis of pump deadhead condition is made, as represented in box 3714, and diagnostic apparatus 24 sends a signal to the controller to shut down rotating equipment 14 or open valve 22 to alleviate pump deadhead condition, as represented by box 3716.

Figure 34:
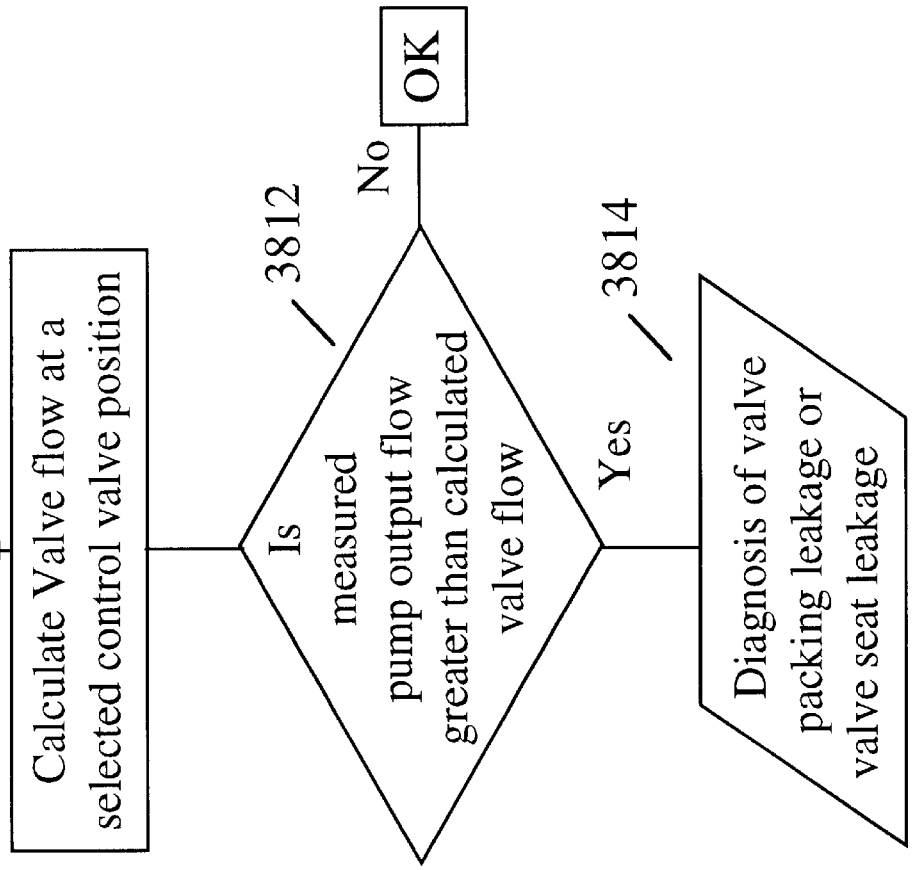

Referring to FIG. 34, additional steps may be undertaken to determine whether valve packing leakage or valve seal leakage is occurring. This determination is made by obtaining control valve flow data from original data and obtaining the control valve position from valve position sensor 34 (FIG. 1). Diagnostic apparatus 24 then calculates valve flow from the valve data at the control valve position, as represented by box 3810. A comparison is then made between measured pump output flow with calculated valve flow to determine if measured pump output flow is greater than calculated valve flow, as represented by box 3812. If so, diagnostic apparatus 24 makes a diagnosis of valve packing leakage or valve seat leakage as represented by box 3814. The equation used to calculate valve flow is as follows:

$$Qv = Cv * A * (\Delta P / SG) ** 0.5$$

where:

Qv=Valve Volumetric Flow

Cv=Valve Flow Coefficient at position, y (valve data)

$\Delta P$=Pressure Drop Across the Valve

SG=Liquid Specific Gravity

A=Flow Area of the Valve

Figure 35:
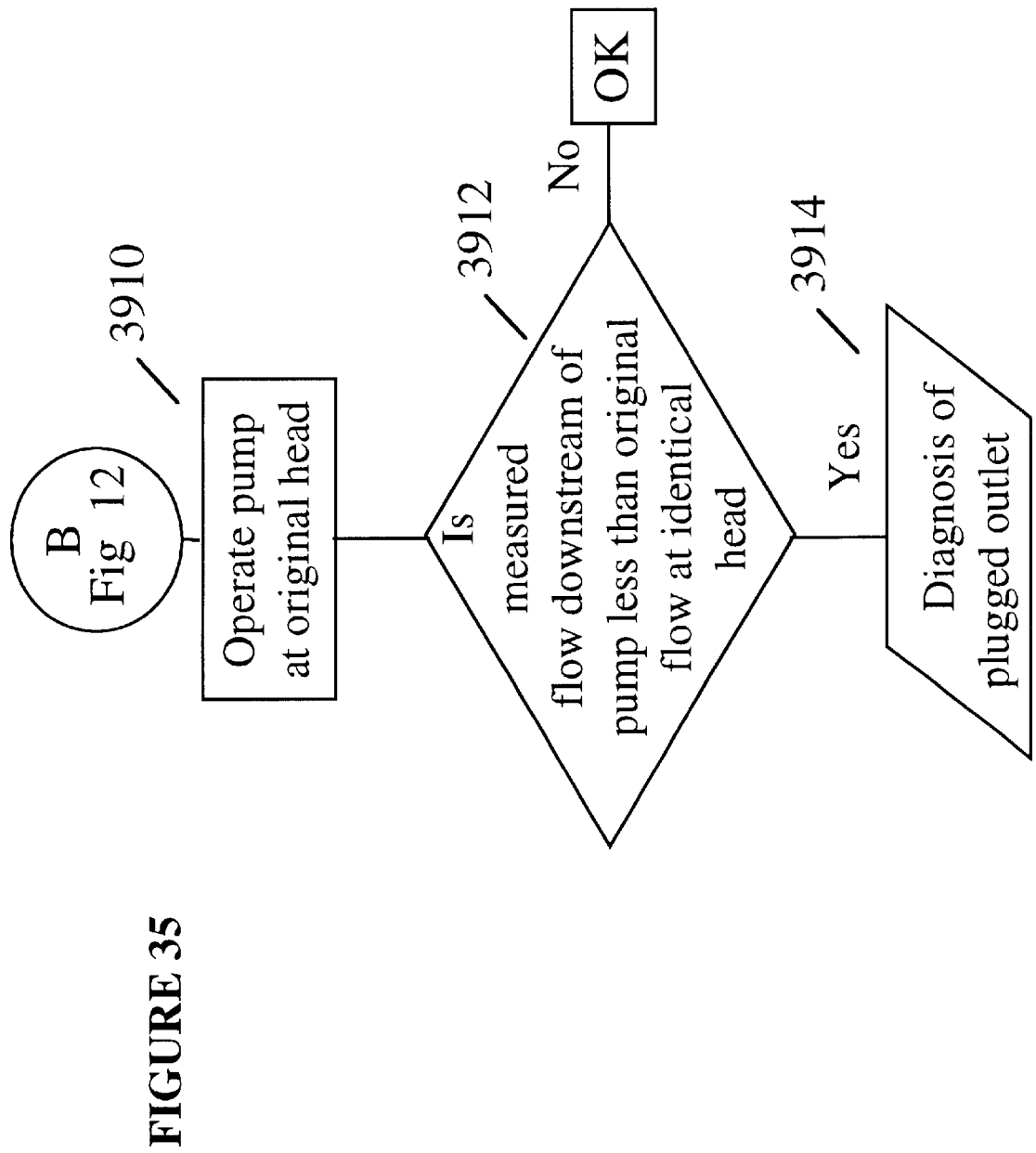

Referring now to FIG. 35, additional steps may be undertaken to diagnose a plugged output pipe of rotating equipment 14. The diagnosis requires that original head and original outlet pump flow be obtained from original data and that measured outlet pipe flow be obtained from flowmeter 28 (FIG. 1) and measured pump head be calculated from process variables as described above. The method further includes operating the pump at a measured head equal to the original head, as indicated in box 3910. Diagnostic apparatus 24 then makes a determination whether the measured pump outlet pipe flow is less than the original outlet pipe flow at the identical head, as represented by box 3912. If the measured flow is less than the original flow, then diagnostic apparatus 24 makes a determination of a plugged outlet pipe 20, as represented by box 3914. This method of comparison is based on the presentation of data as shown in FIG. 6b, where the original flow at original head is represented by a point designated 181 and new measured flow point is designated 182.

Referring now to FIG. 36, additional steps may be taken to diagnose a plugged suction line by determining if original net positive suction head available is greater than measured net positive suction head available. In order to make this determination, the original flow rate and original net positive suction head available may be obtained from original data. Measured net positive suction head may be calculated from the inlet pressure. A comparison is then made between the original net positive suction head available with the measured net positive suction head available. If the original net positive suction head available is greater than the measured net positive suction head available, as indicated in box 4110, then a diagnosis of a plugged suction line 18 is made by diagnostic apparatus 24, as indicated in box 4112.

Original data for the pump performance curve, FIG. 6, is typically provided at a design speed determined by the manufacturer. However, if a pump or rotating equipment is operated at a different speed than the design speed, then data must be corrected utilizing pump affinity equations. To calculate a speed change (N), the following affinity law relationships for flow (Q), head (H) and break horsepower (BHP) are utilized.

$$Q1/Q2 = N1/N2 \text{ and } H1/H2 = (N1/N2)^{0.5} \text{ and } BHP1/BHP2 = (N1/N2)^3$$

$$\text{Specific Speed } Ns = \frac{N \times Q^{0.5}}{H^{0.75}}$$

-continued where  Ns is the specific Speed
N is the operating speed, rpm
H is the pump head, ft
Q is the flow rate, gpm.

Figure 37:
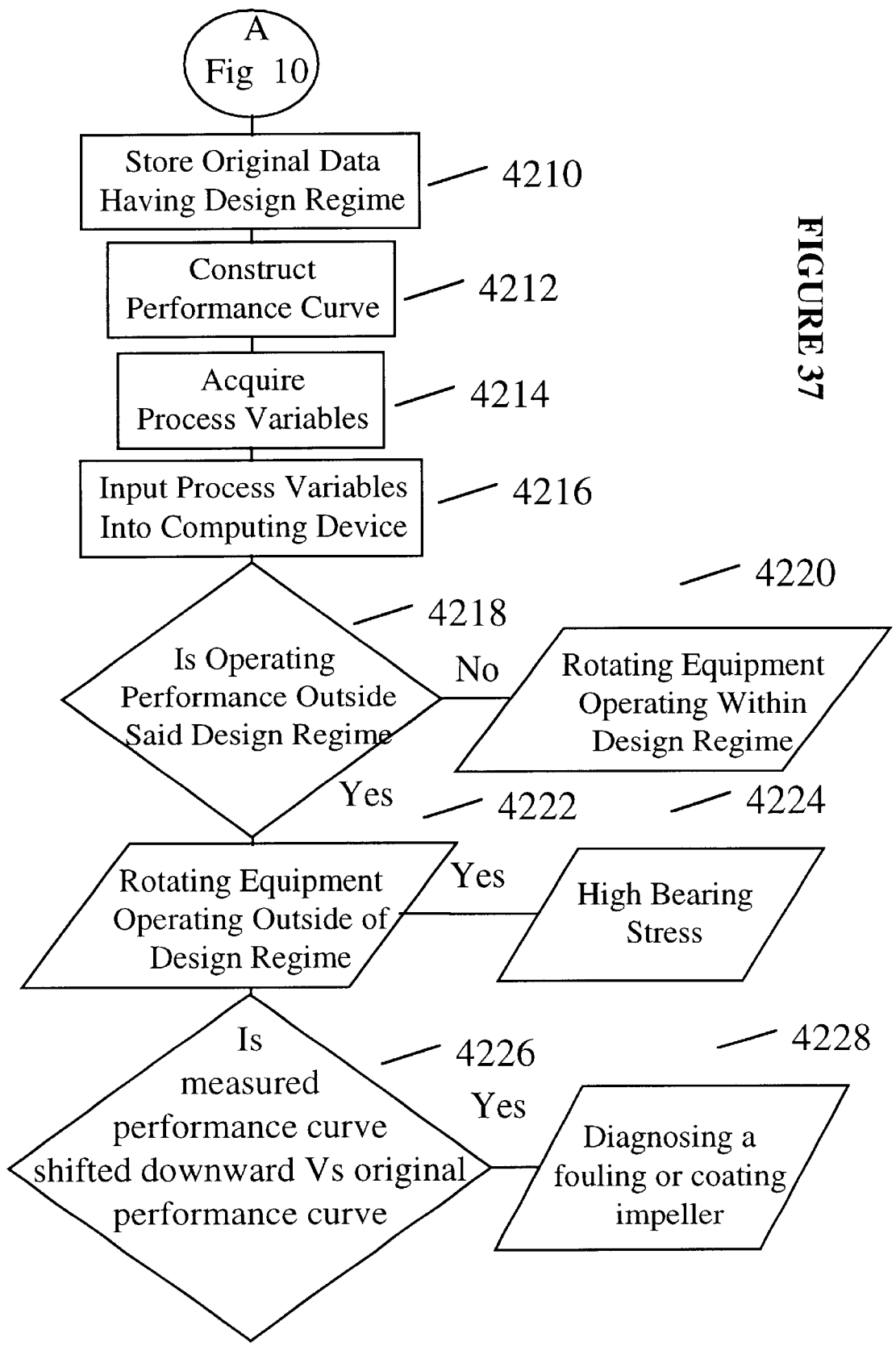

Referring now to FIG. 37, original data is gathered, as represented by box 4210, and an original performance curve is constructed, as represented by box 4212. Process variables are acquired, as represented by box 4214. The process variables are input into computing device 38 (FIG. 1), as represented in box 4216. A comparison is then made between the original performance curve and the measured operating point to determine if rotating equipment 14 is operating outside of design regime 166, as represented in box 4218. If rotating equipment 14 is operating within design regime 166, then diagnostic apparatus 24 so indicates, as represented in box 4220. If the operating performance is outside of design regime 166, diagnostic apparatus 24 so indicates, as represented by box 4222. If it is determined that rotating equipment 14 is operating outside of design regime 166, as represented by box 4222 (FIG. 6a), then a diagnosis of high bearing stress is made by diagnostic apparatus 24, as represented by box 4224. It is noted that impending bearing failure will occur if a process operating point is either above or below a BEP regime 164 (FIG. 6a) on an original performance curve. If operation is outside of a design regime 166, then bearing stress will be increasingly higher the further away from of design regime 166 that the process data point occurs. This is equally true for a high head-recirculation case or a high flow-cavitation case. This concept is illustrated graphically in FIG. 9a, where it can be seen that bearing forces are lowest at point 184, which corresponds to BEP point 186.

If a diagnosis is made that rotating equipment 14 is operating outside of recommended operating design regime 166, as represented by box 4222, an additional determination of whether a measured performance curve has shifted downward as compared with the original performance curve is made by diagnostic apparatus 24, as represented by box 4226. If so, a diagnosis of fouling or coating of an impeller 316 (FIG. 1b) is made, as represented in box 4228.

Figure 38:
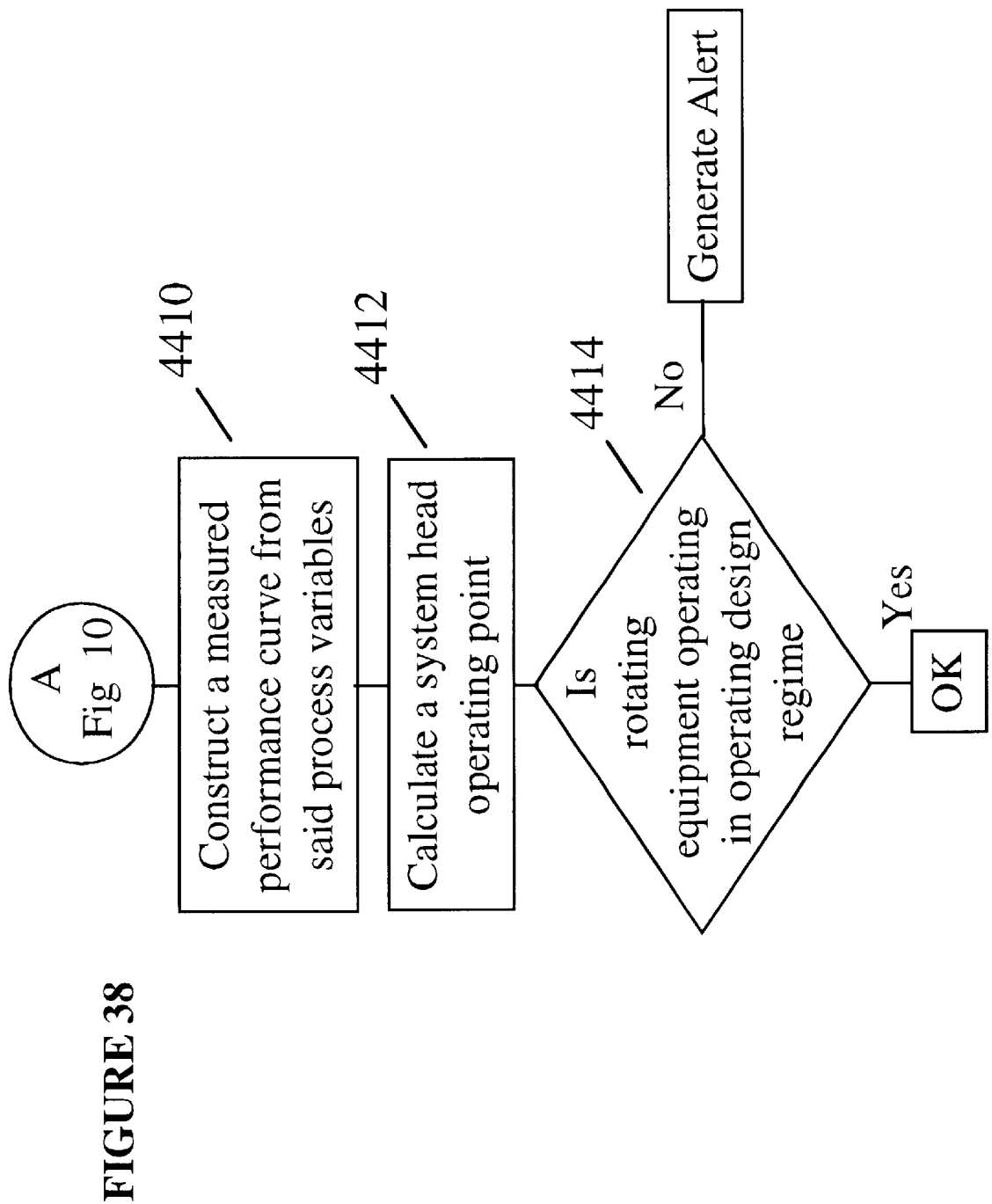

Referring to FIG. 38, in another embodiment of the invention, a determination of whether pump 14 is operating in a recognizable, recommended operating design regime 166 (FIG. 6a) is made by comparing a system head operating point with a measured performance curve. This determination is made by obtaining a calculated system demand curve at a specific flow rate from original data, wherein the calculated system design curve is determined by piping system geometry, fluid properties and pump operating conditions. Additionally, a calculated fluid frictional head loss at a specific flow rate is determined from original data, wherein the calculated fluid frictional head loss is determined by piping system geometry. Finally, a calculated velocity head at a specific flow rate is gathered from original data wherein the calculated velocity head is determined by piping system geometry.

The method includes the steps of constructing a measured performance curve from process variables as is known in the art, and which is represented by box 4410. Next, a system head operating point is calculated from the calculated system demand curve at a flow rate, and the calculated fluid frictional head loss and the calculated velocity head, as represented in box 4412. Diagnostic apparatus 24 then determines if rotating equipment 14 is operating in the recommended operating design regime 166, shown in FIG. 6a, by comparing the intersection of system head operating point with the measured performance curve. If the operating point is outside the recommended range 166 then an alert can be generated. It is noted that pumps or rotating equipment produce flow and pressure, i.e., head, required by a fluid system. The fluid flow system is constructed of pipe sections, pipe fittings (elbow, tees, etc.), valves, and vessels. Each of these components exhibit fluid friction, and as the fluid flow passes through each element a pressure drop occurs due to friction with the element. The sum of the pressure drops throughout the system represents the system head and the pump provides exactly the required pressure head.

Some of the flow system components are variable frictional elements, such as a control valve. When a valve is closed, the pressure drop across the valve increases and the pump must put out higher pressure to correspond to this reduction in flow.

When the pump pressure or head increases, the operating or measured operating point will move to the left on a head (H) v flow (Q) curve. This represents higher head (H) pressure and lower flow (Q). If the system head operating point moves too far to the left, indicating increasing head, the pump may be operating outside of its design regime 166, shown in FIG. 6, and recirculation can occur. For the opposite case of decreasing pressure and increasing flow, cavitation would be a possibility.

A pump, valve and piping system must be correctly engineered to provide for operation of a pump within a design regime 166, while delivering the pressure and flow required by the process.

Figure 39:
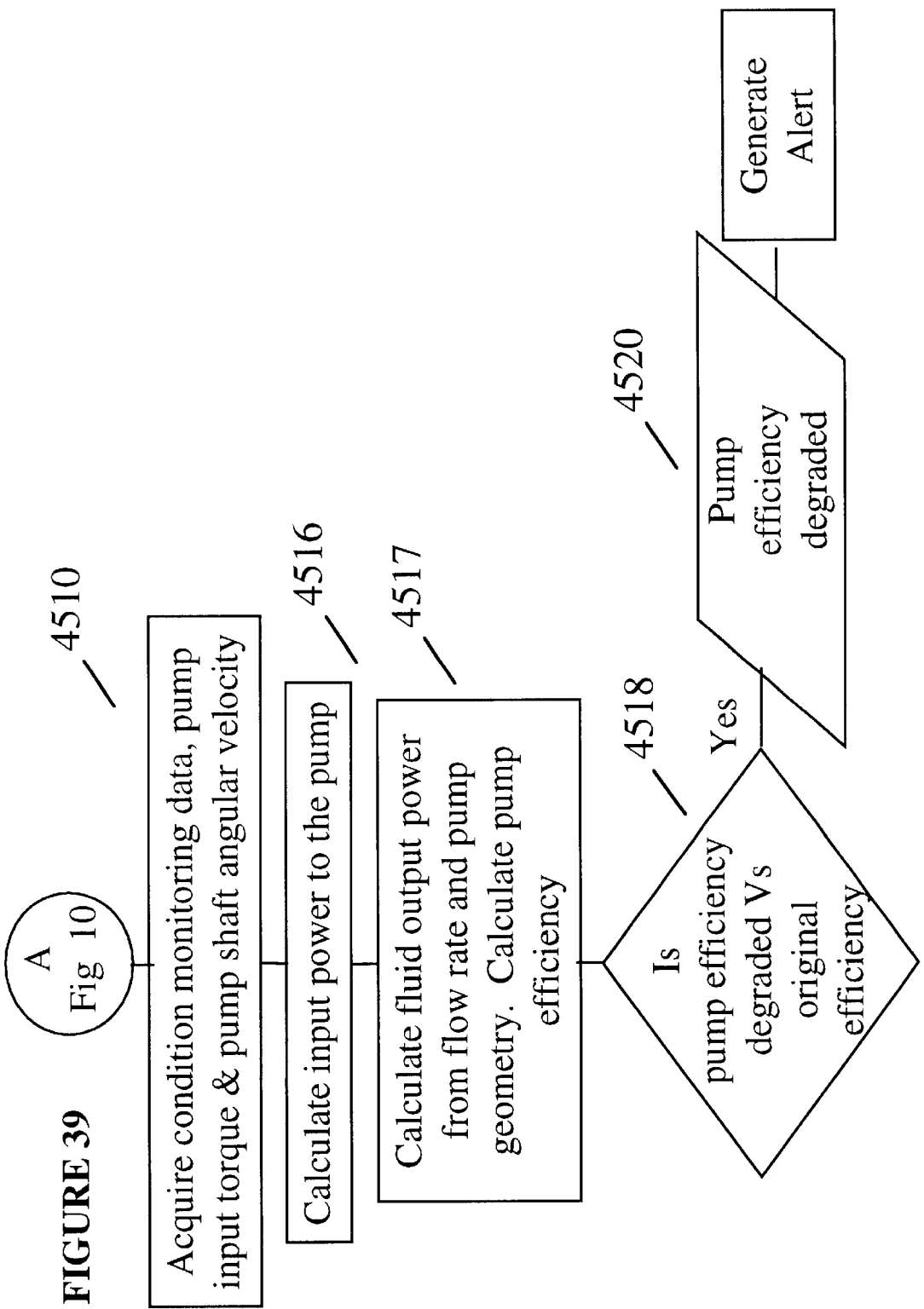
Figure 40:
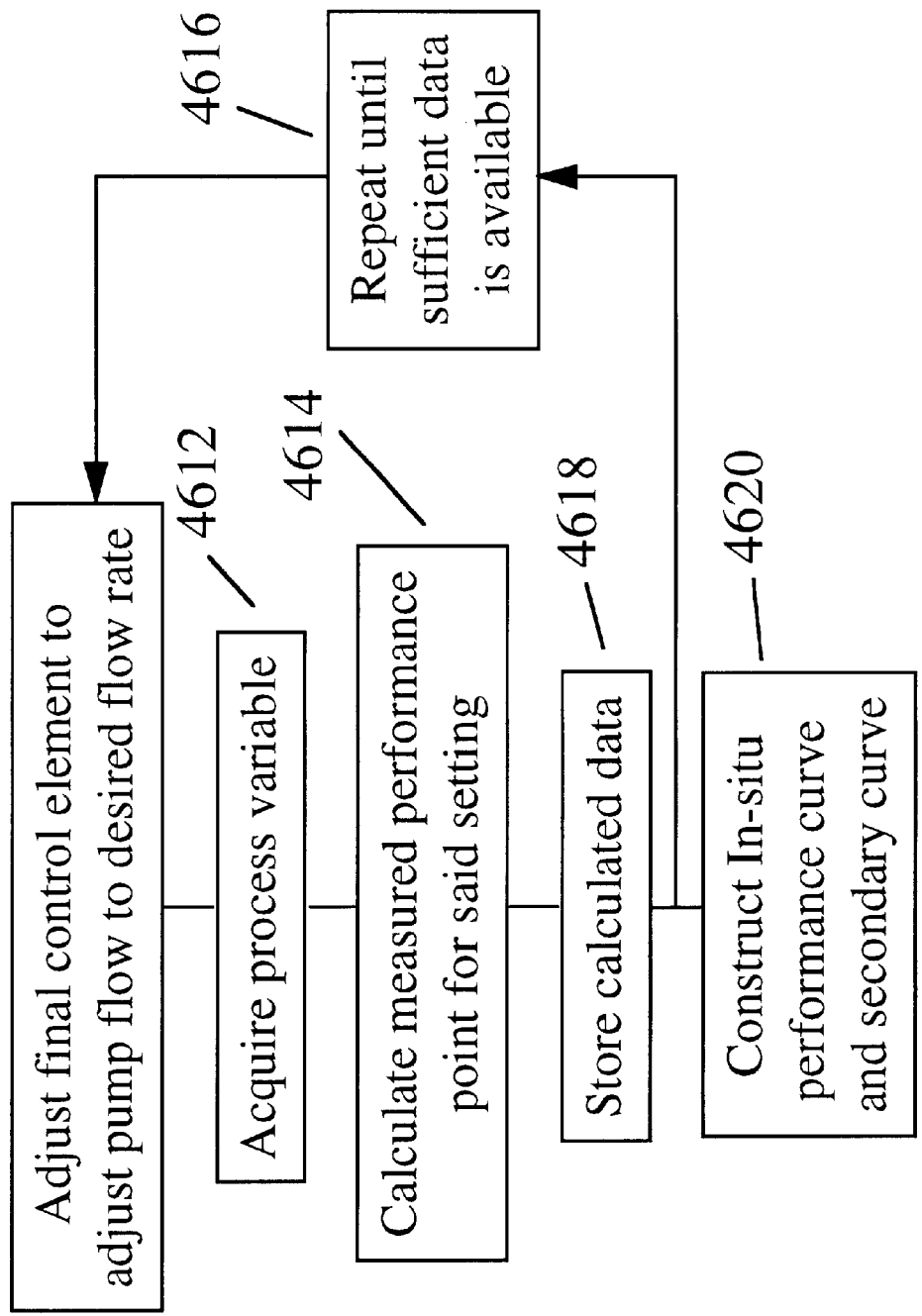
Figure 41:
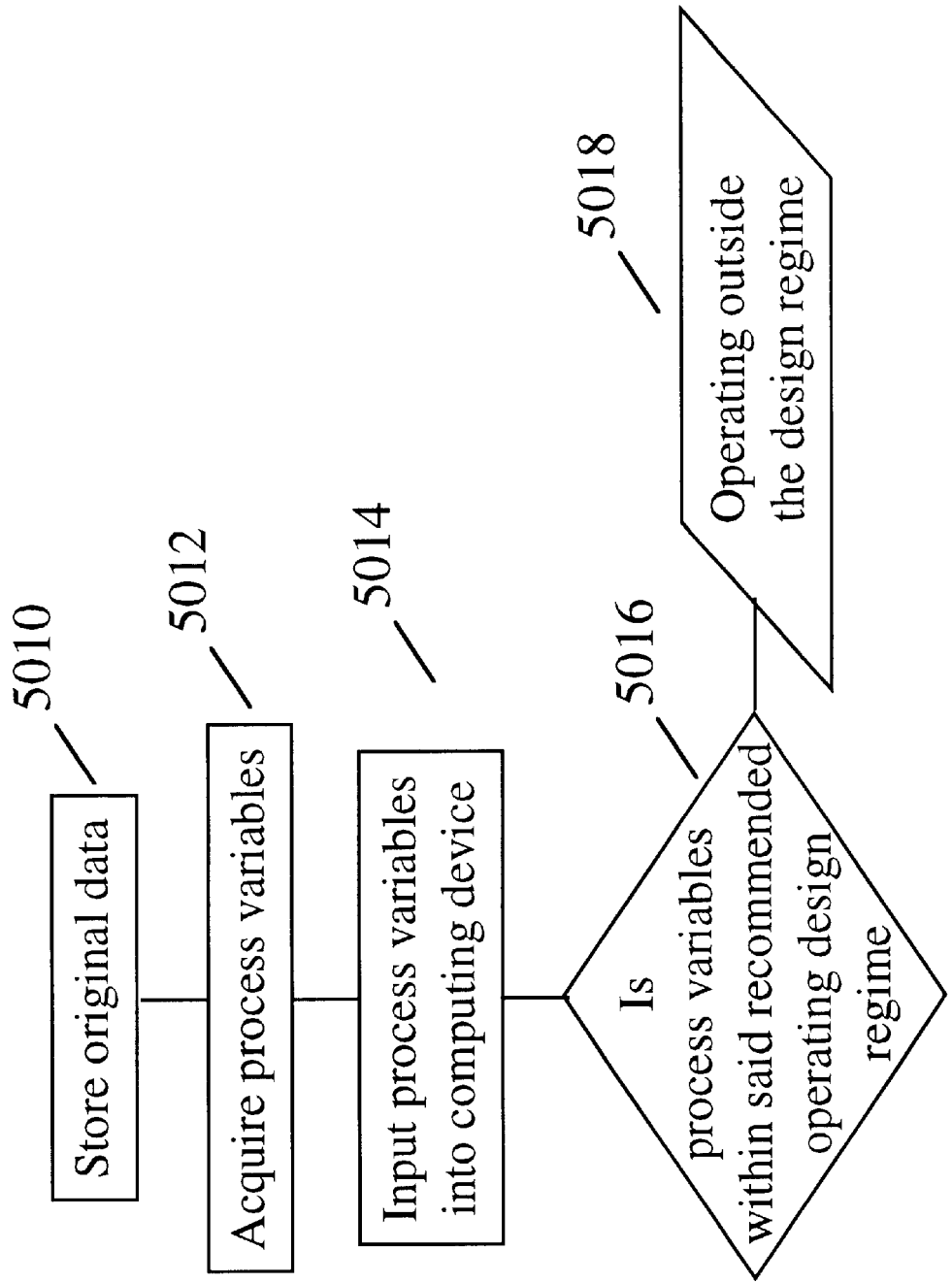

Referring now to FIG. 39, a diagnosis of degraded rotating machine efficiency can be obtained by comparing measured rotating machine efficiency with original performance curves. This can be accomplished by acquiring rotating machine input torque data from torque sensor 100 (FIG. 1), as represented by box 4510, and rotating machine shaft angular velocity data from angular velocity sensor 102. The method calculates the measured rotating machine efficiency by calculating the input power to the pump, as represented in box 4516, and by calculating the fluid outlet power calculated from the flow sensor 28 and pump geometry, represented by box 4518. The rotating machine efficiency may then be calculated by the following equation:

$$\text{Pump Efficiency, } \eta p = Pf/Pp$$

where
$\eta p$ is the pump efficiency
Pp is the power delivered to machine by the motor (also known as brake horsepower)
Pf is the fluid power delivered by the machine.

Diagnostic apparatus 24 then determines whether measured pump efficiency is less than original condition efficiency, as represented by box 4518. If so, then diagnostic apparatus 24 makes a determination that pump efficiency is degrading, as represented by box 4520.

A further embodiment of the method of the invention is disclosed for conducting a field test to permit the actual measurement and construction of pump performance curves and secondary performance curves that can be compared with original performance data.

The method includes a mode for controlling the pump throughout its operating range consistent with the Hydraulics Institute test method, known in the art. This method provides for operating a pump through its range of operation by the driving of the valve I/P, 35 (FIG. 1), or variable speed drive motor. This method can be used to construct pump performance curves in an automated fashion or for manually setting head or flow conditions to assist in the manual diagnosis of a rotating machine when a maintenance technician is looking to reproduce desired operating conditions.

The method operates the pump through its range of operation by controlling the rate of flow through the pump. The method is applicable to either a variable speed drive providing a full range of speed adjustment to the motor or via the control valve through a full range of valve flow control positions.

The method includes storing original data and adjusting a pump final control element to a desired setting, as presented in box 4610. The pump final control element may be either a valve 22, FIG. 1, or a variable speed drive connected to a motor 12. Process variables are acquired from operational rotating equipment 14 at the desired final control element setting, as represented in box 4612. The process variables are then input into computing device 38. Diagnostic apparatus 24, FIG. 2, constructs measured performance curves from the process variables, as represented by box 4614, and repeats the steps of storing, acquiring, inputting and constructing a plurality of times wherein the pump final control element is adjusted to correspond to a defined set of test conditions for constructing the measured performance curves, as represented by box 4616. The measured performance points are stored, as represented in box 4618. An in situ performance curve and secondary curve are finally constructed from process and condition monitoring variables, as represented in box 4620.

In one embodiment of the field diagnostic test process, a means is provided for manually establishing flow or head conditions, including manually adjusting the valve 22, manually adjusting the current or flow to motor 12, or other methods of manually adjusting the pump final control element to a desired condition.

An additional embodiment of a method for diagnosing rotating equipment includes storing original data having a recognized, recommended operating design regime 166 (FIG. 6a), as represented by box 5010 and acquiring a process variable from operating rotating equipment 14, FIG. 1, wherein a process variable is selected from a group consisting of fluid outlet pressure obtained from outlet pressure sensor 26, and fluid flow obtained from flowmeter 28, as represented by box 5012. The process variable is then input into computing device 38, as represented in box 5014, and a determination whether the process variable is within the recommended operating design regime 166 (FIG. 6a) is made, as represented by box 5016. If not, then diagnostic apparatus 24, FIG. 2, diagnoses that pump and motor system 10 is operating outside the recommended design regime 166, FIG. 6a, as represented by box 5018.

Whereas, the present invention has been described in relation to the drawings attached hereto, it should be understood that other and further modifications, apart from those shown or suggested herein, may be made within the spirit and scope of this invention.

What is claimed is:

1. A method for diagnosing rotating equipment comprising:

storing original data for constructing an original performance curve for the rotating equipment, said original data having a recognized recommended operating design regime;

acquiring process variables from operating rotating equipment;

inputting said process variables into a computing device;

obtaining a process data point from said process variables, said process data point representing an operating condition of the rotating equipment;

comparing said process data point with said original data; and determining from said comparison of said process data point with said original data whether said rotating equipment is operating efficiently by determining whether said process data point is outside of said operating design regime.

2. The method according to claim 1, wherein said operating design regime is a BEP regime.

3. The method according to claim 1, wherein said step of determining if said process data point is outside of said operating regime further comprises determining from said comparison of said process data point with said original data whether said process data point is below said recommended operating design regime.

4. The method according to claim 1, wherein said step of determining if said process data point is outside of said operating regime further comprises determining from said comparison of said process data point with said original data whether said process data point is above said recommended operating design regime.

5. The method according to claim 1, wherein:

said rotating equipment is a pump; and said step of determining if said process data point is outside of said operating regime further comprises determining from said comparison of said process data point with said original data whether said process data point is below said recommended operating design regime for determining if the pump is experiencing possible recirculation.

6. The method according to claim 1, wherein:

said rotating equipment is a pump; and said step of determining if said process data point is outside of said operating regime further comprises determining from said comparison of said process data point with said original data whether said process data point is above said recommended operating design regime for determining if the rotating equipment is experiencing possible cavitation.

7. The method according to claim 1, further comprising the step of acquiring equipment condition monitoring variables during operation of said rotating equipment for verifying said step of determining whether said process data point is outside of said operating design regime.

8. The method according to claim 7, wherein said rotating equipment is a pump.

9. The method according to claim 8, further comprising:

constructing an original performance curve from said original data;

constructing a measured pump performance curve from said process variables; and comparing said measured pump performance curve with said original pump performance curve for determining if the rotating equipment is cavitating.

10. A The method according to claim 8, wherein:

said original data is comprised of an original flow rate, said process variable is comprised of measured flow rate, said method further comprising the steps of:

deducing that a pump seal may be leaking from comparing said original flow rate with said measured flow rate and finding a reduction in measured flow.

11. The method according to claim 10, wherein:

said equipment condition monitoring variables are comprised of:
   measured seal leak sensor data;
said method further comprising the step of:
   verifying that said pump seal is leaking by examining leak sensor data.

12. The method according to claim 7, wherein, said original data is comprised of original condition dynamic pressure spectra having amplitude, frequency and phase components;
said equipment condition monitoring variables are comprised of measured dynamic pressure sensor spectra having amplitude, frequency and phase components;
said method further comprising the step of:
   comparing at least one of said components selected from the group of amplitude, frequency and phase of said measured dynamic pressure sensor spectra with at least one of said components selected from the group of amplitude, frequency and phase of said original condition pressure spectra; and
   determining from said comparison of said amplitude, frequency and phase components of said measured dynamic pressure sensor spectra with said amplitude, frequency and phase components of said original condition pressure spectra whether recirculation or cavitation exists.

13. The method according to claim 7, wherein, said original data is comprised of at least one of:
   original condition velocity vibration spectra having amplitude, frequency and phase components; or
   original condition acceleration vibration spectra having amplitude, frequency and phase components;
said equipment condition monitoring variables are comprised of at least one of:
   measured velocity vibration spectra having amplitude, frequency and phase components; and
   measured acceleration vibration spectra having amplitude, frequency and phase components;
said method further comprising the steps of:
   comparing at least one of said components selected from the group of amplitude, frequency and phase of said original condition velocity vibration spectra with at least one of said components selected from the group of amplitude, frequency and phase of said measured velocity vibration spectra;
   comparing at least one of said components selected from the group of amplitude, frequency and phase of said original condition acceleration vibration spectra with at least one of said components selected from the group of amplitude, frequency and phase of said measured acceleration vibration spectra; and
   determining from said comparisons if impeller degradation exists.

14. The method according to claim 13, further comprising:

comparing said phase component of said original condition velocity vibration spectra with said phase component of said measured velocity vibration spectra;
   comparing said phase component of said original condition acceleration vibration spectra with said phase component of said measured acceleration vibration spectra;
   determining whether a phase shift has occurred; and
   diagnosing impeller fouling.

15. The method according to claim 7, wherein, said original data is comprised of at least one of:
   original condition velocity vibration spectra having amplitude, frequency and phase components; or
   original condition acceleration vibration spectra having amplitude, frequency and phase components;
said equipment condition monitoring variables are comprised of at least one of:
   measured velocity vibration spectra having amplitude, frequency and phase components; or
   measured acceleration vibration spectra having amplitude, frequency and phase components;
said method further comprising the steps of:
   comparing at least one of said components selected from the group of amplitude, frequency and phase of said original condition velocity vibration spectra with at least one of said components selected from the group of amplitude, frequency and phase of said measured velocity vibration spectra;
   comparing at least one of said components selected from the group of amplitude, frequency and phase of said original condition acceleration vibration spectra with at least one of said components selected from the group of amplitude, frequency and phase of said measured acceleration vibration spectra; and
   determining from said comparisons if bearing degradation exists.

16. The method according to claim 7, wherein:

said equipment condition monitoring variables further comprise:
   pump input torque data from a torque sensor; and
   pump shaft angular velocity data from a shaft speed sensor; and
said original data further comprises original condition computed frictional torque;
said method further comprising the steps of:
   calculating measured condition frictional torque in the rotating equipment;
   comparing said measured condition frictional torque with said original condition frictional torque; and
   diagnosing bearing, seal or wear plate wear.

17. The method according to claim 16, wherein:

said measured condition frictional torque is less than said original condition frictional torque;
said method further comprising diagnosing pump seal leakage.

18. The method according to claim 16, wherein:

said measured frictional torque is greater than said original condition frictional torque;
said method further comprising diagnosing that bearing friction is excessive.

19. The method according to claim 16, wherein:

said original data is comprised of original vibration velocity or acceleration spectra having amplitude, frequency and phase components;
said equipment condition monitoring data is further comprised of:
   measured vibration velocity or acceleration spectra having amplitude, frequency and phase components;
said method further comprising the steps of:
   determining from said frictional torque comparison that said bearing friction is excessive; and
   comparing at least one of said components selected from the group of amplitude, frequency and phase of said original vibration velocity or acceleration spectra with at least one of said components selected from the group of amplitude, frequency and phase of said measured vibration velocity spectra; and diagnosing radial bearing failure.

20. The method according to claim 7, wherein, said original data is comprised of:
  original radial bearing vibration velocity spectra having amplitude, frequency and phase components, or
  original radial bearing acceleration spectra having amplitude, frequency and phase components;

said equipment condition monitoring variables are comprised of:
  measured radial bearing vibration velocity spectra having amplitude, frequency and phase components, or
  measured radial bearing acceleration spectra having an amplitude, frequency and phase components;

said method further comprising the steps of:
  comparing at least one of said components selected from the group of amplitude, frequency and phase of said original radial bearing vibration velocity spectra with at least one of said components selected from the group of amplitude, frequency and phase of said measured radial bearing vibration velocity spectra;
  comparing at least one of said components selected from the group of amplitude, frequency and phase of said original radial bearing acceleration spectra with at least one of said components selected from the group of amplitude, frequency and phase of said measured radial bearing acceleration spectra; and
  determining if said radial bearing degradation exists.

21. The method according to claim 7, wherein, said original data is further comprised of:
  original radial bearing operating temperature, and said condition monitoring variable are further comprised of:
  measured radial bearing operating temperature; and said method further comprising the step of:
  comparing said original radial bearing operating temperature with said measured radial bearing operating temperature to determine if radial bearing degradation exists.

22. The method according to claim 7, wherein:

said original data is comprised of:
  original thrust bearing vibration velocity spectra having amplitude, frequency and phase components, or
  original thrust bearing acceleration spectra having amplitude, frequency and phase components, and
  original thrust bearing operating temperature;

said equipment condition monitoring variables are comprised of:
  measured thrust bearing vibration velocity spectra having amplitude, frequency and phase components, and
  measured thrust bearing acceleration spectra having amplitude, frequency and phase components;

the method further comprising the steps of:
  comparing at least one of said components selected from the group of amplitude, frequency and phase of said original thrust bearing vibration velocity spectra with at least one of said components selected from the group of amplitude, frequency and phase of said measured velocity vibration spectra;
  comparing at least one of said components selected from the group of amplitude, frequency and phase of said original thrust bearing acceleration spectra with at least one of said components selected from the group of amplitude, frequency and phase of said measured acceleration spectra; and
  determining if thrust bearing degradation exists.

23. The method according to claim 7, wherein:

said original data is further comprised of:
  original thrust bearing operating temperature;

said equipment condition monitoring variables are comprised of:
  measured thrust bearing operating temperature; and said method further comprising the step of:
  comparing said original thrust bearing operating temperature and said measured thrust bearing operating temperature to determine whether thrust bearing degradation exists.

24. The method according to claim 7, wherein:

said original data is comprised of original required net positive suction head;

said condition monitoring data is comprised of measured available net positive suction head;

the method further comprising the steps of:
  comparing said original required net positive suction head with said measured available net positive suction head; and
  determining if sufficient measured available net positive suction head exists to operate without cavitation.

25. The method according to claim 7, wherein:

said original data is comprised of original required net positive suction head; and fluid vapor pressure of a process fluid at a temperature;

said condition monitoring data is comprised of:
  measured net positive suction head,
  measured operating temperature of a process fluid, and the method further comprising the step of:
  correcting said measured net positive suction head data for said measured operating temperature and said fluid vapor pressure,
  comparing said corrected original required net positive suction head with said measured available net positive suction head; and
  determining if sufficient measured available net positive suction head exists to operate without cavitation.

26. The method according to claim 7, wherein:

said original data is comprised of original axial thrust bearing displacement data;

said condition monitoring data is comprised of measured axial thrust bearing displacement data obtained from a proximity sensor positioned proximate a thrust bearing on the rotating equipment;

the method further comprising the steps of:
  comparing said original axial thrust bearing displacement data with said measured axial thrust bearing displacement data; and
  determining if thrust bearing degradation exists.

27. The method according to claim 7, wherein:

said original data is comprised of original radial bearing displacement data;

said condition monitoring data is comprised of measured radial bearing displacement data obtained from a displacement sensor positioned proximate a radial bearing on the rotating equipment;

the method further comprising the steps of:
  comparing said original radial bearing displacement data with said measured radial bearing displacement data; and
  determining if radial bearing degradation exists.

28. The method according to claim 7, wherein:
said original data is comprised of original motor manufacturer's breakdown torque;
said equipment condition monitoring data is comprised of:
measured electric motor output torque;
said method further comprising the steps of:
comparing said original motor manufacturer's breakdown torque with said original equipment condition monitoring data for diagnosing impending motor failure; and
generating an alert.

29. The method according to claim 7, further comprising:
constructing an original performance curve from said original data;
constructing secondary curves from said equipment condition monitoring variables; and
displaying said original performance curve and said secondary curves for comparison.

30. The method according to claim 7, further comprising:
constructing an original performance curve from said original data;
constructing a measured performance curve from said process variables and equipment condition monitoring variables;
said method further comprising the step of comparing said original performance curve and said measured performance curve and generating necessary alerts.

31. The method according to claim 30, wherein said host computer time stamps said original performance curve for comparison with said measured performance curve for use in predicting rotating equipment component failures.

32. The method according to claim 7, further comprising:
plotting said process operating data point from said process variables;
plotting a secondary data point from said equipment condition monitoring variables;
said method further comprising the step of communicating said original performance curve and said secondary performance curve for comparison and generating of necessary alerts.

33. The method according to claim 7, further comprising:
constructing an original performance curve from said original data;
constructing an original secondary curve from said original data; variables;
constructing a measured performance curve from said equipment monitoring variables;
constructing a measured secondary curve from said equipment monitoring variables;
comparing said original performance curve with said measured performance curve;
comparing said original secondary curve with said measured secondary curve; and
alerting a controller to correct pump operating conditions to within said operating design regime.

34. The method according to claim 7, wherein;
said original data is comprised of:
original condition dynamic pressure sensor spectra having amplitude, frequency and phase components;
said equipment condition monitoring variables are comprised of:
measured condition dynamic pressure sensor spectra having amplitude, frequency and phase components;
said method further comprising the steps of:
comparing at least one of said components selected from the group of amplitude, frequency and phase of said measured dynamic pressure sensor spectra with at least one of said components selected from the group of amplitude, frequency and phase of said original condition dynamic pressure sensor spectra to determine if said rotating equipment is operating inside said design regime; and
determining from said comparison that cavitation exists.

35. The method according to claim 34, wherein:
said original data is comprised of original net positive suction head required;
said equipment condition monitoring variables are comprised of:
measured net positive suction head available;
operating fluid temperature; and
fluid vapor pressure;
said method further comprising the steps of:
correcting said original net positive suction head required and said measured net positive suction head available for said operating fluid temperature and said fluid vapor press;
verifying said determination of valve cavitation by determining that sufficient corrected measured net positive suction available exists and pump is not cavitating; and
determining that the source of cavitation is the valve.

36. The method according to claim 34, wherein:
said original data is comprised of original condition vibration spectra having amplitude, frequency and phase components;
said equipment condition monitoring variables are comprised of measured vibration spectra having amplitude, frequency and phase components;
said method further comprising the step of:
comparing at least one of said components selected from the group of amplitude, frequency and phase of said measured vibration spectra with at least one of said components selected from the group of amplitude, frequency and phase of said original condition vibration spectra; and
determining from said comparison that said measured vibration spectra has increased in an expected pump cavitation frequency range.

37. The method according to claim 7, wherein:
said original data is comprised of original condition vibration spectra having amplitude, frequency and phase components;
said equipment condition monitoring variables are comprised of measured vibration spectra having amplitude, frequency and phase components;
said method further comprising the steps of:
comparing at least one of said components selected from the group of amplitude, frequency and phase of said measured vibration spectra with at least one of said components selected from the group of amplitude, frequency and phase of said original condition vibration spectra to determine whether said measured vibration spectra amplitude has increased in the expected cavitation frequency range; and
diagnosing pump cavitation.

38. The method according to claim 7, wherein:
a control valve shaft position is determined from a control valve shaft position sensor;

said original data comprises original pump head;
said condition monitoring variables comprise measured head;
said method further comprising the steps of:
  determining whether said valve is closed;
  determining whether said measured head is greater than said original maximum head;
  diagnosing a pump deadhead condition; and
  sending a signal to shut down the rotating equipment or open said valve.

39. The method according to claim 7, wherein:
said original data comprises control valve flow data;
said equipment condition monitoring variables comprise measured pump flow; and
said process variables comprise control valve position;
said method further comprising the steps of:
  calculating valve flow from said valve data at said control valve position; and
  comparing said measured pump output flow with said calculated valve flow to determine valve packing leakage or valve seat leakage.

40. The method according to claim 7, wherein:
said original data comprises:
  original head; and
  original outlet pipe flow;
said measured process variables comprise measured outlet pipe flow and measured pump head;
said method further comprising the steps of:
  operating the rotating equipment at said original head;
  comparing said original head with said measured pump head; and
  diagnosing a plugged output pipe if flow is less than said original pump output flow.

41. The method according to claim 7, wherein:
said original data is comprised of:
  original flow rate; and
  original net positive suction head available;
said process variable are comprised of:
  measured net positive suction head;
said method further comprising the steps of:
  comparing said original net positive suction head available with said measured net positive suction head available; and
  diagnosing a plugged suction line if said original net positive suction head available is greater than said measured net positive suction head available.

42. The method according to claim 7, further comprising the step of adjusting said original data for varying motor speeds by using affinity laws.

43. The method according to claim 1, further comprising the steps of:
  constructing an original performance curve from said original data;
  constructing a measured performance curve from said process variables;
  comparing said original performance curve with said measured performance curve; and
  determining from said comparison of said original performance curve with said measured performance curve whether a condition of impending radial bearing failure exists.

44. The method according to claim 8, further comprising diagnosing a fouling or coating of an impeller in the rotating equipment if said measured performance curve is shifted downward compared with said original performance curve.

45. The method according to claim 1, wherein:
said original data is comprised of:
  a calculated system demand curve at a flow rate, said calculated system demand curve determined by piping system geometry,
  a calculated fluid frictional head loss at a flow rate, said calculated fluid frictional head loss determined by piping system geometry, and
  a calculated velocity head at a flow rate, said calculated velocity head determined by piping system geometry;
said method further comprising the steps of:
  construction a measured performance curve from said process variables;
  calculating a system head operating point from said calculated system demand curve at a flow rate, said calculated fluid frictional head loss and said calculated velocity head; and
  determining if the rotating equipment is operating in said recognizable recommended operating design regime by comparing said system head operating point with said measured performance curve.

46. The method according to claim 1, wherein:
said equipment condition monitoring variables are comprised of:
  rotating machine input torque data, and
  rotating machine shaft angular velocity data;
said method further comprising the steps of:
  calculating measured rotating machine efficiency; and
  diagnosing degraded rotating machine efficiency by comparing said measured rotating machine efficiency with said original machine efficiency.

47. A method for diagnosing rotating equipment comprising;
  storing original data for constructing an original performance curve for the rotating equipment, said original data having a recognized recommended operating design regime;
  acquiring a process variable from operating rotating equipment, said process variable selected from the group of fluid outlet pressure and fluid flow;
  inputting said process variable into a computing device; and
  determining if said process variable is within said recommended operating design regime.

48. The method according to claim 1, further comprising the step of adjusting a pump final control element to a desired setting.

49. The method according to claim 48, wherein said pump final control element is a valve.

50. The method according to claim 48, wherein said pump final control element is a variable speed drive.

* * * * *